July 2, 1946.    A. H. DICKINSON    2,402,989
ACCUMULATING APPARATUS
Filed May 23, 1941     22 Sheets-Sheet 1
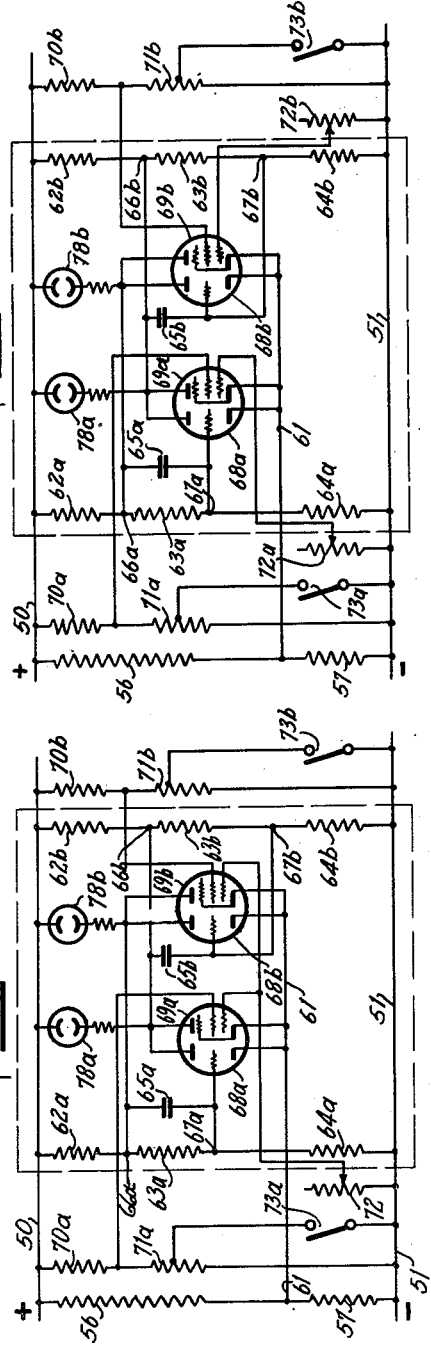
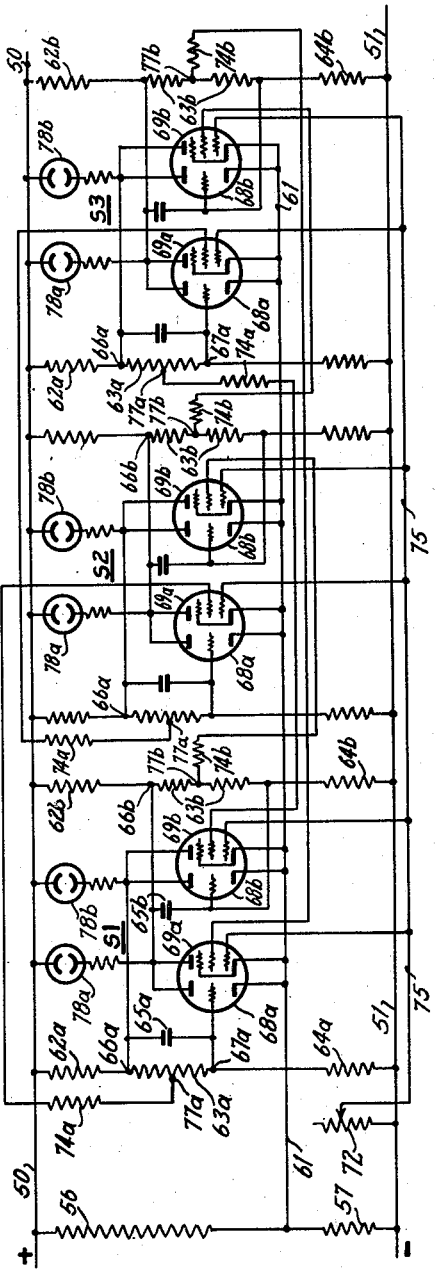
INVENTOR
Arthur H. Dickinson
BY
ATTORNEY July 2, 1946.　　　A. H. DICKINSON　　　2,402,989
ACCUMULATING APPARATUS
Filed May 23, 1941　　　22 Sheets-Sheet 2
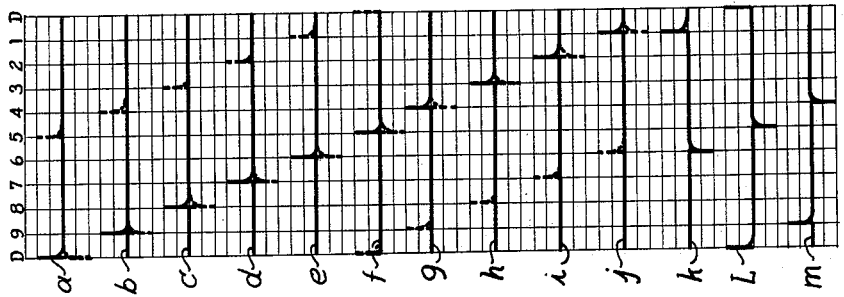
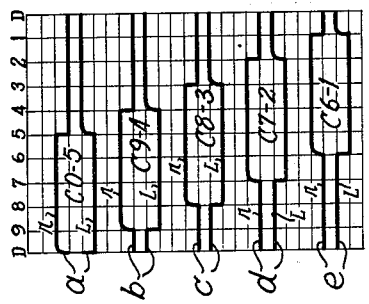
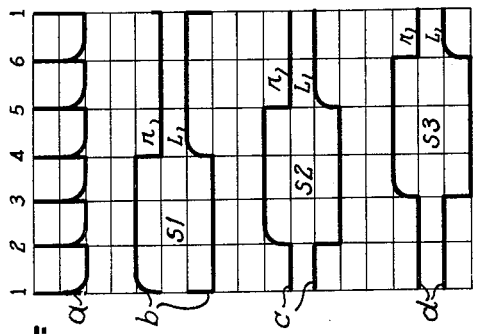
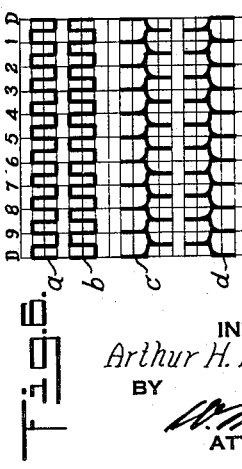
INVENTOR
*Arthur H. Dickinson*
BY
ATTORNEY

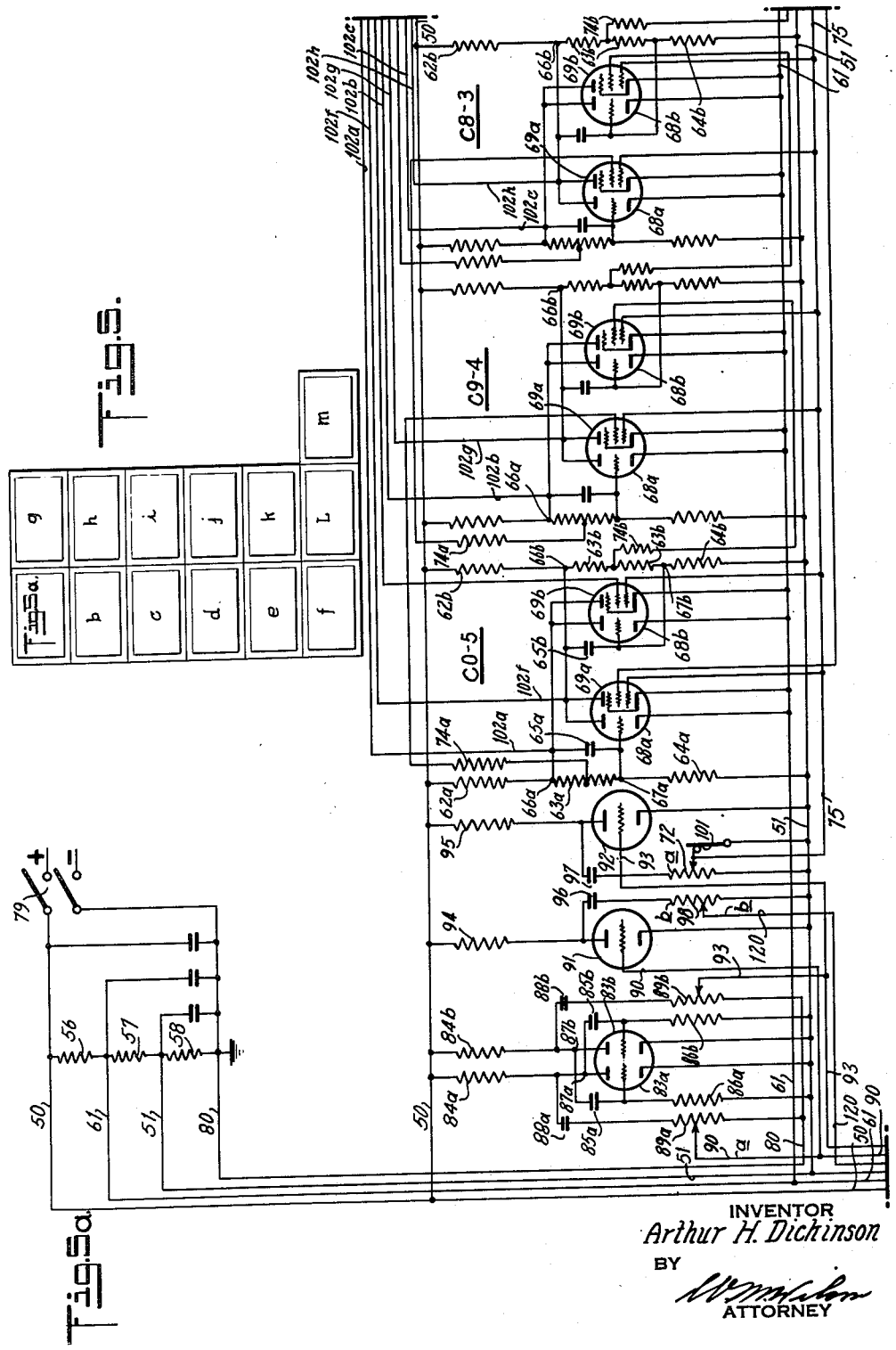

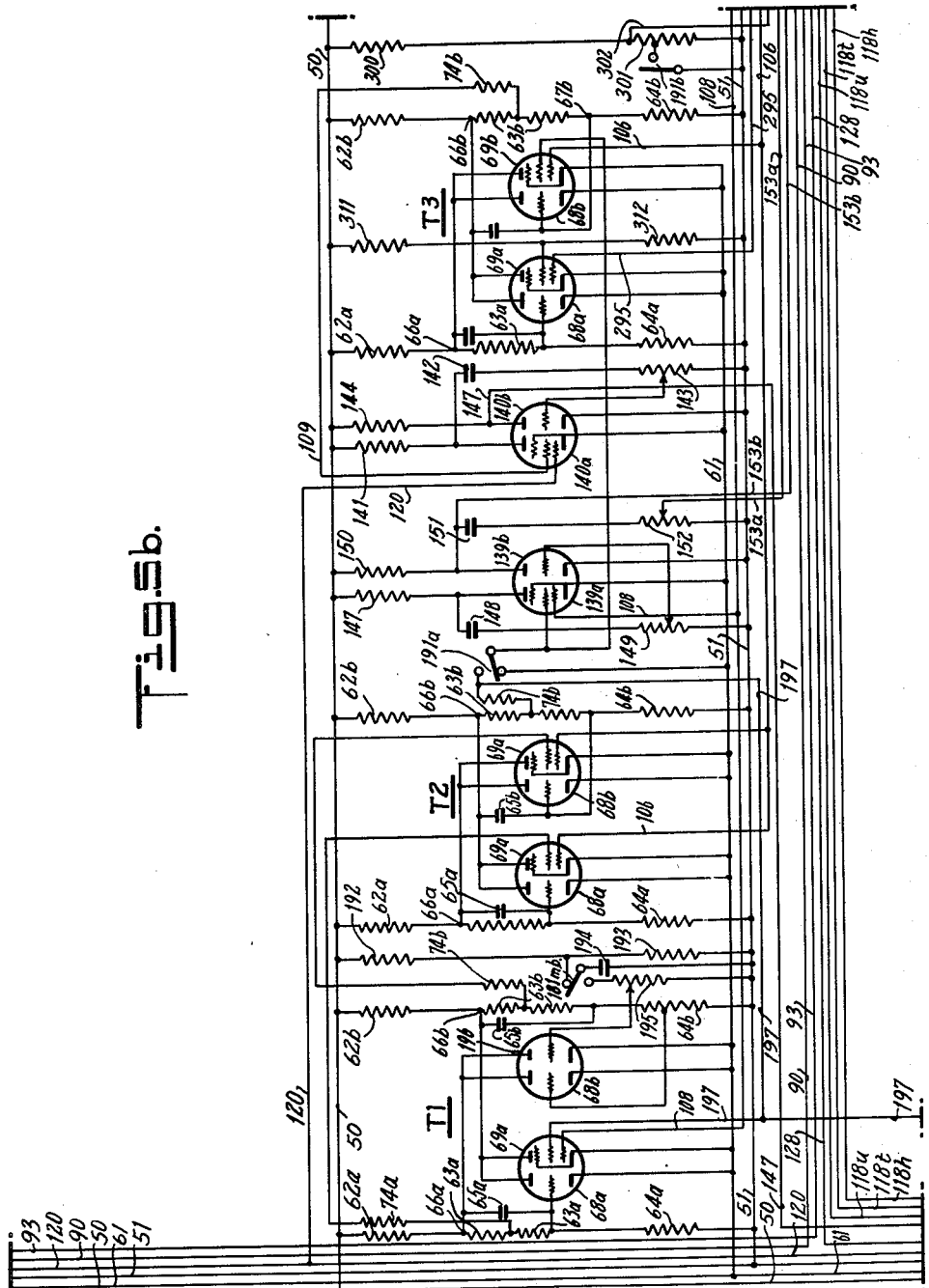

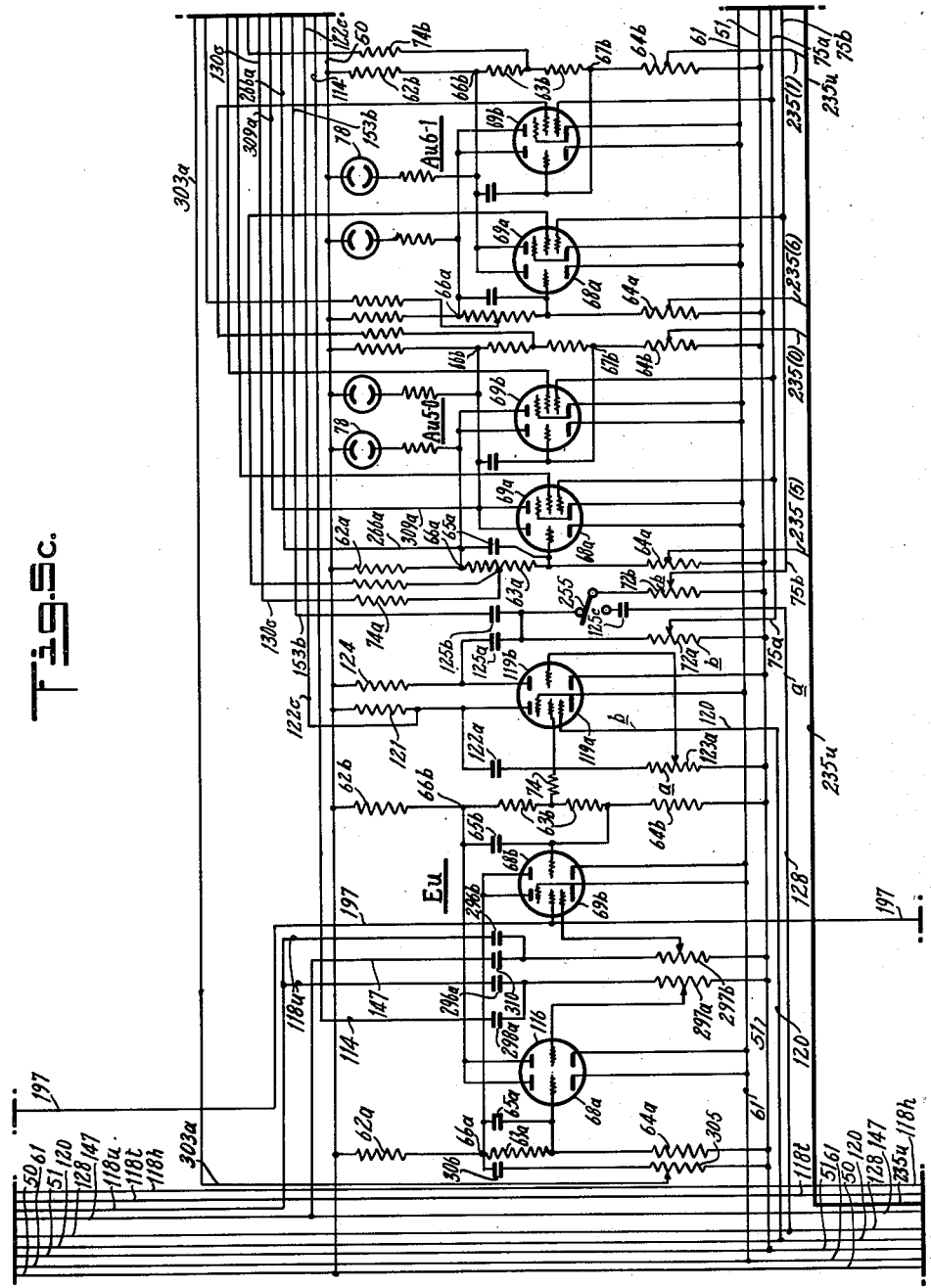

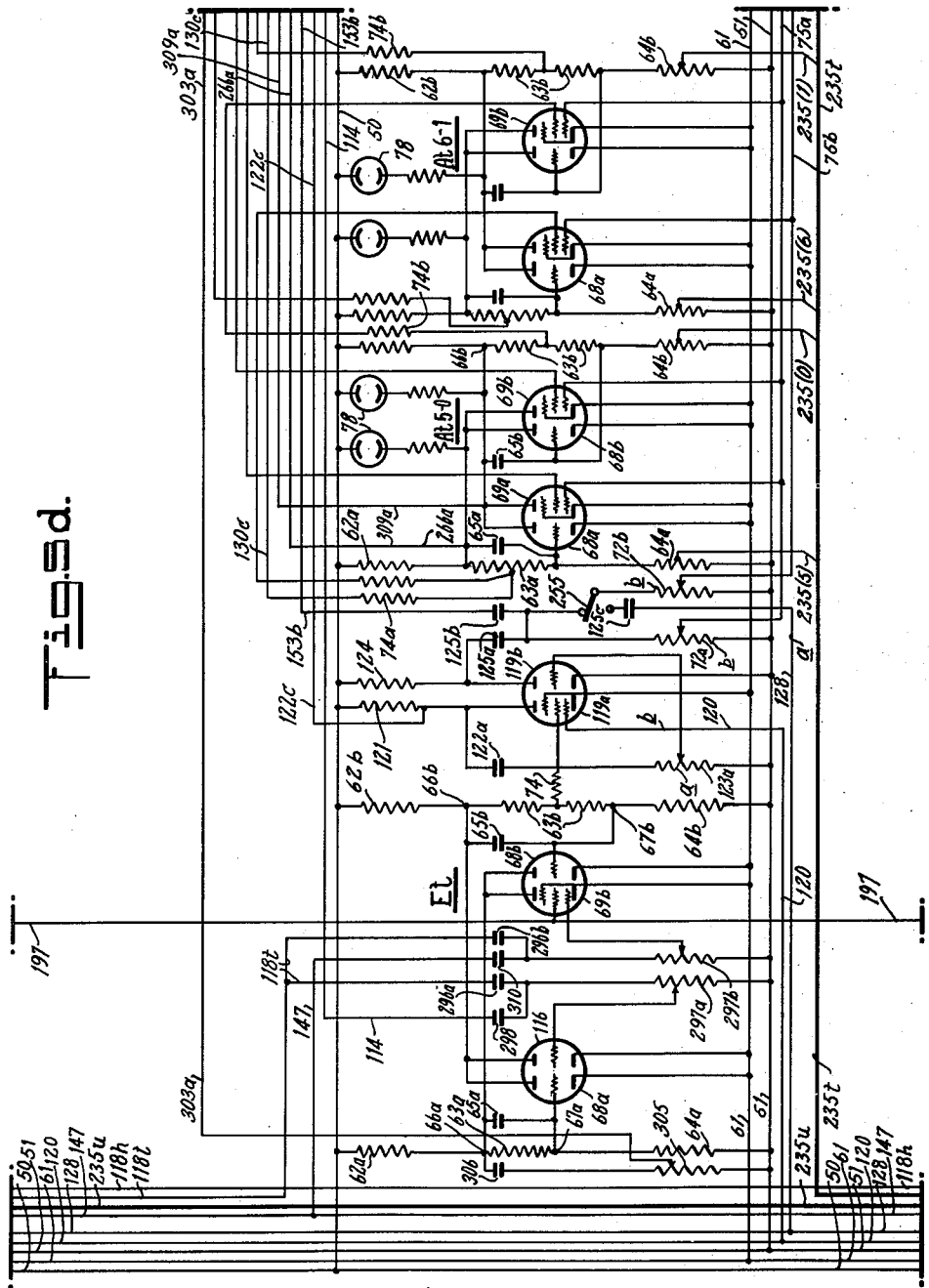

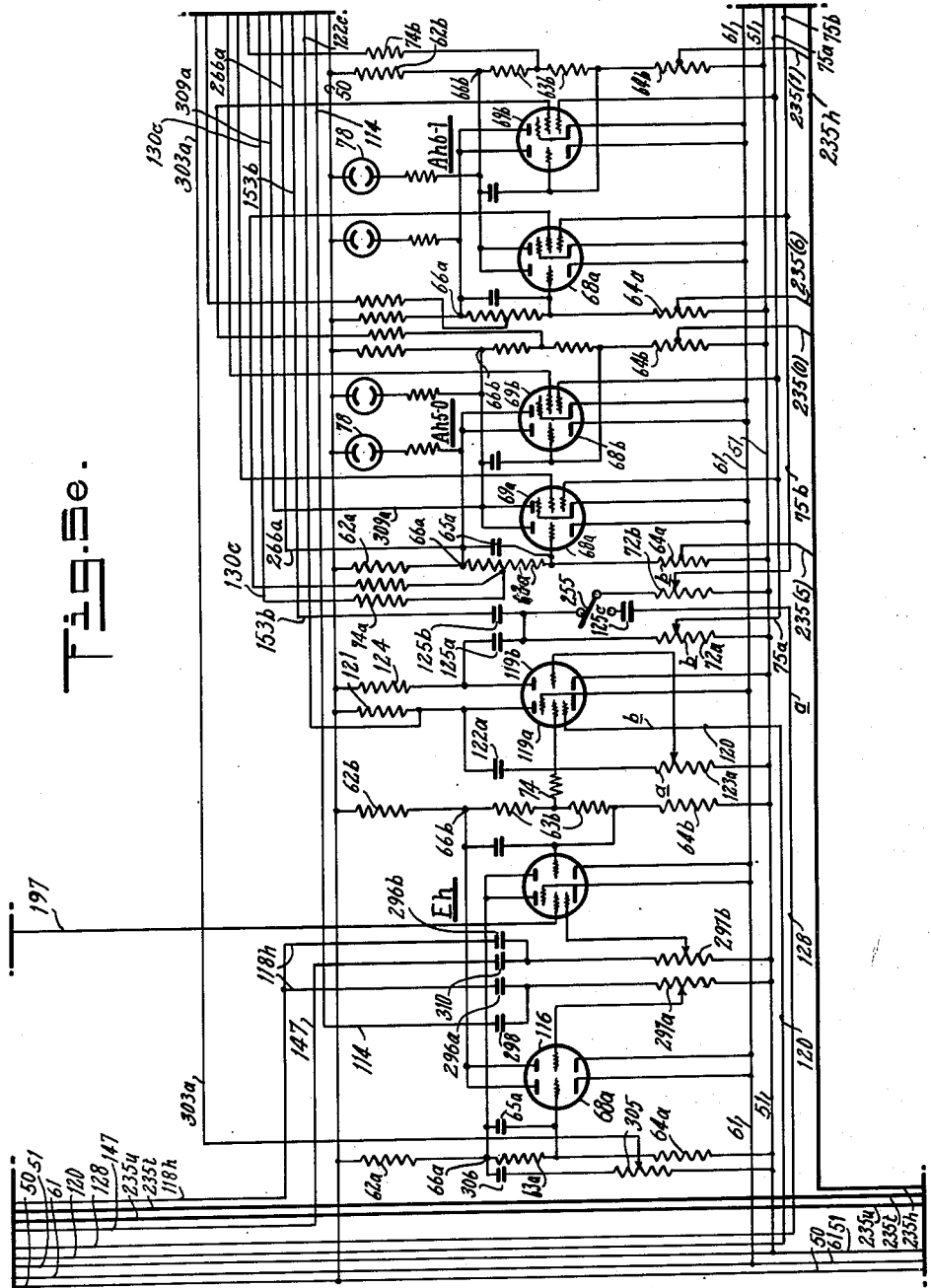

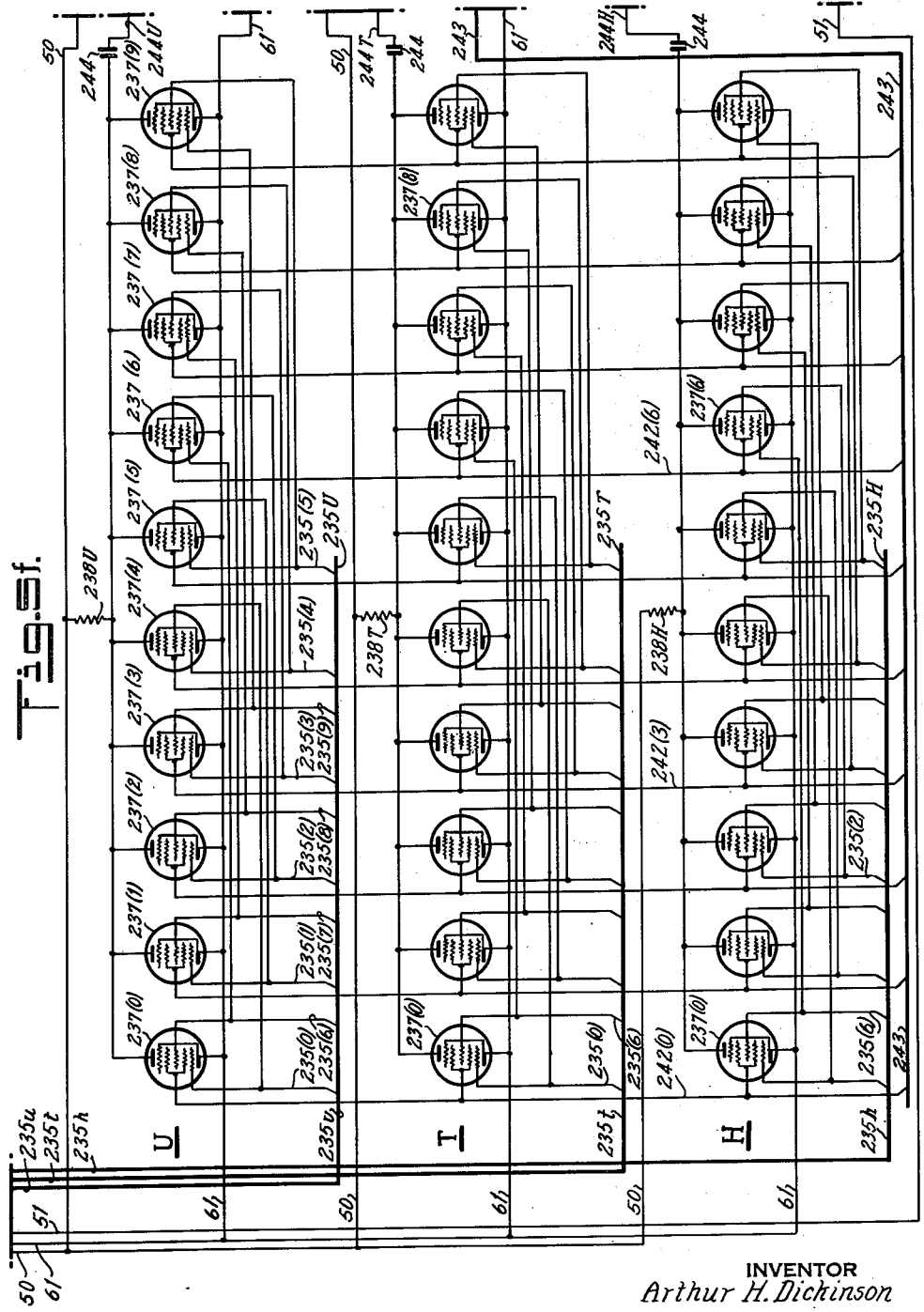

July 2, 1946.  A. H. DICKINSON  2,402,989
ACCUMULATING APPARATUS
Filed May 23, 1941   22 Sheets-Sheet 9

Fig.59.

INVENTOR
Arthur H. Dickinson
BY
ATTORNEY

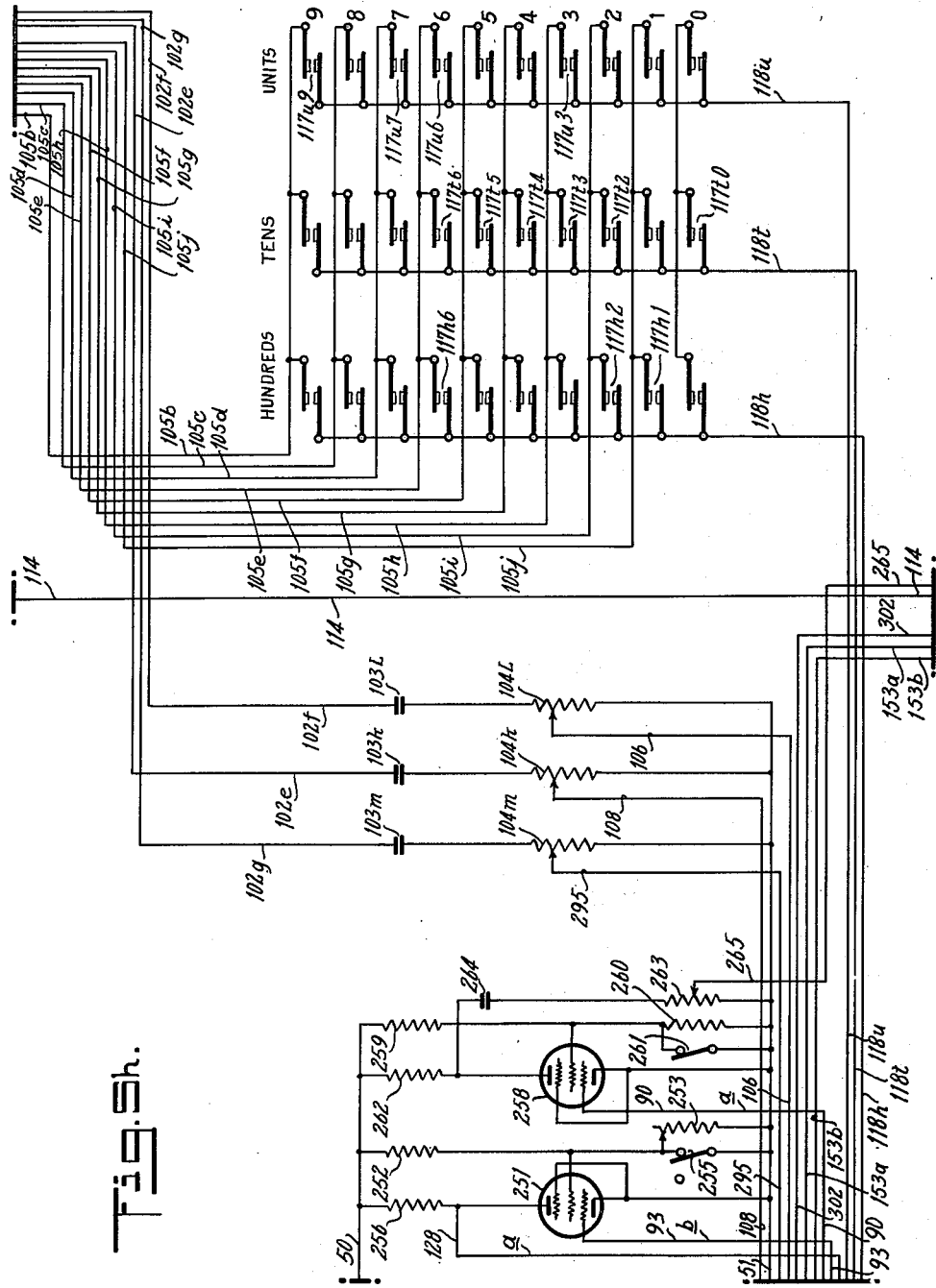

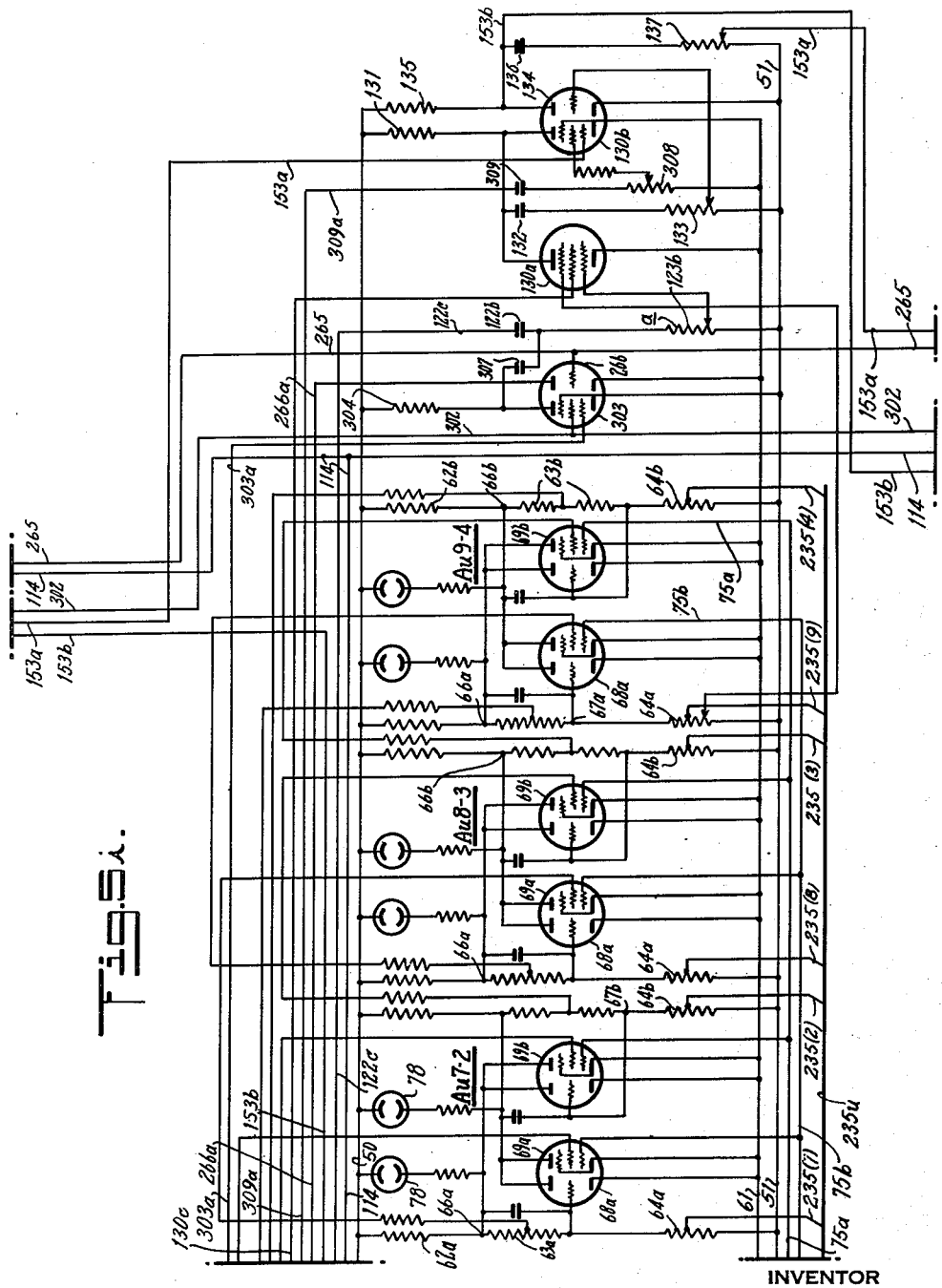

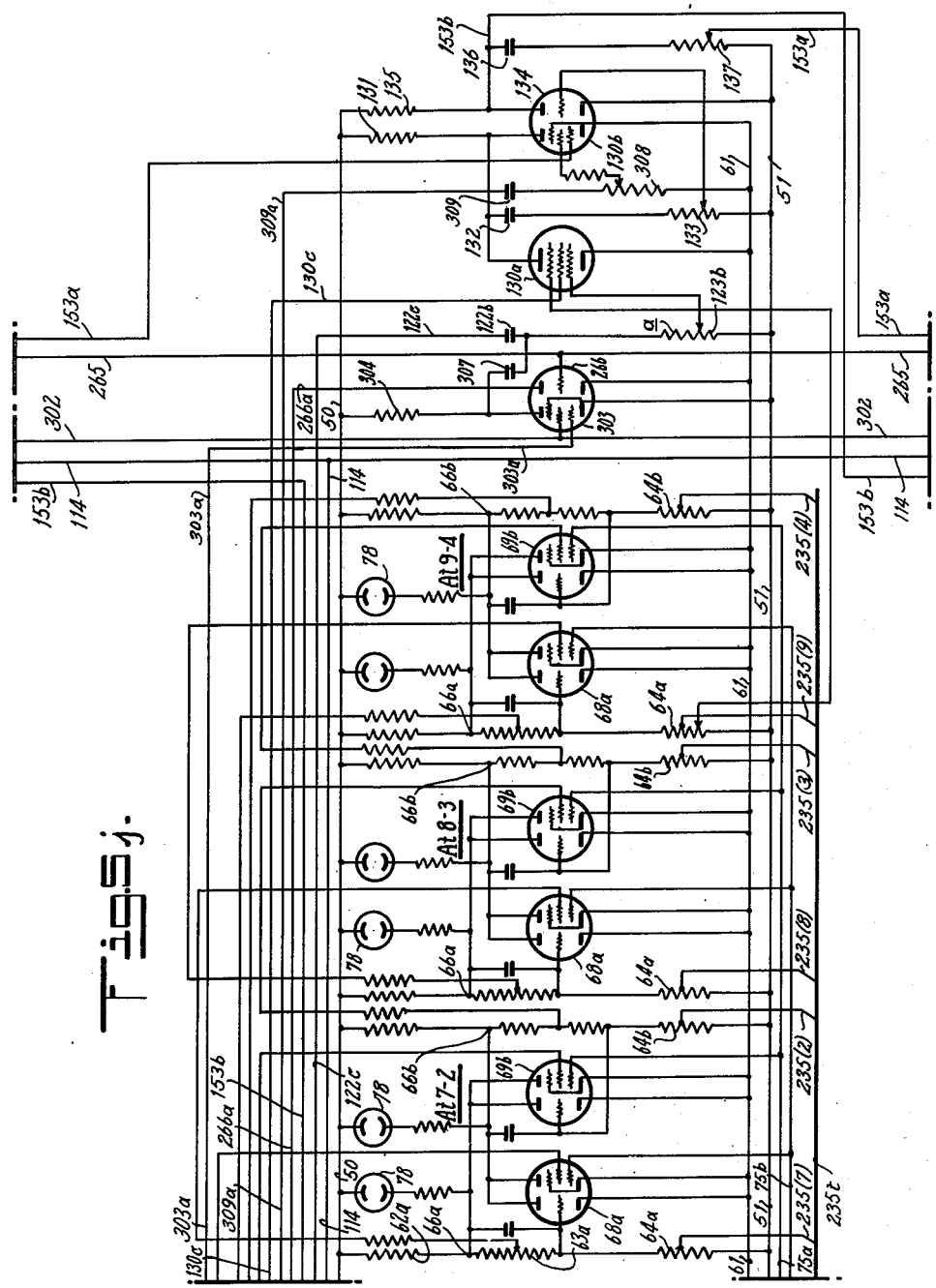

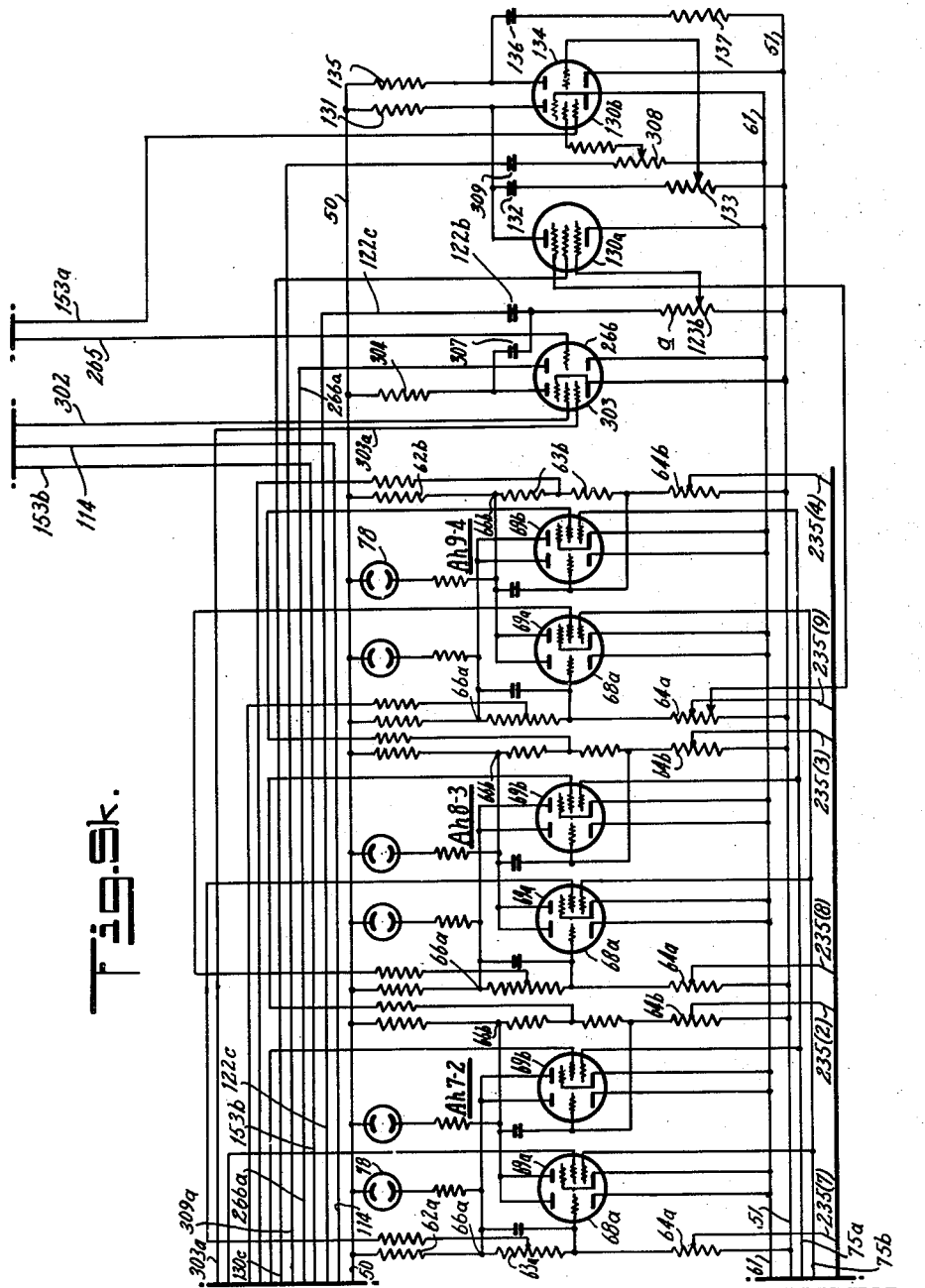

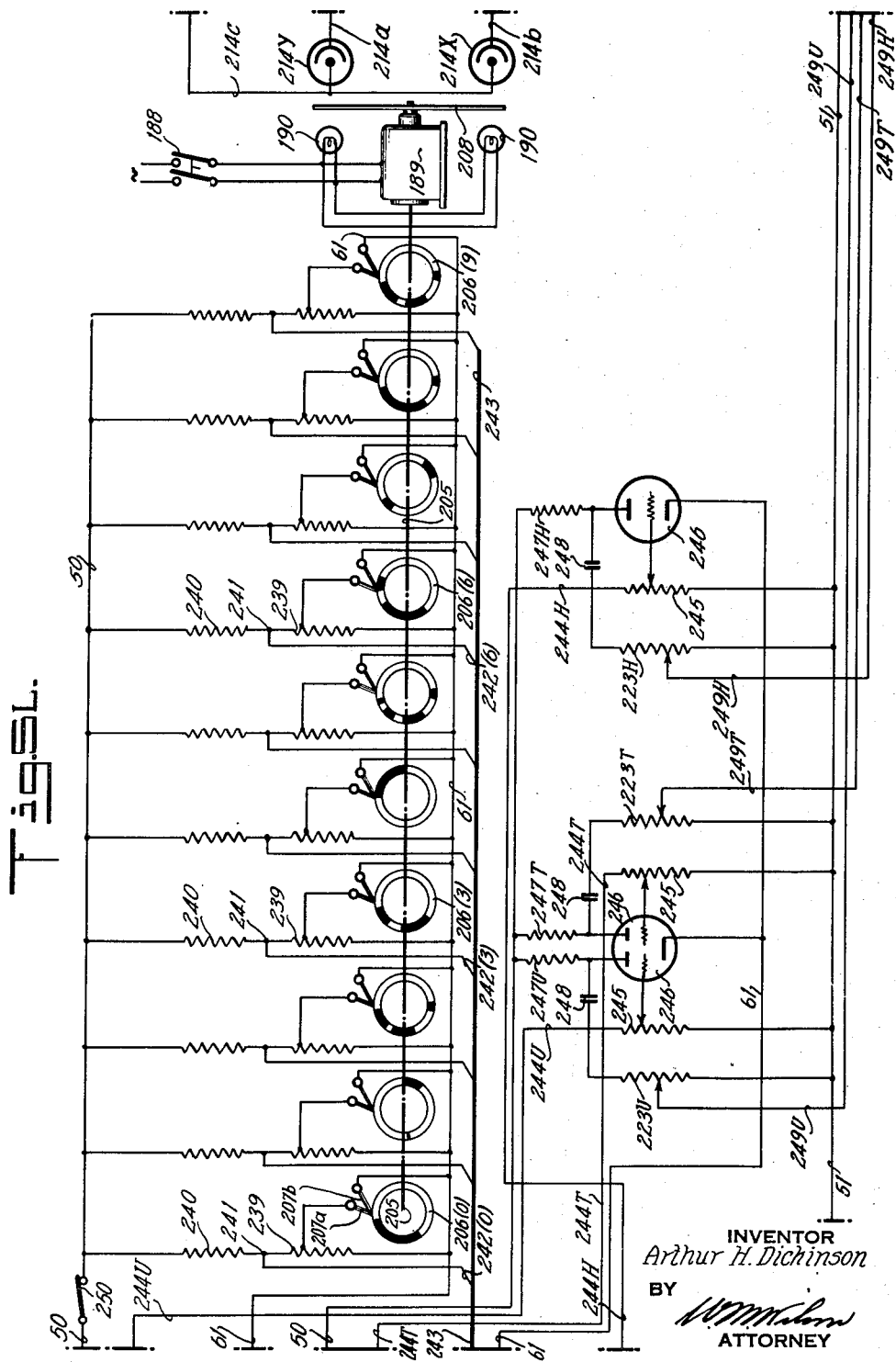

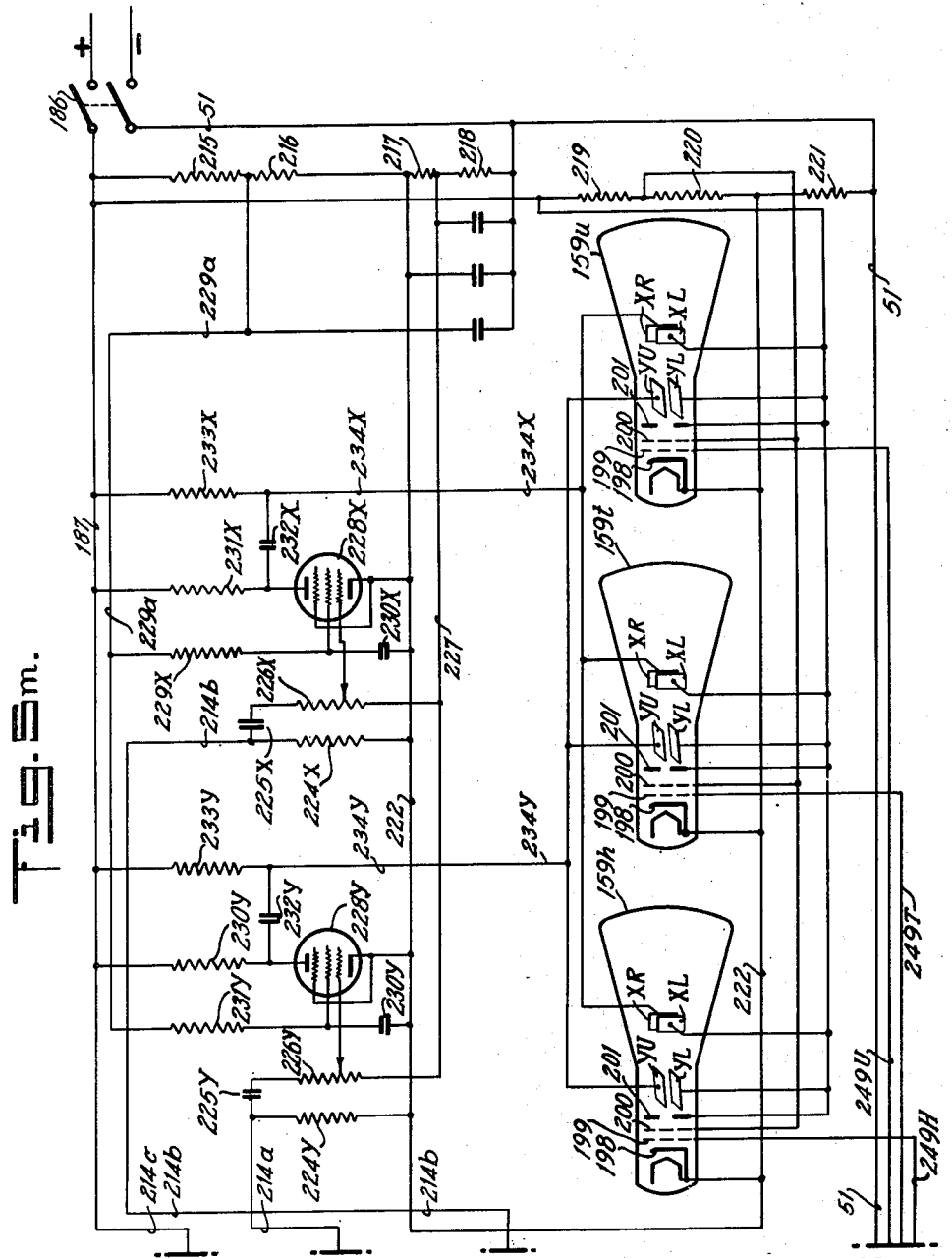

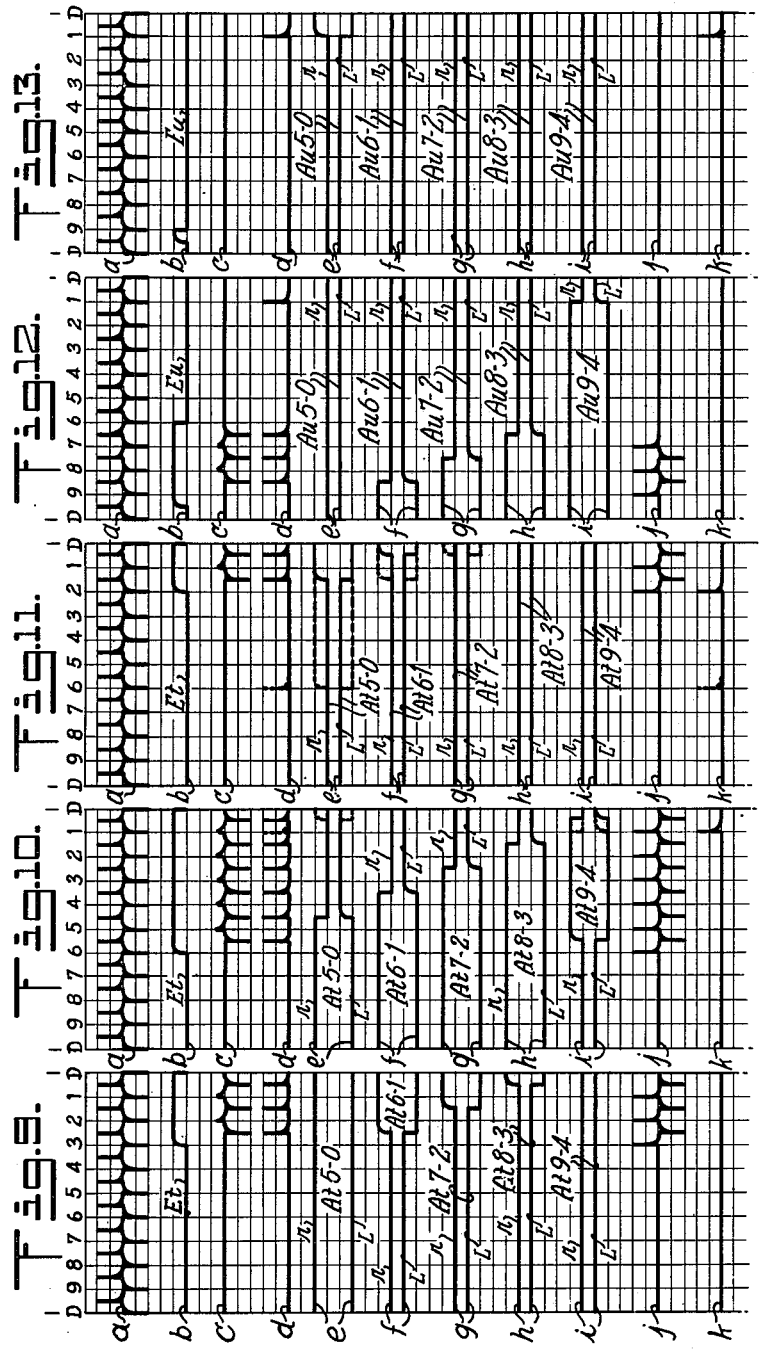

July 2, 1946.  A. H. DICKINSON  2,402,989
ACCUMULATING APPARATUS
Filed May 23, 1941  22 Sheets-Sheet 17
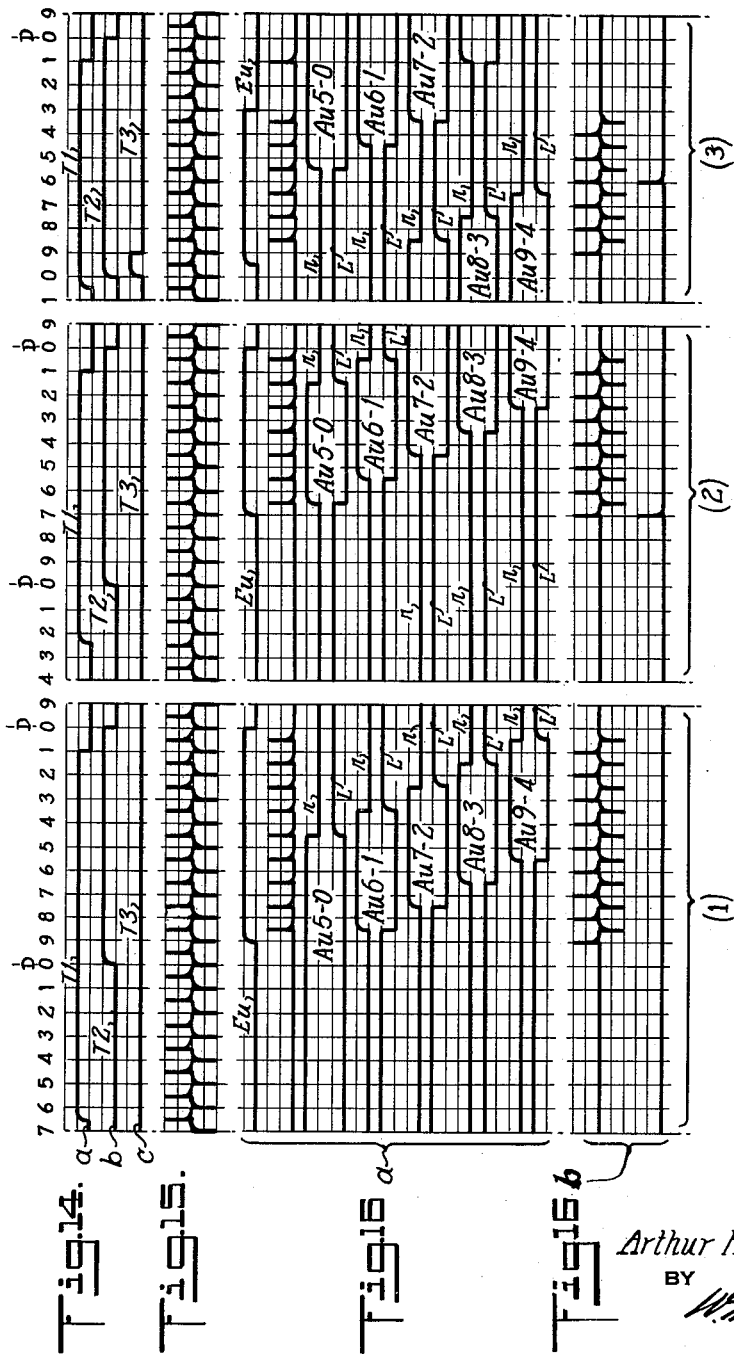
INVENTOR
Arthur H. Dickinson
BY
ATTORNEY July 2, 1946.  A. H. DICKINSON  2,402,989
ACCUMULATING APPARATUS
Filed May 23, 1941   22 Sheets-Sheet 18
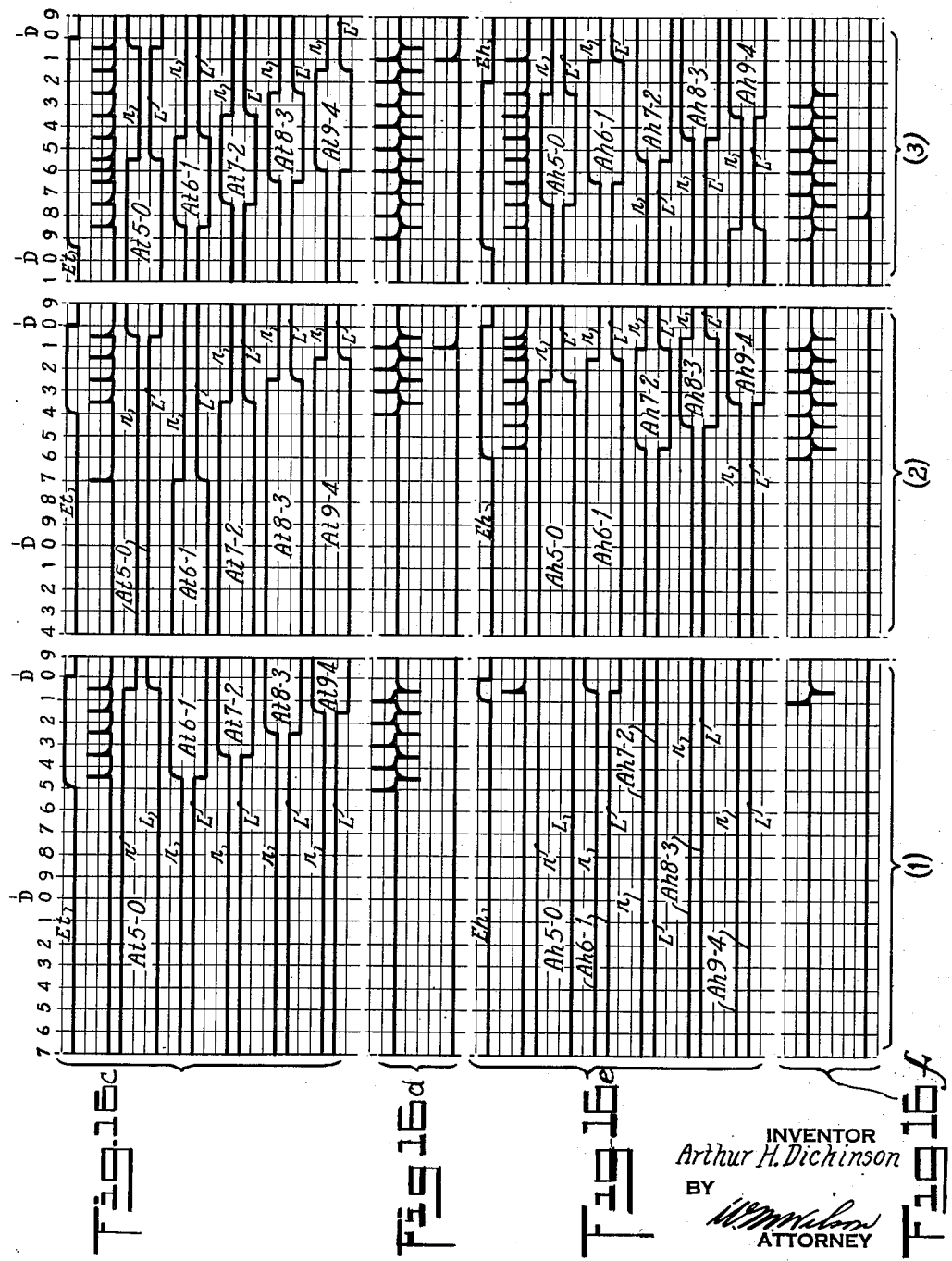

July 2, 1946.   A. H. DICKINSON   2,402,989
ACCUMULATING APPARATUS
Filed May 23, 1941   22 Sheets-Sheet 19
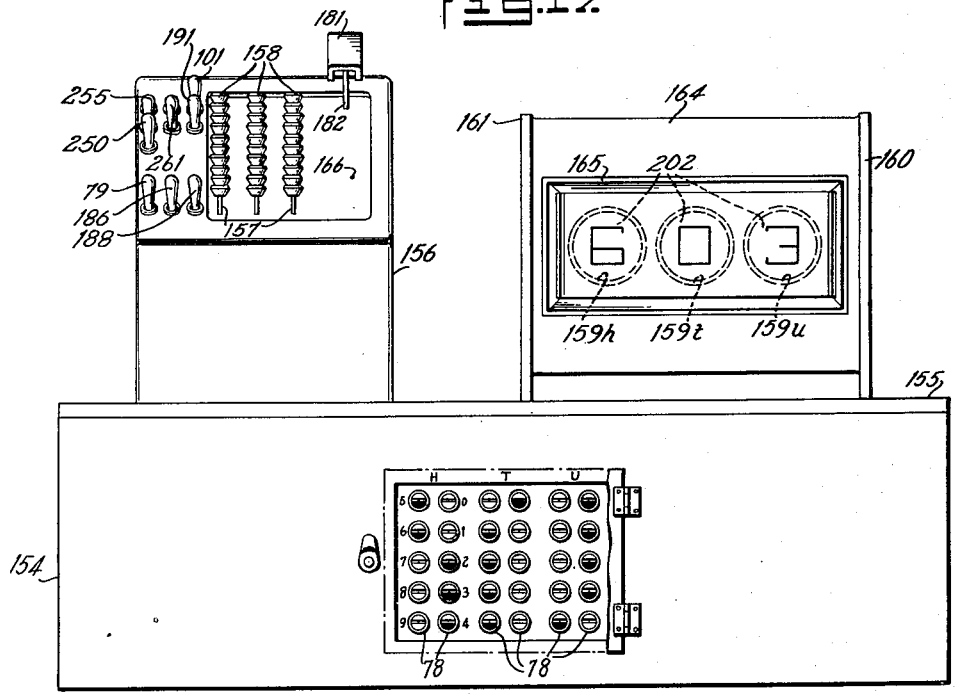
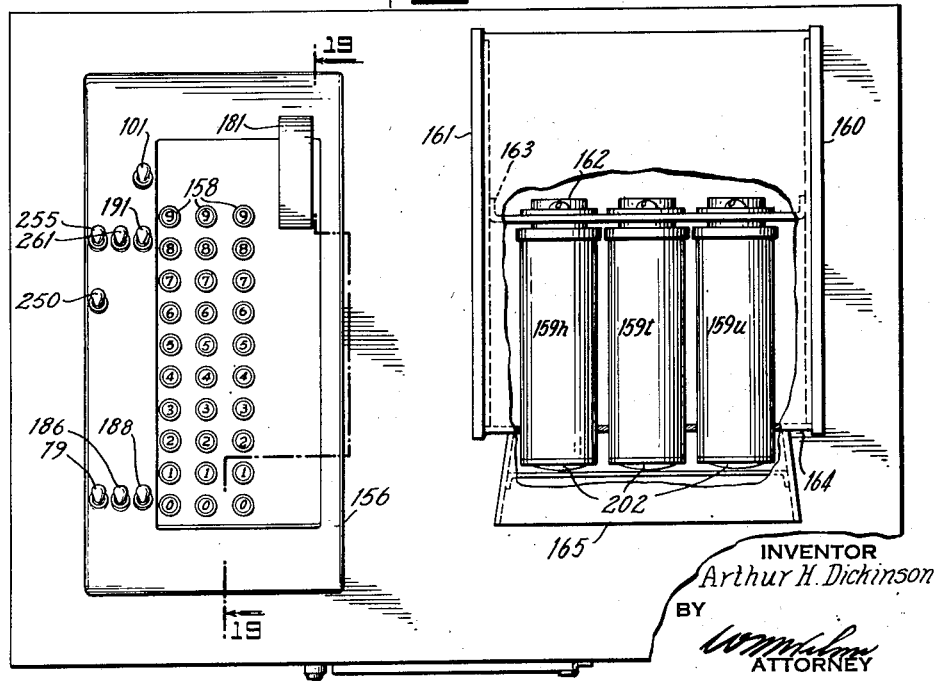
INVENTOR
Arthur H. Dickinson
BY
ATTORNEY July 2, 1946.  A. H. DICKINSON  2,402,989
ACCUMULATING APPARATUS
Filed May 23, 1941   22 Sheets-Sheet 20
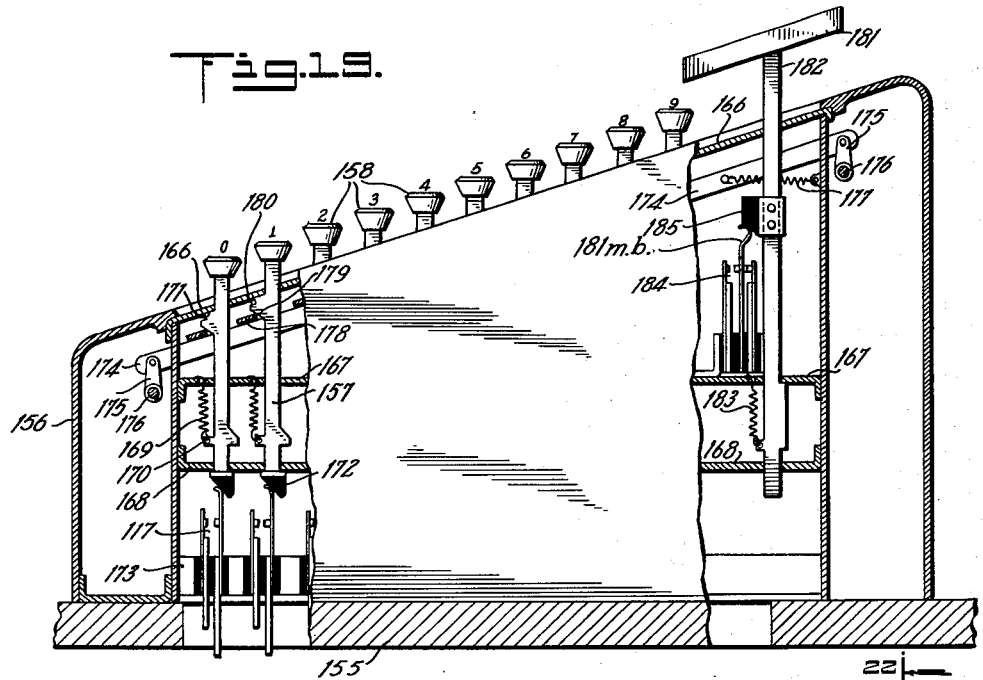
INVENTOR
Arthur H. Dickinson
BY
ATTORNEY

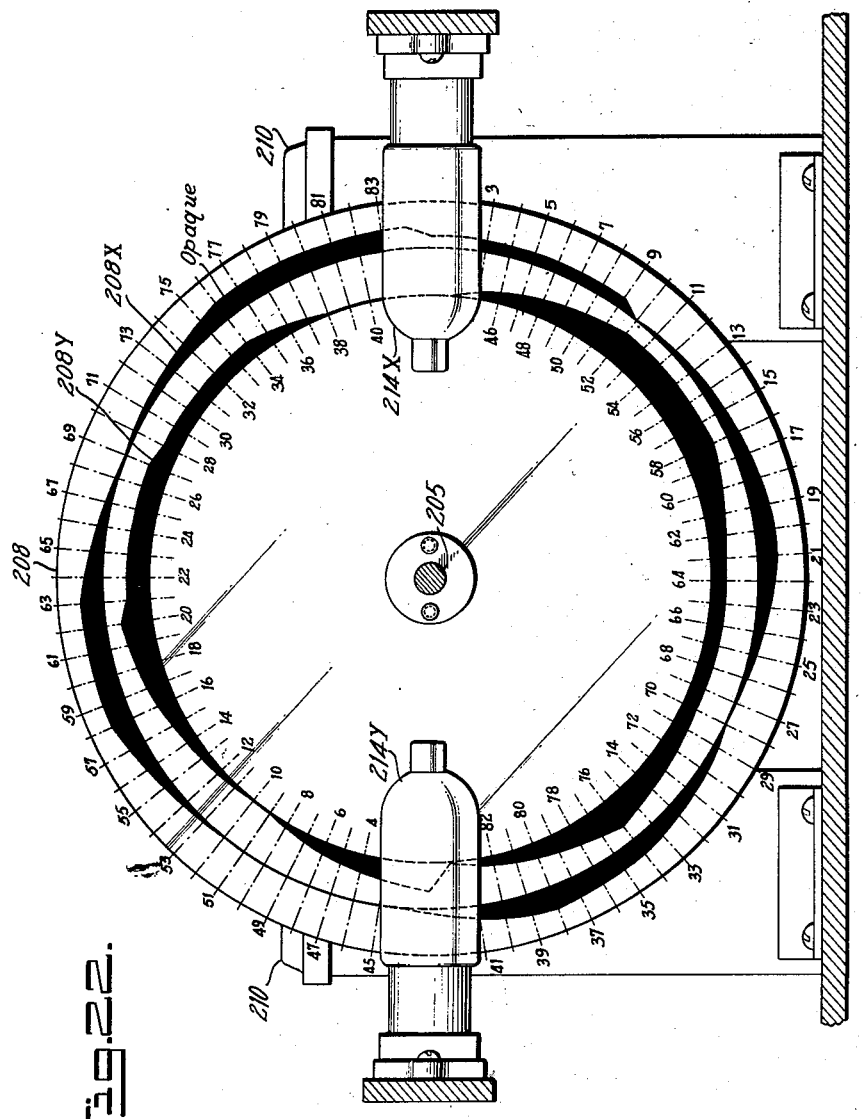

July 2, 1946.  A. H. DICKINSON  2,402,989
ACCUMULATING APPARATUS
Filed May 23, 1941   22 Sheets-Sheet 22
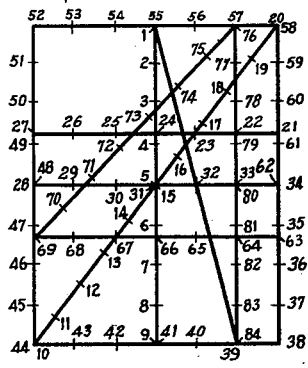
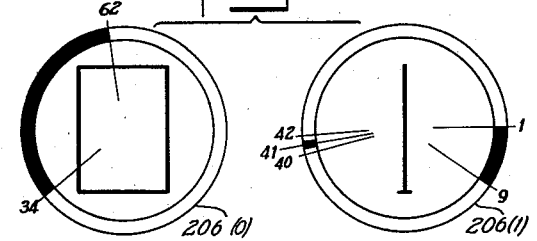
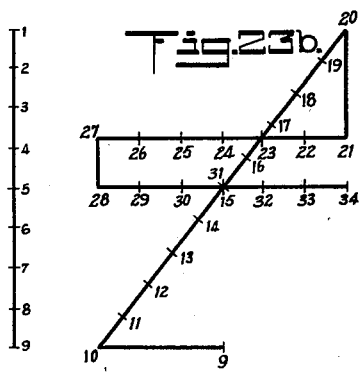
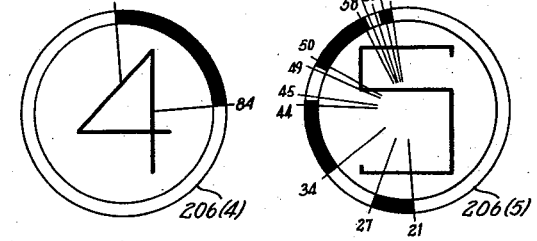
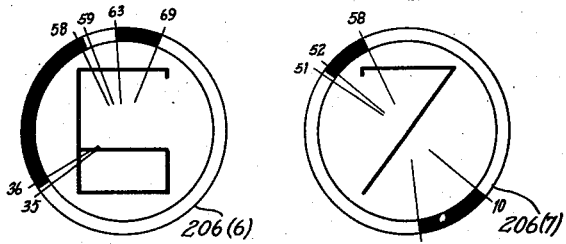
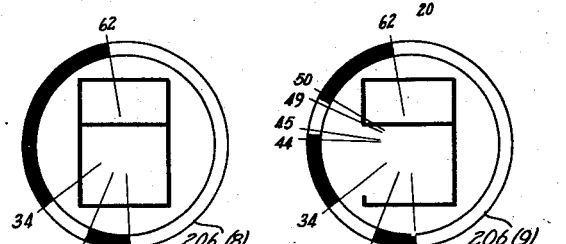
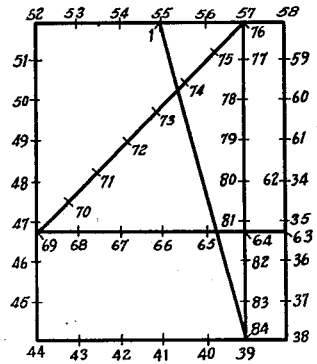
INVENTOR
Arthur H. Dickinson
BY
ATTORNEY Patented July 2, 1946

2,402,989

UNITED STATES PATENT OFFICE 2,402,989

ACCUMULATING APPARATUS

Arthur H. Dickinson, Scarsdale, N. Y., assignor to International Business Machines Corporation, New York, N. Y., a corporation of New York Application May 23, 1941, Serial No. 394,883

51 Claims. (Cl. 235—61)

The present invention aims at improvements over the electronic accumulators of my copending applications Ser. No. 314,767, filed Jan. 20, 1940, and Ser. No. 394,881, filed May 23, 1941. In the first of these, each accumulator order has a single electronic device to manifest different digits, while, in the second, the order has a plurality of electronic devices, each separately manifesting a different one of the digits.

An object of the instant invention is to provide an electronic accumulator or the like in which each order has electronic devices serving in combination, in accordance with a suitable combinational code, to manifest the different digits.

An object of the invention is, moreover, to provide an order of electronic devices less in number than the number of digits which may be manifested thereby and which, singly and in combination, afford combinational codal manifestations of the digits.

An object of the invention is, further, to provide an order of electronic devices to receive selected digit entries and manifest the digital value accumulation of such entries by producing combinational codal patterns of different digits selectively.

Another object is to provide a novel method, for producing, in an accumulator, an electronic representation, indicative of different digits entered therein or of the cumulative value of said digits.

Still another object is to provide an improved form of mechanically inertialess accumulator utilizing a number of mechanically inertialess elements, which number is half the number representative of the base of the notation employed.

A further object is to provide an electronic digit manifesting device which comprises a plurality of discrete electronic means, which produce distinctive combinational codal patterns of electronic manifestations representative, respectively, of digit values and means including entry control means for sequentially operating said plurality of discrete means to produce a combinational codal pattern representative of the cumulative value of entered digits.

Still another object is to provide a plurality of discrete electronic elements, a certain number thereof being conditioned in one manner and a certain number thereof in another manner, the pattern of the different kinds and numbers being indicative respectively of different digits, and means including entry control means controlling the entry of a digit by operating the plurality of discrete means, sequentially, during portions of a complete cycle, which portions are representative of an entry, to condition said plurality, in sequence, in one manner, and in sequence, in another manner, in proportion to the cycle portions, to thereby produce a pattern of different kinds and numbers indicative of the cumulative value of all digits entered.

Another object is to provide a series of cyclically, seqentially operable electronic elements, means controlling the sequential operation of each one of said series, in steps, in one manner, and again in steps in another manner, the total number of steps equalling the value of a digit entered, to thereby produce a combinational pattern of operated elements, representative of the digit entered.

A further object is to provide mechanically inertialess means, for producing or not producing, selectively, a plurality of luminous indications, composing combinational patterns, each pattern indicative of one of the digits of a chosen notation, and means including entry control means for controlling the operation of said inertialess means, in proportion to the values of digits to be entered, whereby luminous indications are produced, in a pattern indicative of the cumulative value of said digits.

Another object is to provide a plurality of electronic manifesting means, cyclically operable, and means including entry control means for operating said plurality of means, for portions of a cycle proportional, respectively, to the values of digits to be entered, to produce a combinational pattern of electronic manifestations, representative of the digit entered.

Still another object is to provide a novel accumulator comprising a plurality of electronic means connected in a closed network, control means for adjusting the electronic conditions within said network to any one of an equal plurality of different combinational patterns of at least two separate conditions, and means controlling said adjusting means, for periods of time proportional to digits to be entered, to thereby adjust said conditions to a certain pattern, representative of the cumulative value of digits entered.

A further object is to provide in an electronic accumulator, means for additively and subtractively receiving entries of multidenominational amounts, and means responsive to electron flow for electronically combining and statically producing a certain combinational pattern composed of separate electronic manifestations, said pattern being indicative of the desired total of said amounts.

Another object is to provide a novel accumulator comprising a plurality of discrete electronic circuits which may be sequentially operated, and means including entry control means for said circuits, controlled by a manifestation representative of a digit to be entered, for causing sequential, repeated, cyclic operation of said plurality of circuits, for periods proportional to and representative of said digit, to produce a desired combinational pattern of electronic manifestations representative of said digit.

A further object is to provide in an electronic accumulator, means for, selectively, additively or subtractively entering multidenominational quantities, and means comprising a plurality of discrete electronic elements, controlled by said selective means, for producing combinational patterns of electronic manifestations, each representative of an integer of an entered quantity.

Still another object is to provide a novel electronic accumulator comprising a series of pairs of electronic element portions, alternately operable in sequence to an "on" and then to an "off" condition, or vice versa, successive alternate element portions conditioning one other element portion, only, for reversal from "off" to "on" condition, or vice versa, and means increasing the number of "on" conditions of certain ones of said portions and similarly increasing the "off" conditions of the companion portions, in proportion to the values of digits entered.

Still another object is to provide a novel electronic accumulator comprising electronic manifesting means, means controlling the number of pulses applied to said manifesting means in proportion to the value of a digit to be entered, said manifesting means producing a definite combinational pattern of electrical manifestations indicative of the number of pulses applied thereto.

Another object is to provide an electronic accumulator comprising a double ring of sequentially operable electronic devices, one ring sequentially operable to an increasing series of "on" conditions and the other simultaneously to a decreasing series of "on" conditions, to produce a pattern of "on" and "off" conditions, means including entry control means, controlled by a manifestation representative of a digit to be entered, for sequentially operating a number of said devices, said number being proportional to the values of digits to be entered to thereby produce a pattern of "on" and "off" conditions within said rings, representative of said digit, said means including entry control means being controlled by successive manifestations, each representative of a different digit, for increasing the series of "on" conditions in one ring and decreasing the series of "on" conditions in the other ring, in proportion to the summation of digits entered, whereby a pattern of "on" and "off" conditions is finally produced, representative of the cumulative value of all digits entered.

Still another object is to provide a completely novel method of producing carry, at any time in a cycle.

Another object is to provide a completely novel method of producing a carry upon a carry, at any time in a cycle.

A further object is to provide in an electronic accumulator comprising a plurality of electronic elements and including entry control means, means controlled by said entry control means producing a plurality of advancing pulses and a plurality of carry control pulses, means including said entry control means controlling the patterns of electrical manifestations of said elements, in proportion to the number of advancing pulses applied to said elements and carry means controlled by manifestations of a plurality of said elements, indicative of the highest digit of a chosen notation, and by said carry control pulses, for producing a carry.

Another object is to provide in a novel electronic cyclically operable accumulator comprising a plurality of electronic elements, means including entry control means producing a plurality of advancing pulses to control sequential operation of said elements, and an equal plurality of carry control pulses, said carry pulses being interspersed between and respectively, cyclically preceding said individual advancing pulses, and means controlled by a manifestation of said elements, indicative of the highest digit of a chosen notation, and by said carry pulses, to produce a carry effect.

Still another object is to provide in a cyclically operable accumulator including a plurality of orders, means producing an electronic indication of the respective digits entered in each order, means producing a carry effect in a lower order, at any cyclical time, upon passage of said order from the highest to the lowest digit of a chosen notation, said carry effect advancing the next higher order by a unit digit amount, during digit entry therein.

A further object is to provide in a novel electronic accumulator including a plurality of electronic elements, means producing a plurality of advancing pulses, said producing means, when conditioned for adding, producing a plurality of carry control pulses, less in number than said first plurality, means producing a single carry control pulse, and subtraction control means rendering said last means inoperative.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a basic wiring diagram of a novel trigger circuit employed in the invention.

Fig. 2 is a wiring diagram of a modification of the circuit of Fig. 1.

Fig. 3 is a basic wiring diagram of the novel electronic commutator employed in the invention.

Fig. 4 part *a* is a diagrammatic illustration on an enlarged scale of pulses employed for controlling elements of the electronic commutator shown in Fig. 3 and Fig. 4 parts *b*, *c*, and *d* are diagrammatic illustrations on an enlarged scale of voltage conditions resulting from the operation of the elements comprising said commutator.

Fig. 5 is a diagrammatic illustration of the grouping and arrangement of the figures which assembled together constitute a complete wiring diagram of the invention.

Figs. 5a to 5m, inclusive, grouped together and arranged as shown in Fig. 5, comprise the complete wiring diagram of the invention.

Fig. 6 parts *a* and *b* are diagrammatic illustrations of wave forms produced in the output of an oscillator utilized in the invention, and parts *c* and *d* illustrate such wave forms, respectively, after conversion to peaked pulses.

second element portion, which is now "on," conditions a third corresponding element portion and, when the following advancing pulse occurs, this third element portion is switched on. Attention is directed to the fact that the corresponding portions of the first and second elements remain in "on" status, after performing their conditioning functions. The foregoing is a general explanation of the operation of the commutator when two advancing pulses cause the "on" circuit position to advance by two. Were advancing pulses no longer applied, all three element portions would stay "on" and their companion element portions would remain "off." When, however, the advancing pulses were again applied, stepping operations would again occur and a fourth, etc., corresponding element portion would be turned on, in sequence. Should the total number of elements be five, that portion of the first element which is the companion or opposite one to that of the first element originally assumed as being "on," would be conditioned, under control of the last or fifth portion.

More specifically, assume that all $r$ portions, of a total of five elements, are now "on" as a result of the operation just described. It is seen that all L portions are now "off." Since the fifth $r$ portion, in being "on," now conditions the L portion of the first element, the latter would become switched on by the sixth advancing pulse. Thereafter each L portion of the remaining four elements is switched on in succession (with each $r$ companion portion being switched off) under control of advancing pulses. After the tenth pulse, all L portions of the total of five elements are now "on" and all $r$ portions are now "off." The fifth L portion, in being "on," now conditions the $r$ portion of the first element which would become switched on by the eleventh advancing pulse and thereafter the commutator would repeat its full cycle of operation. From the above, it is seen, that the elements are so interrelated and so intercontrol one another that upon the application of advancing pulses there is a step-by-step operation of the element portions to first an "on" status and then a step-by-step conditioning to an "off" status. Each element portion is so operated in a definite sequential order, and when the final element portion of the series is operated, as above, one cycle of the commutator is completed and a new cycle of sequential events is initiated.

The principle of operation of the electronic commutator may be understood by reference to Fig. 3 which illustrates a basic circuit of three elements or six portions, the elements being designated S1, S2, and S3, it being understood that the number of elements can be chosen as desired. Portions of the circuit of Fig. 3 which correspond in character and function to those of the circuit, explained in connection with Fig. 2, are given the same reference characters.

Referring to Fig. 3 and assuming that S1$r$, namely, the right hand portion of element S1 is "on" and S2$r$ and S3$r$ are "off," the manner in which the latter two element portions are turned on in succession will now be described. It is also assumed that pulses of the character shown in Fig. 4$a$, for example, are applied to resistance 72 (Fig. 3).

The screen of tube 69$b$ (S2$r$) is connected to the midpoint 77$b$ of resistor 63$b$ (S1$r$) through a screen current limiting resistor 74$b$. By virtue of this circuit arrangement, the screen voltage of tube 69$b$ (S2$r$) is determined by that of point 77$b$ and, if S1$r$ is "off," point 77$b$ is near the potential of line 61, whereas, if S1$r$ is "on," point 77$b$ is at a high potential with respect to line 61. When the screen voltage of tube 69$b$ (S2$r$) is low, a reduction of its negative grid bias has no effect on the tube. That is, a low screen voltage of tube 69$b$ (S2$r$) serves as a cut-off for the tube. On the other hand, when the screen voltage of tube 69$b$ (S2$r$) is high, a reduction of its negative grid bias causes increased current flow therethrough. For the normal grid bias, however, applied to the grid of tube 69$b$ (S2$r$), a rise in its screen voltage has no effect on current flow through the tube.

Assuming, as stated above, that S1$r$ is "on," point 66$b$ (S1$r$) and the screen of tube 69$b$ (S2$r$) are at a high potential, so that S1$r$ conditions S2$r$, in order that it may be turned on when an advancing pulse is applied to the grid of its tube 69$b$. An advancing pulse (Fig. 4$a$), applied to resistor 72, is effective via line 75, to reduce the negative grid bias of tube 69$b$ (S2$r$) increasing current flow therethrough and thereby tripping S2$r$ to an "on" status (section 2). The rise in potential of point 66$b$ (S2$r$), coinciding with an advancing pulse, is indicated in Fig. 4$c$. Comparison of this figure with Fig. 4$b$ illustrates that both S1$r$ and S2$r$ are "on" at this time while S1L and S2L are "off."

If no further pulses are applied to resistance 72, S1$r$ and S2$r$ remain "on" while S3$r$ remains "off." This would be indicated by the fact that the glow tubes 78$b$ (S1$r$ and S2$r$) would be ignited while glow tube 78$b$ (S3$r$) would be dark.

If it be assumed, however, that advancing pulses are continuously applied to resistance 72, as indicated in Fig. 4$a$, the commutator of Fig. 3 will be continuously operated. To continue the above description, with S2$r$ "on," there is a conditioning of S3$r$ so that the next advancing pulse applied to resistance 72 is effective to trip on S3$r$. The resultant rise in potential of point 66$b$ (S3$r$) coinciding with an advancing pulse is indicated in Fig. 4$d$. It is seen, from parts $b$, $c$, and $d$ of Fig. 4 that S1$r$, S2$r$, and S3$r$ are "on" at this time.

Since all the element portions S1$r$, S2$r$, and S3$r$ are now "on," one terminating point in the operation of the electronic commutator has now been reached. The screen of tube 69$a$ of the left hand portion of S1, namely, S1L is connected to the midpoint 77$b$ of resistor 63$b$ (S3$r$) through a screen current limiting resistor 74$b$. By virtue of this connection the screen voltage of tube 69$a$ (S1L) is determined by that of point 77$b$ (S3$r$). If S3$r$ is "off," point 77$b$ is near the potential of line 61, and, if S3$r$ is "on," point 77$b$ is at a high potential with respect to line 61, and the same applies to the screen voltage of tube 69$a$ (S1L). When the screen voltage of tube 69$a$ (S1L) is low, reduction of its negative grid bias has no effect. That is, a low screen voltage of tube 69$a$ (S1L) serves as a cut-off for the tube. On the other hand, when the screen voltage of tube 69$a$ (S1L) is high, a reduction of its negative grid bias causes increased current flow therethrough. For the normal bias applied to the grid of tube 69$a$ (S1L), a rise in its screen voltage has no effect on current flow through the tube.

Since S3$r$ is now "on," it conditions S1L so that the latter may be turned on when the succeeding advancing pulse appears on line 75. The manner in which S1L is turned on is similar to that in which S2$r$ and S3$r$ were turned on, as explained above. When such action occurs, point 66$a$ (S1L) rises in potential, as is shown in Fig. 4$b$. S1L, being "on," now conditions S2L so that the latter is tripped on upon an application of the succeeding advancing pulse to line 75. The manner in which S2L is turned on is similar to that in which S1L was tripped on, as just explained. The resultant rise in potential of point 66a (S2L) is shown in Fig. 4c. S2L, being "on," now conditions S3L so that the latter is switched on upon an application of the succeeding advancing pulse to line 75. The manner in which S3L is turned on is similar to that in which S1L and S2L were tripped on, as explained above. The resultant rise in potential of point 66a (S3L) is shown in Fig. 4d. As indicated by parts b, c, and d of Fig. 4, S1L, S2L and S3L are all now "on." Since this is now the case, the second terminating point of the electronic commutator has been reached. It is to be noted that the midscreen of tube 69b (S1r) is connected to the midpoint 77a of resistor 63a (S3L) through a screen current limiting resistor 74a. Accordingly, S3L, in being "on," conditions S1r so that the latter is turned on upon the application of a succeeding advancing pulse. The commutator now begins to repeat its full sequential operation, with the result that S1r, S2r, and S3r are tripped to "on" status in succession, as described in detail above.

It is now obvious that as long as advancing pulses are applied to the commutator circuit, the element portions S1r, S2r, S3r, S1L, etc., are turned on (and off) sequentially and independently of inductive or capacitative coupling. It is also seen that a given element portion cannot be turned on until its predecessor element portion is "on." With this circuit arrangement, step-by-step progression, from one element portion to the next, is positive in character. This electronic commutator is utilized in this invention as a means for sequentially producing timed, digit manifesting and control pulses and the same circuit is employed as the basic circuit for manifesting digits in the accumulator, these functions being described in detail in sections 5 and 7.

Further consideration of the commutator circuit of Fig. 3 indicates that advancing pulses, when applied to resistor 72, are effective via line 75 to concurrently reduce the negative grid bias of all tubes 69b, each comprising a part of element portions S1r, S2r, and S3r and of all tubes 69a, each comprising a part of element portions S1L, S2L and S3L. It will be appreciated, however, that a negative grid bias reduction of tubes 69a and 69b, due to an advancing pulse, can cause increased current flow, respectively, therethrough, only when the respective screen is at high potential, and such screen is at this potential only when a preceding, and usually a corresponding, element portion is "on." Assuming again that S1r is "on" and that S2r and S3r are "off," it follows that S1L is "off" and that S2L and S3L are "on." By virtue of the commutator circuit arrangement and under the conditions just assumed, the following conditions exist: (a) S1r, being "on," conditions S2r, (b) S2L bein "on" conditions S3L, (c) S3L being "on" conditions S1r and (d) S2r being "off," does not condition S3r, (e) S3r being "off" does not condition S1L, (f) S1L being "off" does not condition S2L. Since (d), (e) and (f) are true, a negative grid bias reduction of tubes 69b (S3r), 69a (S1L) and 69a (S2L) has no effect on the status of S3r, S1L and S2L, respectively. Since (b) and (c) are true, a grid bias reduction of tube 69a (S3L) does not alter the "on" status of S3L, and, likewise, a grid bias reduction of tube 69b (S1r) does not alter the "on" status of S1r. Accordingly, since (a) is true, and even though an advancing pulse is applied to the grids of all tubes 69a and 69b, to thereby reduce their bias, such pulse is effective to produce a change in status only in tube 69b (S2r) with the result that S2r is tripped to "on" status, S2r being the sole element portion affected by said pulse.

The foregoing description, of course, relates to the commutator, when, in its normal operation, it is momentarily at rest, with the various element portions in a particular combinational arrangement of "on" and "off" conditions. Analysis of all other possible combinational arrangements which the element portions may have when the commutator is momentarily at rest during its sequential operation, would lead to the conclusion, that, as in the case of the particular example given above, irrespective of the "on" and "off" status of all element portions, an advancing pulse is effective, in only one portion, (even though it is applied to every portion) to turn this one portion to an "on" status. With this circuit arrangement, advancing pulses from a common source are utilized to trip the element portions to an "on" (and "off") status in succession. It is to be noted that no second source of pulses is provided to trip element portions to an "off" status, since it will be appreciated, that upon tripping on a given portion, its companion portion is tripped off. Therefore, the advancing pulses have the dual function of turning element portions to both "on" and "off" status.

Assuming again, that S1r is "on," then the screen of tube 69b (S2r) is at a high potential and an advancing pulse, which reduces its grid bias, causes increased current flow therethrough, and S2r is tripped on, as is now understood. As such action occurs, point 77b (S2r) rises in potential as does also the screen voltage of tube 69b (S3r) connected to said point. It would therefore appear, at first blush, that the advancing pulse which trips on S2r, might, by virtue of the resulting screen voltage rise of tube 69b (S3r), also cause S3r to trip to an "on" status. This rise in potential of point 77b (S2r), however, is not instantaneous, but occurs exponentially (see Fig. 4c) so that an interval of time elapses from the instant of pulse application until point 77b (S2r) reaches its maximum high potential and the same applies also to the screen voltage rise of tube 69b (S3r). This time interval exceeds the duration of an advancing pulse, so that said pulse ceases to be effective by the time that the screen of tube 69b (S3r) reaches its maximum voltage. Under these circumstances, tube 69b (S3r) experiences concurrently an increase of negative grid bias (because the amplitude of the advancing pulse is decreasing from its positive peak value) and an increase of positive screen voltage, which two conditions oppose and prevent any substantial current flow through the pentode. It is seen, therefore, that only one element is tripped on for each advancing pulse. A slight current flow may occur in a tube of another element, but its magnitude is insufficient to trip S3r to an "on" status.

4. Oscillator and amplifiers

Pulses are employed in this invention for various purposes, such as for operating the electronic commutator, for controlling entries into the electronic accumulator, and for many other control purposes. Preferably, the source of such pulses is an oscillator whose output is amplified for these purposes. Since none of the circuits in this invention depend for their operation upon fre- Referring to Fig. 1, voltage, of the polarity indicated, is supplied to lines 50 and 51 and to a voltage divider consisting of resistances 56 and 57. Voltage is also supplied by means of this divider to line 61, its potential being positive with respect to line 51.

The trigger circuit comprises two impedance networks or portions. One network or portion includes resistances 62a, 63a and 64a, resistance 63a being shunted by coupling condenser 65a. Vacuum tubes 68b and 69b are connected in parallel between point 66a, which is the junction of resistances 62a and 63a, and line 61. The second impedance network or portion consists of resistances 62b, 63b, and 64b, resistance 63b being shunted by coupling condenser 65b. The vacuum tubes 68a and 69a are connected in parallel between point 66b, which is the junction of resistances 62b and 63b, and line 61. Resistances 62a and 62b are equal in value as are resistances 63a and 63b, and resistances 64a and 64b. The capacities of condensers 65a and 65b are also equal. In actual practice an efficient combination was found when the values of resistances 62a and 64a were each approximately one-third the value of resistance 63a. A suitable value for the capacity of the condenser 65a is of the order of a few hundred micromicrofarads.

Assuming that the grid of tube 68a is substantially at the potential of line 61, its grid bias will be substantially zero. With resistance 62b properly chosen, tube 68a has an impedance relatively low, as compared to that of 62b, and its anode, and point 66b to which the anode is connected, will have a voltage which is not much greater than that of line 61, with large current flow through 68a. With resistances 63b and 64b properly chosen, the potential drop across 63b is great enough to maintain point 67b and hence the grid of tube 68b, negative with respect to line 61. With tube 68b negatively biased, it has an impedance greater than that of resistance 62a. Hence the anode of tube 68b, and point 66a, to which the anode is connected, are at a high enough potential so that the voltage drop across resistance 63a will not force the potential of point 67a below that of line 61. The foregoing describes one condition of stability in which tube 68a has a large current flow therethrough and tube 68b is at cut-off, hence with no current flow therethrough, and point 66a is at a higher potential, with respect to lines 61 and 51, than is point 66b. The manner of switching the trigger circuit to the other condition of stability, is as follows.

Pentodes 69a and 69b may be employed for shifting the trigger circuit from one condition of stability to the reverse one. The screen grid (hereinafter designated as a screen) of tube 69a is connected to a point on a voltage divider consisting of resistors 70a and 71a. The potential of this point being positive, with respect to line 61, the screen voltage of tube 69a is positive with respect to its cathode. The screen of tube 69b is connected to a point on a voltage divider consisting of resistors 70b and 71b. The voltage of this point is likewise positive with respect to line 61, so that the screen potential of tube 69b is positive with respect to its cathode. The control grid (hereinafter designated as a grid) of pentode 69a is connected to the control grid of 69b and both are connected to a resistance 72, to which positive pulses are applied, in a manner described later. In the absence of any pulse on resistor 72, the negative grid bias of tubes 69a and 69b is the potential difference between lines 61 and 51 and is sufficiently great to maintain tubes 69a and 69b at cut-off.

When a positive pulse is applied to resistance 72, the negative bias of the grids of tubes 69a and 69b is reduced, but since the anode of tube 69a is directly connected to that of tube 68a and the plate voltage of tube 68a and point 66b is very low, this bias reduction of tube 69a is ineffective to increase current flow through tube 69a and thus has no effect on the trigger circuit. The anode of tube 69b, however, is directly connected to that of tube 68b and to point 66a, and since the potential of this point, with respect to line 61, is relatively high, the simultaneous negative bias reduction of tube 69b causes a current flow as follows: From line 50, resistor 62a, tube 69b, line 61, resistance 57 to line 51, thus causing point 66a to suddenly drop in potential producing a negative pulse. This pulse is fed through condenser 65a to the grid of tube 68a, effecting a sudden increase in the negative grid bias thereof, and reducing current flow through tube 68a and resistance 62b. Point 66b, accordingly, rises in potential, with respect to line 61, to produce a positive pulse which is fed through condenser 65b to the grid of tube 68b, changing its grid bias to substantially zero. Since, as just described, the potential of point 66b has now risen and that of point 66a has now dropped, tubes 68a and 68b assume a condition of stability which is the reverse of that originally described, namely, tube 68a is now at cut-off while tube 68b passes a large amount of current. The new status of the trigger circuit is maintained until another positive pulse is applied to resistance 72. When this occurs, the resulting negative grid bias reduction of pentode 69b is ineffective while that of tube 69a is effective to increase current flow therethrough, and the trigger circuit is returned to the condition of stability originally described.

It may be noted that to successfully achieve the operations as described above, the pulses applied to the grids of pentodes 69a and 69b should be of steep wave form. Preferably the RC product of the value of resistance 72 and the value of the capacity of any condenser associated therewith should not exceed one-fifth the RC product of resistance 63a and condenser 65a. It should also be noted that negative pulses applied to the grids of tubes 69a and 69b are ineffective to produce the shifting action explained above.

In the foregoing description, it is assumed that switches 73a and 73b are in open position, as shown. The closure of switch 73a, shunts out a portion of resistance 71a, thus reducing the screen potential of tube 69a to substantially that of line 61. Assuming that the condition of stability is such that point 66b is at a high potential, such screen voltage reduction prevents any negative grid bias reduction of tube 69a from being effective in bringing about increased current flow therethrough. Therefore, until switch 73a is opened, successive applications of positive pulses to resistance 72 are ineffective to change the status of the trigger circuit from a condition in which points 66b and 66a are at high and low potentials, respectively.

Similarly, the closure of switch 73b shunts out a portion of resistance 71b, thus reducing the screen potential of tube 69b to substantially that of line 61. Such screen voltage reduction, when point 66a is at high potential, prevents any negative grid bias reduction of tube 69b from being effective in bringing about increased current flow therethrough. Therefore, until switch 73b is opened, successive applications of positive pulses to resistance 72 are ineffective to change the status of the trigger circuit from a condition in which points 66a and 66b are at high and low potentials, respectively. Switches 73a and 73b, therefore, comprise parts of selection means whereby selectivity in operation is obtained.

The condition of the trigger circuit may be determined by observation of glow discharge (neon) tubes 78a and 78b, which are connected, respectively, in series with current limiting resistors, between line 50 and points 66b and 66a. When point 66a is at a high potential with respect to line 61, the difference in voltage between it and line 50 is insufficient to ignite discharge tube 78b. When point 66a, however, is at a low potential (point 66b at high potential), the difference in voltage is great enough to cause neon tube 78b to fire. When point 66b is at a high potential, the difference in voltage between it and line 50 is insufficient to ignite discharge tube 78a. When point 66b, however, is at a low potential (point 66a at high potential), the difference in voltage is great enough to cause neon tube 78a to fire. Hence, the ignition of either neon tube 78a or 78b indicates, respectively, that point 66a or 66b is at high potential.

The foregoing has described a trigger circuit in which vacuum tubes and electrical elements are so interconnected and operated as to produce alternate conditions of stability. The triggering pulses are derived from a common source and are applied to two points of the circuit. Pulses, simultaneously applied, are effective alternately only, in two branches of the circuit and cause it to shift back and forth from one condition of stability to another. The manner in which the screens of pentodes are employed to permit triggering impulses to be selectively effective for controlling sequential operations was also described.

That portion of the circuit of Fig. 1, within the broken line enclosure finds extensive use in various portions of the complete circuit of the electronic accumulator. For purposes of simplicity, this enclosed portion will be hereinafter termed an element and it will also be understood that when points 66b and 66a (each of which is related to one of the two portions comprising the element) are at high and low potentials, respectively, with respect to lines 61 and 51, the right element portion is in an "on" status (left element portion "off") and that when the potentials of points 66b and 66a are low and high, respectively, with respect to lines 61 and 51, the left element portion is in an "on" status (right element portion off). The voltages which exist at points of the triggering circuit such as 66b and 66a, and which vary in accordance with the conditions of stability, are employed for many control purposes, as subsequently explained. For purposes of further simplicity the right and left portions comprising an element are hereinafter designated by r and L respectively.

The circuit of Fig. 2 also relates to a triggering circuit, which is substantially similar to that just described in connection with Fig. 1. Portions of this circuit, which correspond in character and function to elements of the circuit of Fig. 1, are given the same reference characters. With regard to the arrangement of Fig. 2, it also may have two conditions of stability, but in lieu of deriving pulses from a common source and applying it to two circuit points to shift the condition of stability, two sources of pulses, such as resistances 72a and 72b are employed. It is assumed that such pulses do not occur simultaneously. The grid of tube 69a is connected to resistance 72a and whenever a positive pulse from 72a is applied to the grid of 69a, there is an increased current flow through 69a, assuming that 68a and 68b now have high and low impedances, respectively, and the circuit shifts to a stable condition in which points 66b and 66a are at low and high potentials, respectively. With the circuit in this last status, a positive pulse appearing on resistor 72b reduces the negative grid bias of tube 69b causing increased current flow therethrough and the circuit is shifted to the opposite condition of stability wherein points 66b and 66a are at high and low potentials, respectively. The manner in which the circuit shifts from one condition of stability to the other is similar to that operation described in connection with the circuit in Fig. 1. Selection means as in the circuit of Fig. 1 are provided since it is obvious that closure of switch 73a with consequent reduction of the positive screen voltage of 69a (Fig. 2) prevents pulses applied to resistor 72a from being effective and the closure of switch 73b prevents pulses applied to resistor 72b from being effective. Manipulation of switches 73a and 73b, therefore, permits selective operation of the circuit. This modification of the triggering circuit including the two sources of pulses is employed extensively in the circuits of the electronic accumulator. That portion of the Fig. 2 circuit, within the broken line enclosure, is identical in structure to that portion in Fig. 1, within the broken line, except that the control grids of 69a and 69b are not connected, and is therefore termed an element, and it, along with its two sources of pulses, forms the basis of the electronic commutator and the digit manifesting elements which are now to be described.

While tubes 69a and 69b have been shown as pentodes in the circuits of Figs. 1 and 2, it will be understood that one or both of these vacuum tubes may be triodes, as are tubes 68a and 68b. When tubes 69a and 69b are triodes, however, no screen grids are available to afford the trigger circuit the feature of selectivity provided by the selection means as set forth above.

3. Electronic commutator

The purpose of this commutator circuit, which is of a type as disclosed and claimed in applicant's copending application Serial No. 394,884 filed May 23, 1941, is to provide means whereby various results may be obtained at high rates of speed and without the undesired effects of inertia either when the circuit functions continuously or when it operates intermittently with respect to a given time base. The circuit employs vacuum tubes and associated impedances, the trigger circuit, shown in Fig. 2 and described in section 2, being utilized as a fundamental element. The number of elements which are employed depends upon the number of steps through which it is desired to progress before the circuit repeats its function. The number of elements in this commutator is one-half the number of steps, while the number of element portions equals the number of steps. Assuming that one portion of an element, designated as the first element of the circuit is "on" and corresponding portions of the remaining elements are "off," the first element portion conditions the next succeeding or second, corresponding element portion, so that upon the occurrence of a pulse, termed an advancing pulse, the conditioned element portion is turned on. This quency or phase changes, but depend on the occurrence, per se, of pulses, locking or synchronizing means are unnecessary to maintain one portion of the circuit in step with another. Accordingly, the device of the present invention provides an electronic accumulator, which is fully automatic, in portions, that in prior devices, have required manual adjustment. Since the operation of the various circuits herein depends alone, upon the occurrence, of pulses, the oscillator is not frequency stabilized and is free to drift about a mean base frequency. Such frequency drift, great or small, does not make any circuit action any the less positive than if the frequency of the oscillator were maintained as constant as possible, since an operation or operations in any of the circuits cannot occur unless a pulse, actually exists, and no such pulse exists until the oscillator has generated it. Therefore, variations, in the time duration, of the periods of successive cycles of the oscillator, are without effect on the positive operation of the device comprising this invention.

As will be described more fully later, the electronic accumulator functions upon a cyclical basis, there being one machine cycle employed during the entry of a single desired amount. The duration of time corresponding to one machine cycle determines the base frequency of the oscillator. In this invention, a single machine cycle is divided into ten equal portions, called index point positions. Since a pulse may be required at any one of the ten index point positions, the oscillator must necessarily make available such pulses, which are separated by periods equal to one tenth of a cycle duration. That is to say, the oscillator must function at a rate which is ten times the machine cycle rate. For example, if one cycle of the electronic accumulator is to occur in one two hundred and fortieth of a second or at the rate of 240 machine cycles per second, the frequency of the oscillator is adjusted at 10×240 or 2400 cycles per second.

The oscillator employed herein is of the type commonly known as a multivibrator. Essentially, it consists of a two-stage, resistance coupled amplifier in which the output of the second stage is fed back to the input of the first stage. Such an oscillator is capable of producing either square topped or saw toothed waves, depending upon the portion of the oscillator circuit from which the waves are derived. The square topped waves are employed herein, because they are easily changed into pulses of extremely sharp wave front and short duration. The circuit of the multivibrator and its principle of operation will now be described in detail.

Referring to Fig. 5a, closure of the double blade switch 79 supplies voltage to lines 50 and 80, and to a voltage divider consisting of resistances 56, 57, and 58. Potential is also supplied by means of this divider to lines 61 and 51, their potentials being positive with respect to each other in the order given and with respect to line 80. The oscillator comprises vacuum tubes 83a and 83b and associated resistances and condensers. The anodes of the respective tubes are connected to line 50 through load resistors 84a and 84b and the cathodes are directly connected to line 51.

The anode of tube 83a is coupled back to the grid of tube 83b by means of coupling condenser 85b which is also connected to line 51, through the grid leak resistance 86b. The anode of tube 83b is coupled back to the grid of tube 83a by means of coupling condenser 85a, which is also connected to line 51, through the grid leak resistance 86a. With these circuit connections, the normal bias of the grids of tubes 83a and 83b is zero. Such an arrangement is unstable and oscillations are initiated by a minute change of emission of either tube. Assuming that the current through 83a momentarily increases, this produces an increased voltage drop across resistance 84a and a decrease in potential across 83a. This decrease is fed by coupling condenser 85b to the grid of tube 83b making it more negative. Current through 83b is decreased, decreasing the voltage drop across resistance 84b and producing an increase in potential across 83b. This increase is equal to the original decrease across 83a multiplied by the amplification factor and is thus much higher. Coupling condenser 85a conveys this potential change to the grid of tube 83a making said grid much less negative with a resulting rapid increase in the current through tube 83a. The voltage drop due to this increased current is in turn fed to 83b with cumulative results. Actually, the current flow through tube 83a is increased to a high value, substantially instantaneously, which flow reaches a maximum when the grid of tube 83b has a negative potential great enough to reduce the current flow in tube 83b to zero. When this condition is reached, the charge on condenser 85b commences to leak off through resistance 86b, the time consumed being determined by the time constant of the condenser 85b and resistance 86b. When this leakage is completed, current flow in tube 83b begins and the operation described above reverses, that is, the grid of 83a will instantaneously become negative, shutting off flow through tube 83a and the grid of tube 83b will instantaneously becomes slightly positive and heavy flow will occur in tube 83b.

It will now be understood that a heavy current flows alternately and for a given period of time through each of the tubes 83a and 83b. When one tube is conducting, the other tube is cut off, this situation then instantaneously reverses and said one tube is cut off and the other conducts. This produces alternate and sustained voltage drops across resistors 84a and 84b, these voltages being 180 degrees out of phase with each other. These voltages are in the form of square-topped waves, easily converted into pulses having a steep wave-front and which are extremely short in duration.

Fig. 6a diagrammatically illustrates one machine cycle and shows that the voltages (with respect to line 51) which occur across resistor 84a (Fig. 5a) are, as stated above, square-topped in form and occur ten times per cycle. Fig. 6b also illustrates one machine cycle and shows that the voltages (with respect to line 51) which occur across resistor 84b (Fig. 5a) are square-topped in form and also occur ten times per cycle. Since, as stated above, these voltages are 180 degrees out of phase, the potential of point 87a rises at each of the ten index point positions and drops midway between index points while the potential of point 87b rises midway between each of the ten index point positions and falls at each index point. One cycle of oscillator operation is that period between successive potential rises of point 87a, for example, and its time duration in seconds is equal to the sum of the time constants of condenser 85a and resistor 86a and of condenser 85b and resistor 86b, respectively.

A rise in potential of point 87a causes charging of condenser 88a and current flow through resistor 89a to line 80. By suitably choosing the value of condenser 88a, so that its recovery time is extremely short, the rise in potential of 87a produces on resistor 89a, a positive pulse of extremely short duration having a steep wave front. A decrease in the potential of point 87a causes condenser 88a to discharge and a negative pulse of the character just noted is thereby produced on resistor 89a. Since the rise and fall of point 87a is constantly recurring, positive and negative pulses are continually produced on resistance 89a of the form as shown in Fig. 6c. In a similar manner, negative and positive pulses are continually produced on resistance 89b (Fig. 5a) due to the rise and fall in potential of point 87b, and these pulses are illustrated in Fig. 6d. It is to be noted that, as would be expected, the pulses on these resistances are 180 degrees out of phase.

Pulses of the character shown in Figs. 6c and 6d are employed in many parts of the circuit. To simplify the description, pulses, having positive and negative peaks occurring in time sequence as shown in Fig. 6c, are termed a-phased and lines conducting such pulses are designated by underlined a. Pulses, having positive and negative peaks occurring in time sequence as shown in Fig. 6d, are termed b-phased and lines conducting such impulses are designated by underlined b. These pulses, respectively, are amplified and reversed in phase prior to utilization in various ways, such as, for example, in operating the electronic commutator, in controlling entries into the electronic accumulator etc. The amplified circuits will now be described.

A line 90 extends from resistor 89a to the grid of amplifying tube 91 (Fig. 5a). A line 93 extends from resistor 89b to the grid of amplifying tube 92. The anode of tube 91 is connected to line 50 through a resistor 94, and the cathode of this tube is directly connected to line 51. The anode of tube 92 is connected to line 50 through load resistor 95, and the cathode of this tube is directly connected to line 51. Line 80 is negative with respect to line 51, and since resistors 89a and 89b terminate in line 80, its negative potential is the normal grid bias for tubes 91 and 92.

A positive pulse on resistor 89a reduces the negative grid bias of tube 91, increasing current flow therethrough and the potential drop across resistance 94. Condenser 96 discharges and an amplified negative pulse is produced on resistance 98. A negative pulse on resistor 89a increases the negative grid bias of tube 91, decreasing current flow therethrough and the potential drop across resistance 94. Condenser 96 becomes more charged and an amplified positive pulse is produced on resistance 98. It is to be particularly noted that the amplified pulses appearing on this resistance are b-phased and are therefore similar to those shown in Fig. 6d. The manner in which pulses on resistance 89b control tube 92 to produce amplified a-phased pulses on resistor 72 (Fig. 5a) is similar to that described in connection with the action of tube 91. Such pulses are similar to those shown in Fig. 6c.

The foregoing has described the manner in which an oscillator of the multivibrator type is employed to produce square-topped waves, which are converted into pulses of extremely sharp character and amplified, with reversal of phase, until suitable for use in various portions of the electronic accumulator circuit. It has been shown that two groups of pulses are produced, one of positive polarity occurring at index point positions of a machine cycle and designated as a-phased and the other of positive polarity occurring midway between index points and designated as b-phased. In some few instances the negative pulses are utilized, as will be explained in detail later. The manner in which one of these groups of positive pulses is employed for controlling an electronic commutator for producing definitely timed pulses will now be described.

5. *Control of electronic commutator to continuously produce timed pulses*

In Sect. 4, it was stated that the electronic accumulator operates on a cyclical basis. Each entry operation requires a machine cycle, which cycle is divided into ten equally spaced positions, termed index point positions. As employed in the following description, an expression such as "1," may be considered to mean: the "1" time, or the "1" index point position in a complete machine cycle. Pulses, which are produced by the multivibrator and which appear amplified and reversed in phase on resistors 98 and 72 are not "tied in" with a machine cycle. That is to say, no pulse appearing on these resistances can, at this point, be specifically designated as a "9," an "8," etc., pulse. Coordinating means, operated by these uncoordinated pulses, are provided, to produce pulses which are grouped into or "tied in" with a machine cycle, each pulse included in the group having a differential timed significance within the machine cycle. This coordinating and pulse producing means comprises the electronic commutator, whose principle of operation was described above (section 3, Fig. 3). The circuit diagram of this pulse producing commutator is illustrated in Figs. 5a and 5g. This commutator produces a-phased pulses of both positive and negative polarity at each of the ten index point positions comprising one machine cycle, each element, namely, C0—5, C9—4, C8—3, C7—2 and C6—1 comprising two element portions and each portion producing one positive and one negative a-phased pulse. Each element is of the type described in Sect. 2. Portions of the commutator circuit, shown in Figs. 5a and 5g, which correspond in character and function to those of the circuits shown in Figs. 2 and 3 are given the same reference characters. Since all elements are similar, a complete set of reference numerals is applied only to C0—5 (Fig. 5a).

Resistor 72 (Fig. 5a), previously described, is similar in function to resistance 72 (Fig. 3), in that a-phased pulses thereon are continually applied to line 75 (Figs. 5a and 5g) whenever the machine is in operation for the purpose of turning on the element portions of the electronic commutator i. e., they are advancing pulses.

Before starting up the machine, switch 101 (Fig. 5a) is closed, thereby shunting out a portion of resistance 72 and placing line 75 at the potential of line 51. Under this condition, pulses produced on resistance 72 are ineffective to turn on element portions of the commutator.

When switch 101 is opened, advancing pulses on resistance 72 control the turning on of the various element portions of the electronic commutator. The manner in which advancing pulses are employed to sequentially turn on each of the element portions of elements C0—5, C9—4, C8—3, etc., is as previously explained in Sect. 3, with respect to Fig. 3. In the circuit of Fig. 3, a commutator comprising only three elements (six element portions) is illustrated, whereas in Figs.

5a and 5g the commutator comprises five elements (ten element portions). The principle of sequential operation is, however, exactly similar in both commutators. From the prior description, it will be understood that each and every one of such element portions becomes turned on sequentially prior to a repetition of a full commutator cycle, or in other words, one complete operation of all element portions of the commutator constitutes a machine cycle and the element C0—5 demarcates the beginning and terminating point of each cycle. It is to be noted that as long as the machine is in operation, advancing pulses are applied to line 75 so that the commutator remains in continuous operation.

As previously stated, the pulses effectively utilized as advancing pulses (in the commutator) are $a$-phased positive pulses and in view of the explanation given in section 3, it will be understood that whenever a point 66b of an $r$ element portion rises in potential under control of an advancing pulse or a point 66a of an L element portion rises in potential under control of such $a$-phased pulses, such action occurs at an index point time (Fig. 6c). It follows from the foregoing that whenever a point 66b of an $r$ element portion falls in potential or a point 66a of an L element portion falls in potential, such action likewise occurs at an index point time. The times in a machine cycle at which points 66b of $r$ element portions and points 66a of L element portions of C0—5, C9—4, C8—3, etc., rise to a high potential and then fall, are illustrated in Fig. 7.

Fig. 7 indicates that substantially square-topped waves are sequentially produced at points 66b and 66a. For entry control and other control purposes, these square-topped waves are converted into pulses of sharp wave-front and of extremely short duration. Each pulse has a definite differentially timed relationship within a machine cycle such as "0," "9," "8," etc., which is maintained, cycle by cycle, throughout machine operations.

A fall in potential of point 66a of C0—5L, for example, (Fig. 5a) is effective, via line 102a (see also Fig. 5g) to cause discharge of condenser 103a and to cause negative current flow through resistor 104a connected at one end to condenser 103a, and at the other end to line 51. The value of condenser 103a is so chosen that its recovery time is relatively short, and therefore this current flow through resistor 104a is in the form of a sharp negative pulse occurring at "0" which is the same as "D" in the cycle. Upon a rise in potential of point 66a of C0—5L (Fig. 5a) condenser 103a (Fig. 5g) charges and a pulse of positive polarity having a steep wave-front and of extremely short duration is now produced on resistor 104a. The negative and positive pulses produced on resistor 104a are illustrated by dash lines in Fig. 8a, and it will be observed that the negative pulse occurs at "0" or "D" and that the positive pulse occurs at "5."

In a similar manner, the fall and rise in potential of the points 66a of element portions C9—4L, C8—3L, (Fig. 5a) C7—2L and C6—1L (Fig. 5g) produce negative and positive pulses on resistances 104b, (Fig. 5g), 104c, 104d, and 104e, respectively, and similarly the fall and rise in potential of points 66b of element portions C0—5r, C9—4r, C8—3r (Fig. 5a) and C7—2r and C6—1r (Fig. 5g) produce negative and positive pulses on resistances 104f, 104g, 104h, 104i and 104j, respectively. The different times in a machine cycle at which the respective pulses occur are illustrated by dash lines in parts b to j of Fig. 8.

The fall and rise in potential of points 66b of C0—5r (Fig. 5a) and C9—4r and of point 66a (Fig. 5g) of C6—1L also produce negative and positive pulses on resistors 104L, (Fig. 5h) 104m and 104k, respectively. The different times in a machine cycle at which these respective pulses occur are illustrated by solid lines in Fig. 8 parts L, m, and k, respectively.

Consideration of Fig. 8 indicates that the negative and positive pulses occur at exact index point times.

It is to be noted that pulses appearing on resistors 104a to 104j, inclusive (Fig. 5g) are both negative and positive. Prior to actual use, the positive pulse effect is eliminated. The grid of tube 293a (Fig. 5g) is connected to resistance 104a which, as described above, has applied thereto, negative and positive pulses, of the timing as shown in dash lines in Fig. 8a. The anode of tube 293a extends to line 50 through a load resistor 394a. The cathode of tube 293a is connected to line 51 as is also resistor 104a. When no pulse appears on resistor 104a, the grid bias of tube 293a is zero and said tube has a low impedance, i. e., the voltage drop across resistor 294a is high. A positive pulse appearing on resistor 104a has no effect on current flow through tube 293a and therefore no effect on the voltage drop across resistance 294a. On the other hand, a negative pulse appearing on resistor 104a at "D," for example, increases the negative grid bias of tube 293a, decreasing current flow therethrough and the voltage drop across resistor 294a. A circuit, comprising a resistance and a capacitance and connected from the junction of the anode of tube 293a and resistor 294a via line 114 (see Figs. 5g, 5h, 5i and 5c) and via condenser 298 and resistor 297a to line 51, for example, would have produced therein a positive pulse at "D," as illustrated by the full line in Fig. 8a. In this manner, even though positive and negative pulses are applied to the grid of tube 293a, only positive pulses are available from the output of said tube. It will be appreciated, that positive and negative pulses applied to resistors 104b, 104c, etc. (Fig. 5g), cause related tubes 293b, 293c, etc., to function in a manner similar to the action of tube 293a (Fig. 5g) to thereby produce positive pulses only, in their output circuits. Tubes 293b to 293j, inclusive, produce positive pulses which occur at the "9," "8," etc., cycle times as illustrated, respectively, by the full lines in Fig. 8, parts b to j, inclusive.

The foregoing has described a continuously operating commutator which comprises a coordinating means controlled by uncoordinated pulses to produce pulses which are grouped into repeated machine cycles, each pulse of a group having a differential timed significance in any one cycle. The pulse producing and coordinating means in the embodiment shown and described comprises an electronic commutator of five elements having ten element portions. The manner in which square-topped wave forms, as produced by the operation of each of the elements, are converted into pulses of steep-wave front and short duration, and are also further modified, has also been described. It is seen that each of such pulses has a definite differentially timed relationship which is maintained, machine cycle after machine cycle, as long as the electronic commutator is operating.

Each of the respective "9" through "1" pulses produced by tubes 293b to 293j, inclusive (Fig. 5g), is employed as a digit manifesting pulse and each is applied, respectively, to lines 105b to 105j, inclusive, for a purpose to be explained subsequently in section 13.

The "0" (or "D") pulse on resistor 104L (Fig. 5h) is effective, via line 106 (see also Fig. 5b) for initiating and terminating operation of the single entry control device, as is also set forth later in section 13.

The "1" pulse on resistor 104k (Fig. 5g) is effective via line 108 (see also Fig. 5b) for elusive one entry, as described in Sect. 9 and for terminating operation of the manually controlled portion of the single entry control device, as described in Sect. 13.

The "9" pulse on resistor 104m (Fig. 5h) is effective via line 295 (see also Fig. 5b) when the accumulator is to subtract, as is described subsequently in section 13.

The "0" pulse produced by the action of tube 293a, as explained above, is applied to line 114 (see, for example, Figs. 5g, 5h, 5i, and 5c) for terminating entry operations of the electronic accumulator.

The above has described the manner in which digit representing pulses and other pulses are produced and distributed to the accumulator, and machine control circuits and their specific use has been broadly referred to.

Having set forth the details of the electronic commutator for producing differentially timed impulses, a description will now be given of one order of the electronic accumulator, the manner of effecting entries therein, and the manner of effecting carry operations.

6. *Entry control device*

Before describing the specific details of the entry control device, a more general explanation will be given of one order of the electronic accumulator, particularly with regard to the manner of entering and manifesting digits therein. In this invention there is employed for digit manifestation, in each order of the accumulator, a plurality of electronic devices, each comprising a pair of portions of an element. The different patterns of "on" and "off" status, of the portions comprising an order, are indicative of the value of the respective digits standing in the order.

The number of electronic devices, employed for each order, is less than the number of digits in the notation, which, in the present embodiment, has been chosen as the tens notation, and each digit manifesting device comprises a trigger circuit or element (section 2, Fig. 2) which, as is now understood, has two portions, each of which portions may have either an "on" or an "off" status, and when one portion is "on," its companion portion is in reverse or "off" status. Five of these trigger circuits or elements are used per order, these five elements comprising ten element portions whose status pattern is indicative of the numerical value of the digit. The status of the element portions is controlled by the digit manifesting pulses, produced by the electronic commutator (section 5), acting upon an entry control device. Such control produces a step-by-step operation of the elements, as in the control of the commutator, except that the operation is not continuous, unless entries are continuously made, and, as in the operation of the commutator, beginning with the element in the series, succeeding the last element to be operated, there is a sequential operation of corresponding portions of each succeeding element to place them in a similar status, successively, until a terminating point is reached, following which these element portions are operated to place them in a reverse status, successively, until another terminating point is reached, and thereupon the previously described sequential operations are fully repeated. The pattern of "on" and "off" conditions, of all element portions, is indicative of the algebraic sum of the digit in the order and of the digit entry. The number of element portions turned on (and off) during an entry is equal to the true value of an entered digit, during an adding operation, and is equal to the complemental value of the entered digit, during a subtracting operation. It has been pointed out (section 3) that for each advancing pulse, an element portion is turned on, companion portions being turned off concurrently therewith. By controlling, in accordance with the value of the digit to be entered, the number of advancing pulses which are applied to the element portions of a given order, there will ensue upon suspension of such pulse application, the new combinational "on" and "off" status of the element portions or pattern of conditions, which designates the numerical value of the new digit, i. e., the algebraic sum of the digit originally in the order and of the entry.

When adding, the entry control device, now to be described, and of which there is one per order, is controlled by a pulse representative of a digit to be entered. The entry control device thereupon permits advancing pulses, whose number is equal to the value of the entry, to be effective in sequentially turning on its associated digit manifesting element portions. In this manner, a step-by-step operation occurs and finally a new combinational "on" and "off" status or new pattern of the element portions ensues, which indicates the new digit. The entry control device also permits other pulses, which in number equal the value of the entry, to be effective in controlling carry operations, when such are required by entry operations.

Reference to Fig. 8, which shows the digit representing pulses "9" to "1," inclusive, respectively, indicates that such pulses have one positive peak only, during one machine cycle, and that such peaks occur at differential times in a cycle numered according to the digit represented. Fig. 8b, for example, shows a "9" pulse which occurs, nine index point positions ahead of "D" or "0," Fig. 8c shows an "8" pulse which occurs, eight index point positions ahead of "0" etc., to Fig. 8j which shows a "1" pulse which occurs, one index point only, ahead of "0." In other words, the time interval, in a machine cycle, between any digit representing pulse and "0," is proportional to the value of the particular digit chosen to be entered and the total index points in such interval is numerically equal to the digit.

The entry control device, in adding, is called into action at a differential time in a cycle by a digit representing pulse, referred to above, and remains in operation until "0," so that, as stated above, the time interval during which the entry control device is operating is proportional to the value of the entered digit, and the total index points in such interval is numerically equal to the digit. Since one advancing pulse, for each index point position that the entry control device operates, is permitted to be effective to actuate the digit manifesting element portions, the number of effective advancing pulses made available by the entry control device, for a particular entry, equals the numerical value of the digit and these pulses impart step-by-step operation to the digit manifesting element portions of the electronic accumulator.

Referring now to Fig. 5d, the entry control device for the tens order of the accumulator (which order is chosen, merely to best illustrate entry) comprises a circuit element, as previously described (Figs. 1 and 2, section 2). This device is generally designated Et, and portions Et which correspond in character and function to those of the circuits explained in connection with Figs. 1 and 2 are given the same reference characters. Tube 116 (Fig. 5d) is in parallel with tube 68a and can be controlled so as to have generally the same function as tube 69a, as previously described (section 2, Fig. 2), that is, to turn off Et, when the bias of tube 116 is reduced.

Normally the entry control device Et is "off" and when an entry of a digit is made the device is turned on at a differential time. As will be explained subsequently (section 13), when an entry is made, only one machine cycle is required, and, under control of a single entry cycle limiting device, the screen of tube 69b (Et) is at high potential during the complete cycle. Accordingly, a reduction in the negative control grid bias of tube 69b causes Et to be turned on, in a manner now understood. Assuming it is desired to enter a 3 into the tens order of the accumulator, the manner in which Et is turned on at "3" is as follows.

Referring to Fig. 5h, a "3" digit representing pulse is produced on line 105h (section 5) and is effective via contacts 117t3, now closed (in a manner described later in sections 11 and 12) and line 118t (see also Figs. 5b, 5c and 5d) to charge condenser 296b (Fig. 5d) thereby producing a pulse on resistor 297b to which is connected the control grid of tube 69b. The grid bias of tube 69b (Et) is reduced, thereby turning on Et at "3." With Et "on," its point 66b rises in potential, as is shown in Fig. 9b, as does also the screen of tube 119a (Fig. 5d) which is connected to the midpoint of resistor 63b (Et) through screen current limiting resistor 74. With the screen of tube 119a at high potential, changes in the grid bias of this tube are now effective to vary current flow therethrough. Referring to Fig. 5a, it is recalled that b-phased pulses are produced on resistor 98 (section 4). Line 120 extends from the grid of 119a (Fig. 5d) to resistor 98 (see also Figs. 5c, 5b and 5a) so that the grid of 119a has b-phased pulses continuously impressed upon it as long as the machine is in operation (see also Fig. 9a). When, as explained above, the screen voltage of tube 119a (Fig. 5d) is raised at "3," the positive and negative b-phased pulses applied to its control grid are now effective to increase and decrease, respectively, the voltage drop across load resistor 121. Accordingly, condenser 122a, discharges and charges, respectively, and a-phased negative pulses (as described in detail presently) are produced on resistance 123a (see also Fig. 9c). Likewise, condenser 122b (Fig. 5j), connected via line 122c to the plate side of tube 119a, respectively discharges and charges, and a-phased pulses are produced on resistance 123b (see also Fig. 9j).

The manner in which a "0" pulse is produced on line 114 (Fig. 5g) has been explained (section 5), and this pulse is effective via this line 114 (see also Figs. 5h, 5i, 5j and 5d) to charge condenser 298 (Fig. 5d) thereby producing a pulse, once each machine cycle, on resistor 297a, to which is connected the grid of tube 116. The grid bias of tube 116 (Et) is reduced, thereby shutting off Et with an accompanying potential drop of point 66b (Et) as shown at "D" in Fig. 9b. Accordingly, the screen voltage of tube 119a (Fig. 5d) falls and b-phased pulses, applied thereafter, to its control grid, no longer produce changes of current flow therein, and a-phased negative pulses no longer appear on resistances 123a (Fig. 5d) and 123b (Fig. 5j) after "0," as is seen from parts c and j, respectively, of Figs. 9 and 10.

Consideration of the foregoing indicates that when an entry of 3 is made into the tens order of the electronic accumulator, element Et (Fig. 5d) is "on" for three index point positions. During the interval Et is "on," the screen potential of tube 119a is raised, so that b-phased pulses which are applied to its control grid during said interval, produce current variations therethrough. These current variations appear as a-phased negative pulses on resistances 123a (Fig. 5d) and 123b (Fig. 5j). Reference to Fig. 9c shows that the number of a-phased negative peaks which appear on resistance 123a is equal to the number of index point positions during which Et is "on," which in this particular example is three. The production of the wave forms, as illustrated in Fig. 9c, will now be described.

Resistance 123a is connected to line 51, as is also the cathode of tube 119b. Since the grid of 119b is connected to resistance 123a, its normal bias is zero and there is substantially full flow through 119b, so that a positive pulse appearing on resistance 123a has no appreciable effect on current flow through tube 119b.

Since the grid of tube 119b tends to draw current when a positive pulse is applied to resistance 123a, such pulse is attenuated by the resultant current flow through resistor 123a and therefore is almost completely lopped off, as illustrated in Fig. 9c. A negative pulse on resistance 123a, however, increases the negative bias on the grid of tube 119b, reducing current flow therethrough and the voltage drop across resistance 124. Condenser 125a is charged and a b-phased positive pulse appears on resistances 72a and 72b, as shown in Fig. 9d. During entry operation, switch 255 is in the position as shown (Fig. 5d). The number of such positive pulses which are produced on resistances 72a and 72b due to this circuit arrangement is equal to the number of negative pulses appearing on resistance 123a. With an entry of 3 into the tens order of the accumulator, only three negative pulses appear on resistance 123a, as described above, and, therefore, only three positive pulses are produced on resistances 72a and 72b, as indicated in Fig. 9d. Pulses on resistances 72a and 72b are applied to lines 75a and 75b, respectively, Figs. 5d and 5j) for the purpose of sequentially turning on or advancing the digit manifesting element portions of the accumulator, as will be explained (section 7). It is to be noted, however, that these advancing pulses, are b-phased, in contradistinction to the advancing pulses used in the commutator.

It is further seen that although the entry control device is turned on exactly at an index point position, there is a lag before the digit manifesting element portion is turned on, the element portion being turned on a half index point later.

Figs. 10a to 10d, inclusive and parts a to d of Figs. 10 and 11, apply to the same portions of Et and circuits controlled thereby as do the correspondingly lettered parts of Fig. 9. Fig. 10 however, relates to an entry of 6 into the tens order of the electronic accumulator while Fig. 11 relates to an entry of 2 therein. During the entire cycle in which 6 is entered, the screen of tube 69b (Et) (Fig. 5d) is at high potential. Referring to Fig. 5g, a "6" digit representing pulse is produced on line 105e (section 5) and is effective via contacts 117t6 (Fig. 5h) now closed (see sections 11 and 12), and line 118t (see also Figs. 5b, 5c and 5d) to reduce the negative grid bias of tube 69b (Et), as explained previously, thereby turning on Et at "6" (Fig. 10b). The screen voltage of tube 119a (Fig. 5d) thereupon rises, so that b-phased pulses (Fig. 10a), applied to its grid via line 120, are now effective to cause a-phased negative pulses (Fig. 10c) to appear on resistance 123a (Fig. 5d) and a-phased negative pulses (Fig. 10j) on resistance 123b (Fig. 5j), in a manner as previously described. Et is also turned off at "0," as previously described, and during its "on" interval of six index point positions, the six pulses, produced on resistance 123a (Fig. 5d), are converted by the action of tube 119b into six b-phased positive pulses on resistors 72a and 72b (see also full lines Fig. 10d). These pulses are effective via lines 75a and 75b (Figs. 5d and 5j) to control associated digit manifesting element portions.

Likewise, during the entire cycle in which 2 is entered, the screen of tube 69b (Et) (Fig. 5d) is at a high potential. Referring to Fig. 5g, a "2" pulse is produced on line 105i (section 5) and is effective, via contacts 117t2 (Fig. 5h) now closed (see sections 11 and 12), and line 118t (see also Figs. 5b, 5c and 5d) to reduce the negative grid bias of tube 69b (Et), as now understood, thereby turning on Et at "2" (Fig. 11b). The screen potential of tube 119a (Fig. 5d) rises so that b-phased pulses (Fig. 11a) applied to its grid, are now effective to cause a-phased negative pulses (Fig. 11c) to appear on resistance 123a (Fig. 5d), and a-phased negative pulses (Fig. 11j) on resistance 123b (Fig. 5j), in a manner as previously described. Et is turned off at "0," as described above, and during its "on" interval of two index point positions, two pulses appear on resistor 123a (Fig. 5d) which are converted by tube 119b into two b-phased positive pulses on resistors 72a and 72b (see also full lines Fig. 11d). These pulses are effective via lines 75a and 75b (Figs. 5d and 5j) to control associated digit manifesting element portions.

With regard to the a-phased pulses produced on resistance 123b (Fig. 5j), as a result of the foregoing entries of three digits, it is to be particularly noted that the first positive pulse in each of the three groups (see Figs. 9j, 10j and 11j) is produced, by means supplemental to tube 119a. Before describing these supplemental means, the reasons why tubes 119a do not produce the first pulse will be pointed out. Considering the example in which 3 is entered, it is to be noted that the first pulse in Fig. 9j occurs at "3," at which index point position, Et (Fig. 5d) is turned on, with the result that point 66b (Et) and the screen of tube 119a are rising in voltage at this time (see also Fig. 9b). Such potential rise, as is now understood, is exponential, and, therefore, the negative pulse (of short duration) which is being applied to the grid of tube 119a (Fig. 9a) has substantially no effect in reducing current flow therethrough. Accordingly, the voltage drop across load resistance 121 (Fig. 5d) is constant at this "3" time and no positive pulse is produced on resistance 123b (Fig. 5j) at this time by this circuit means. Were no supplemental pulse producing means provided, the number of positive pulses appearing on resistance 123b would always be one less than the numerical value of the entered digit. The supplemental means, now to be described, is effective to produce a pulse on resistor 123b, concurrently with the turning on of its related entry control device Et (Fig. 5d). In fact, it is the entry control device itself that is utilized for such pulse production.

Referring now to Fig. 5b, a voltage divider comprising resistances 300 and 301 is connected between lines 50 and 51. Switch 191b is normally open, as shown, for adding operations and, accordingly, line 302 which is connected to the junction of resistors 300 and 301 is at high potential with respect to line 51. Line 302 is connected (see also Figs. 5h, 5i and 5j) to the screen of tube 303 (Fig. 5j) thereby maintaining it at high potential. The anode of tube 303 is connected through load resistor 304 to line 50 and its cathode is connected to line 51. The grid of tube 303 is connected via line 303a to resistance 305 (Fig. 5d) which is coupled by condenser 306 to point 66a (Et). Resistor 305 is connected to line 51 and therefore the normal grid bias of tube 303 (Fig. 5j) is zero. Since the screen voltage of tube 303 is high, as explained above, and in view of its zero grid bias, tube 303 normally has a low impedance and there is a large voltage drop across resistor 304.

The recovery time of condenser 306 (Fig. 5d) is relatively short so that a decrease in potential of point 66a (Et) causes production of a negative pulse of short duration on resistance 305 (Fig. 5d). Whenever Et is turned on under control of a digit representing pulse, its point 66a drops in potential. In the aforementioned example in which the entry is 3, Et is switched on at "3" and at this time a negative pulse is produced on resistor 305 (Fig. 5d), as just described. This pulse is effective via line 303a to increase the negative grid bias of tube 303 (Fig. 5j), reducing current flow therethrough and the voltage drop across resistance 304. Accordingly, condenser 307 (Fig. 5j) becomes charged and a positive pulse is produced on resistance 123b at "3" at which time, as stated above, tube 119a produced no pulse on 123b. The action of this supplemental means, therefore, combined with that of tube 119a (Fig. 5d) causes production on resistance 123b (Fig. 5j) of a number of positive pulses which equals the value of the entered digit (see Figs. 9j, 10j and 11j). As will be described subsequently (sections 8 and 10), these pulses are employed for carry effecting purposes.

Since the entry control devices Eh (Fig. 5e) of the hundreds order and Eu (Fig. 5c) of the units order are similar to Et (Fig. 5d), it is not necessary to describe these in detail.

In this section the production of advancing pulses for regulating the digit manifesting element portions and for carry effecting purposes in one accumulator order has been generally explained and it has been pointed out that such pulses, during adding, equal in number the value of an entered digit. A detailed description has been given of the circuits of an entry control device and of their operation when the digits 3, 6, and 2, respectively, are to be additively entered. These examples illustrate the manner in which the operation of an entry control device is initiated on a differentially timed basis, and also illustrates that the device remains operative for a number of index point positions equal to the entered digit, and that its operation is terminated at a fixed time. It has also been shown that, as a result of such operation, pulses are created equalling the number of index point positions during which the device is operative, which pulses are to be utilized for controlling digit manifesting element portions of the accumulator (see following section) and for effecting carry (sections 8 and 10). A supplemental pulse producing means is also described in this section, which cooperates with the entry control device, for producing the proper number of pulses required for carry effecting purposes. The detailed operation of the entry control device during subtraction is described in section 9.

7. Digit manifesting elements

The features, in general, of the digit manfesting elements and element portions which comprise the digit manifesting means of this accumulator were set forth in the introductory portion of section 6. It is noted that five elements (section 2, Fig. 2) are employed, and are in a circuit arrangement which is similar to that of an electronic commutator (section 3, Fig. 3). The five elements comprising, for example, the accumulator tens order are designated $At5$—$0$, $At6$—$1$, $At7$—$2$, $At8$—$3$ and $At9$—$4$ in Figs. $5d$ and $5j$. Portions of the accumulator circuit, here shown, which correspond in character and function to those of circuits shown in Fig. 3 are given the same reference characters. Since the five elements are similar, a complete set of reference numerals is applied only to element $At5$—$0$.

Prior to effecting entries of a new group of values to be totaled, into the accumulator, it is reset, in a manner to be described in detail in section 15. It is sufficient to state that the result of this resetting operation is to turn off the element portions $At8$—$1r$ to $At9$—$4r$, inclusive, (Figs. $5d$ and $5j$), and to turn on the element portion at $At5$—$0r$ (Fig. $5d$). Following such resetting, the new group of values may be entered, one after another, into the accumulator.

In describing entry device $Et$ (section 6) the first digit selected for entry was 3 and the manner in which three advancing pulses for the digit manifesting elements are produced on resistances $72a$ and $72b$ was described in detail. With 0 standing in the order, $At5$—$0r$ is "on" and upon the entry of 3 the following occurs: $At6$—$1r$ (Fig. $5d$) is turned on, then $At7$—$2r$ (Fig. $5j$) is turned on, and finally $At8$—$3r$ is turned on. The exact manner in which advancing pulses are utilized to thus sequentially actuate these element portions is as already explained (section 3, Fig. 3). The operation of these elements during this particular entry cycle, together with the maintained "off" status of $At9$—$4r$ (Fig. $5j$) is illustrated in Fig. $9e$ to $i$, inclusive.

It is to be noted that at the beginning of the cycle $At5$—$0r$ is the only right element portion which is in the "on" status and at the termination of the cycle the element portions $At5$—$0r$ to $At8$—$3r$, inclusive, are in "on" status, as schematically illustrated in Fig. 9L, the dark circles indicating the "on" status. In this manner, 3 is added to 0, with the result that 3 stands in the accumulator. Were no further entry made in subsequent machine cycles, the status of all element portions would remain, as shown in the above mentioned figures. That 3 stands in the accumulator would be indicated by the glow tubes 78 at $At5$—$0r$, $At6$—$1r$, $At7$—$2r$, and $At8$—$3r$, and that of $At9$—$4L$ which would now all be ignited, while glow tubes 78 of $At5$—$0L$, $At6$—$1L$, $At7$—$2L$ and $At8$—$3L$, and that of $At9$—$4r$ would be dark. Another and more clearly identifying manner of indicating the digit standing in an order of the accumulator is described in section 14.

In the previous second example (section 6) illustrating the operation of $Et$, the digit selected for additive entry was 6, and in Sec. 6 there was set forth the manner in which six advancing pulses for the digit manifesting elements are produced on resistances $72a$ and $72b$. Assuming now that 3 already stands in the tens order of the accumulator, with the entry of 6 the following occurs: the element portions $At9$—$4r$, $At5$—$0L$, $At6$—$1L$, $At7$—$2L$, $At8$—$3L$ and finally $At9$—$4L$ are turned on. The operation of these element portions during this entry cycle is illustrated in Figs. $10e$ to $10i$, inclusive. Attention is directed to the fact that at the beginning of the cycle, $At5$—$0r$ to $At8$—$3r$, inclusive, are in "on" status and at the termination of this cycle $At5$—$0L$ to $At9$—$4L$, inclusive, (Fig. 10L), are in "on" status. Thusly, 6 is added to 3 and 9 now stands in the accumulator. Were no further entry made in subsequent machine cycles, the status of all elements would remain, as shown in the above mentioned figures. The fact that 9 stands in the accumulator would be indicated by the glow tubes 78 of $At5$—$0L$ to $At9$—$4L$, inclusive, which would now all be ignited, while the glow tubes 78 of $At5$—$0r$ to $At9$—$4r$, inclusive, would all be dark.

In the previous third example (section 6), illustrating the operation of entry control device $Et$, a 2 was next additively entered into the tens order of the accumulator, and in Sect. 6 there was set forth the manner in which two advancing pulses for the digit manifesting elements are produced on resistances $72a$ and $72b$. Assuming now that 9 stands in the tens order of the accumulator, upon the entry of 2 the element portions $At5$—$0r$ and $At6$—$1r$ are sequentially turned on. The operation of these particular element portions during this entry cycle is illustrated by the solid lines in Fig. 11 parts $e$ and $f$. Attention is directed to the fact that at the beginning of the cycle, $At5$—$0L$ to $At9$—$4L$, inclusive, are in "on" status and at the termination of the cycle $At5$—$0r$, and $At6$—$1r$, and also at $At7$—$2L$, $At8$—$3L$ and $At9$—$4L$ (Fig. 11L) are in "on" status. In this manner 2 is added to 9 with the result 1 now stands in the accumulator. Were no further entry made in subsequent machine cycles, the status of all elements would remain, as shown in the above mentioned figures. This would be indicated by the fact that glow tubes 78 of $At5$—$0r$ and $At6$—$1r$, and also $At7$—$2L$, $At8$—$3L$, and $At9$—$4L$ would now be ignited, while those associated with the remaining element portions would be dark.

Since the accumulator element portions $Ah5$—$0r$, $Ah5$—$0L$, $Ah6$—$1r$, etc., (Figs. $5e$ and $5k$) of the hundreds order and $Au5$—$0r$, $Au5$—$0L$, $Ah6$—$1r$, etc., (Figs. $5c$ and $5i$) of the units order are similar to those of the tens order, it is not necessary to discuss in detail their operation upon entries being made therein.

The foregoing examples illustrate the manner in which entries are made into an order of the accumulator and the combinational status or pattern which the digit manifesting element portions assume as a result of said entries. The following table, in which X designates the "on" status and O the "off" status, shows the combinational status or pattern of the element portions corresponding to each digit of the notation, which may stand in an order of the accumulator:

| Digit | Right element portions | | | | | Left element portions | | | | |
|---|---|---|---|---|---|---|---|---|---|---|
| | A5-0 | A6-1 | A7-2 | A8-3 | A9-4 | A5-0 | A6-1 | A7-2 | A8-3 | A9-4 |
| 0 | X | O | O | O | O | O | X | X | X | X |
| 1 | X | X | O | O | O | O | O | X | X | X |
| 2 | X | X | X | O | O | O | O | O | X | X |
| 3 | X | X | X | X | O | O | O | O | O | X |
| 4 | X | X | X | X | X | O | O | O | O | O |
| 5 | O | X | X | X | X | X | O | O | O | O |
| 6 | O | O | X | X | X | X | X | O | O | O |
| 7 | O | O | O | X | X | X | X | X | O | O |
| 8 | O | O | O | O | X | X | X | X | X | O |
| 9 | O | O | O | O | O | X | X | X | X | X |

Where X="on," O="off."

Summing up, this section has described the operation of the digit manifesting elements of an accumulator order when three digits are entered therein additively. A 3 is added to 0, a 6 is added to 3, and finally a 2 is added to 9, with the result 1 finally stands in the order. An explanation has been given of the step-by-step operation of the element portions whereby, commencing with the one succeeding the last one to be operated upon, each element portion is sequentially operated to "on" (and "off") status. The "on" and "off" combinational status or pattern of all element portions after each entry, is illustrative of the numerical designation of the sum of the digit in the order and of the entry. In the last example given, it is to be noted that having reached a second terminating point (all left element portions in "on" status) in the series comprising five elements or ten element portions, the complete cycle of sequential operation begins to repeat, starting with that element portion having the lowest numerical designation (A$t$5—0$r$). It is to be noted that, unlike the continuous action of the electronic commutator (section 5), an order of the electronic accumulator operates intermittently only, that is, only when an entry is made therein. The operation of the accumulator, upon subtractive entries, is described later in section 9.

Attention is particularly directed to the method of cumulatively manifesting digits in this embodiment of the invention. An accumulator order comprises discrete elements each of which includes a pair of element portions, the number of elements being less than the number of digits in the tens notation. The "on" and "off" combinational status or pattern of the element portions is indicative of the digit standing in the order. It is to be noted that the number of element portions which are "on" always equals the number of element portions which are "off," irrespective of the digit being indicated. It follows, therefore, that each element portions, either by being "on" or by being "off," and by its relation to the status of all remaining element portions, is utilized to indicate each and every digit standing in the accumulator.

It will be understood, that in the problems above, when 2 was added to 9, the tens order of the accumulator passed from 9 to 0, and that a carry increment had to be added to the next higher order, so that the 1 would be manifested in the hundreds order. The method of effecting carry will now be discussed in detail in connection with the carry effecting device.

8. Carry effecting device

Whenever a digit is added to the accumulator, and the combinational "on" and "off" status of the element portions represents a digit, lower numerically than the one standing in the accumulator prior to entry, the accumulator has passed from 9 to 0 and a carry increment must be added into the next higher order.

In the first of the preceding three examples, (section 6), a 3 was added to a 0 in the tens order and in the second example, a 6 was added to a 3. In neither example was there, after such entry, a combinational status or pattern of element portions representative of a digit, lower numerically than the one standing in the order prior to entry. This was seen by reference to Figs. 9 and 10 and Figs. 10e to 10i, inclusive.

In the third example (section 6) in which a 2 is added to 9 in the tens order, the resultant combinational status or pattern of element portions represents a digit, lower numerically than the one in the accumulator, prior to entry, and thus there is the requirement of a carry entry into the next higher or hundreds order. As has been previously mentioned, carry operations in the electronic accumulator of this invention are effected in a completely novel manner, namely, while entry operations are in the course of taking place. That is to say, no invariably timed position in a machine cycle is allocated solely for carry effecting purposes. Stated otherwise, carries may take place at any of the index point positions in a machine cycle. For this reason, therefore, a so-called, carry determining device, may be dispensed with, and the carry effecting device may be directly controlled by the digit manifesting means.

It is to be noted that despite the completely novel method of carry employed in this embodiment of the invention, the general principles of carry, which apply to an accumulator in which carry is effected at an invariably timed position in a machine cycle, likewise apply to the present device wherein carry may take place at any cyclic position. In other words, whenever an order is receiving an entry and passes from a condition representative of the numeral 9 to a condition representative of the numeral 0, a carry increment must be applied to the next higher order. Likewise, whenever an order assumes a condition representative of the numeral 9 and receives a carry from its adjacent lower order, then a carry through 9 must take place, with the resultant application of a carry increment to the next higher order. These carries occur, however, immediately upon passage from nine to zero and not at a later fixed carry time, as customary heretofore. In view of the novel method of producing carry, employed in this embodiment of the invention, it will be appreciated that the carry effecting device of a given order must be capable of functioning according to the above stated principles, either during the portion of a cycle in which said order is actually in the course of receiving an entry, or under those circumstances in which no entry is made into said order, or prior to or after an entry is actually made into said order. Furthermore, the operation of a carry effecting device must not interfere with the normal operation of its own or other orders whenever these orders are receiving entries.

More specifically, and with regard to a given order, the carry effecting device is conditioned, as follows. After the second terminating point is reached, in the sequential operation of the digit manifesting element portions (section 7), the "on" status of certain of said element portions, conditions the carry effecting device. Under control of the advancing pulses, the order passes from a condition representative of the numeral 9 to a condition representative of the numeral 0 when the sequential operation begins to repeat, as is now understood, and under control of carry producing pulses, the conditioned carry effecting device operates to apply a carry to the next higher order. This operation is effected by the entry control device when in "on" status, or, in other words, during a portion of a cycle that the order is actually receiving an entry. As will be seen later in this section, while an entry is being made, the entry control device continually attempts to cause the carry effecting device to operate, but is effective in its efforts, only when the carry effecting device is properly conditioned.

The carry effecting device may also be conditioned by element portions when the order assumes a condition representative of the numeral 9, and it operates to produce a carry, when its order receives a carry increment.

In section 6, in connection with the description of the entry control device, it was stated that this device provided both $b$-phased and $a$-phased pulses, which, when adding, each equalled in number the numerical value of the digit being entered. The $b$-phased or advancing pulses (Figs. 9$d$, 10$d$ and 11$d$) are utilized to produce sequential operation of the related digit manifesting element portions (section 7) and, as will be explained in detail subsequently, the $a$-phased pulses (Figs. 9$j$, 10$j$ and 11$j$) are employed to produce operation of an associated and conditioned carry effecting device. It is to be particularly noted that the advancing pulses ($b$-phased) occur midway between index point positions and, as is now understood, produce sequential operation of the element portions, only at said mid-index point times. On the other hand, the carry producing pulses are $a$-phased and occur exactly at index point positions. Therefore, when effective, these $a$-phased pulses cause carry increments to be applied, at exact index point times. The result of an application of a carry increment to an order is to produce a sequential operation, so that the element portion, which immediately follows in the series that element portion which was last operated, is itself turned on. Since element portions are turned on, at certain times under control of advancing pulses to produce entry, and are turned on, at definitely different times, under control of a carry effecting device, it is seen that there is no interference between entry and carry operations. It is to be noted, therefore, that when element portions are being sequentially operated by advancing pulses to produce entry, an additional step, in the step-by-step operation, may occur midway between operations produced by successive advancing pulses. This results in the entry of a 1, over and above the entry of the digit being entered. It is to be noted that such application, by a carry effecting device, of a carry increment into the next higher order, is made independently of the operation of the entry control device of this next higher order. The carry effecting device herein employed comprises electronic tubes and associated circuits, as will now be described in detail. Several conditions of carry and the circuits and manner of operation for each condition will be fully described.

Under the first condition of carry to be described, the entry control device for the tens order is "on" and will remain "on" long enough to ensure that the order eventually reaches, at least 0, but prior to this, the order achieves a condition indicative of the numeral 9, but with no carry received from its adjacent lower order.

Referring to Fig. 5$j$, the screen of tube 130$a$ is connected via line 130$c$ (see also Fig. 5$d$) and the screen current limiting resistor 74$a$ (Fig. 5$d$) to the midpoint of resistance 63$a$ (At5—0L). As is now understood, when At5—0L is "off," point 66$a$ is at low voltage and the screen voltage of tube 130$a$ (Fig. 5$j$) is low. On the other hand, when At5—0L (Fig. 5$d$) is "on," the screen potential of tube 130$a$ is high. The suppressor grid of tube 130$a$ is connected to a point on resistor 64$a$ (At9—4L). When At9—4L is "off," the suppressor grid voltage of tube 130$a$ is negative with respect to line 61 and hence is low and, when At9—4L is "on," the suppressor grid voltage of tube 130$a$ is substantially at the voltage of line 61 or is high. A negative grid bias reduction of tube 130$a$ has no effect on current flow therethrough if either the screen or suppressor grid of this tube is at low potential but a grid bias reduction of tube 130$a$ is effective to increase current flow therethrough, when both the screen and suppressor grids are at high potential. The control grid of tube 130$a$ is connected to resistor 123$b$, which, as described previously in Sect. 6, has $a$-phased pulses applied thereto under control of entry control device E$t$ (Fig. 5$d$) whenever E$t$ is "on" and the tens order is receiving an entry.

Considering again the problem, when 2 is added to 9 standing in the accumulator, and referring to Fig. 11$e$ to $k$, inclusive, it is seen that the status of the element portions, when the digit standing in the accumulator is 9, is such (prior to "2" or the time of an entry of 2) that both At5—0L (Fig. 5$d$) and At9—4L (Fig. 5$j$) are "on." Hence, since the screen potential of tube 130$a$ is raised when At5—0L is "on" and the suppressor grid potential is raised when At9—4L is "on," both these potentials of tube 130$a$ (Fig. 5$j$) are high. Such condition, however, has no effect on current flow through tube 130$a$, until "2," when entry control device E$t$ (Fig. 5$d$) is turned on. The first positive pulse produced under control of E$t$ (see Sect. 6) on resistor 123$b$ (Fig. 5$j$) is now effective to cause increased current flow through tube 130$a$. Such current flow increases the voltage drop across resistor 131, causing condenser 132 to discharge and a negative pulse to be produced on resistor 133. The grid of tube 134 is connected to resistor 133, the normal grid bias of tube 134 being zero. This negative pulse on resistor 133 places a negative bias on tube 134, decreasing current flow therethrough and decreasing the voltage drop across resistor 135. Condenser 136 connected to the junction point between the anode of tube 134 and resistor 135 becomes charged and a positive pulse is produced on resistor 137, as illustrated by the solid line at "2" in Fig. 11$k$. This positive pulse is effective, only if the next higher order has achieved a condition indicative of the numeral 9, as described presently. However, the junction point between the anode of tube 134 (Fig. 5$j$) and resistor 135 is also connected via line 153$b$ (see also Figs. 5$k$ and 5$e$) to condenser 125$b$ (Fig. 5$e$) and thence to resistors 72$a$ and 72$b$, relating to the hundreds order. The above described decrease in voltage drop across resistor 135 of the tens order, (Fig. 5$j$) is, therefore, effective, via the circuit just traced, to produce a positive pulse on resistors 72$a$ and 72$b$ of the hundreds order, (Fig. 5$e$) to produce the turning on of one additional element portion in said order, to thereby add one. Were the hundreds order standing at 0, it would now stand at 1, as a result of this carry operation. It is to be noted that such carry operation is carried out independently of entry control device E*h* and has no effect thereon. The result produced, however, is the same as if E*h* were to be operated for one index point position, to thereby turn on one additional element portion.

Under the second condition of carry, now to be described, the entry control device for the tens order is "on" and will remain "on" long enough to ensure that the order eventually reaches, at least 0, but prior to this, the order achieves a condition indicative of the numeral 9, by virtue of entries and of the reception of a carry from its adjacent lower order.

Referring to Fig. 10 parts *e* to *k*, inclusive, which are diagrammatic representations of the element portions when 6 is added to 3 in the tens order, assume further, that during this entry, the tens order receives a carry from the units order. Assume also that the carry is applied from the units order to the tens order, at "1," when the tens order has not yet reached 9 but stands at 8. The decreased voltage drop across units order resistor 135 (Fig. 5*i*), at "1," is effective via line 153*b* (see also Figs. 5*j* and 5*d*) and condenser 125*b* (Fig. 5*d*) related to the tens order, to produce a positive pulse on its associated resistors 72*a* and 72*b* (see dash line pulse at "1" Fig. 10*d*). This pulse causes the turning on of element portion A*t*9—4L (Fig. 5*j*) since, as above, the tens order stood at 8 (also see dash lines Fig. 10*i*), with the result the tens order reaches 9 at this particular time. Since the tens order, however, is in the course of receiving an entry so that its entry control device E*t* (Fig. 5*d*) is "on," a positive pulse (as described in Sect. 6) is produced (Fig. 10*j*) on resistance 123*b* of the tens order (Fig. 5*j*), at the "1" time. At this time A*t*5—0L (Fig. 5*d*) is "on," so that the screen voltage of the tens order tube 130*a* (Fig. 5*j*) is high and also, at this certain time, A*t*9—4L is turned on, in the manner explained just above, and a point along its resistor 64*a* rises in potential causing the suppressor grid of tube 130*a* to rise in potential. Hence the screen grid of tube 130*a* is at high potential and the potential of the suppressor grid is rising at "1" and further since its negative control grid bias is reduced because of the positive pulse on 123*b* at "1," the circuit values are such that current flow through tube 130*a* (Fig. 5*j*) increases, and an increased voltage drop is produced across the tens order resistance 131, in a manner now understood. This voltage drop is effective via tube 134 and line 153*b*, as explained in detail above, to produce the turning on of one additional element portion in the hundreds order. This action occurs at the same time that the tens order reaches the condition indicative of the numeral 9 but, as noted with conditions ensuring, it shall reach at least 0. The next (and in this case final) advancing pulse thereupon switches on A*t*5—0*r* (Fig. 5*d*), and dash lines Fig. 10*e*) so that at the termination of this entry cycle, 0 stands in the tens order. It is to be particularly noted that A*t*5—0*r* becomes turned on only one-half an index point position ("½ before D") after A*t*9—4L became turned on by application of a carry. This may be seen by comparison of the dash lines of Fig. 10 parts *i* and *e*.

Reference to Fig. 10*j* indicates that at mid-index point positions, during the entry, the pulses applied to resistance 123*b* (tens order) are negative, and therefore, even though the suppressor and screen grids of tube 130*a* (Fig. 5*j*) were to be both at high potential, at such time, no increase in current flow through tube 130*a* would occur. These grids are both, momentarily at high potential at "½ before D" in the present example. Therefore, it is seen, that even though a carry condition may continue to persist, at a mid-index point position, no second carry increment is applied to the next higher order, since the pulse on resistor 123*b* is negative. Thus, under this condition of carry, there is a carry through 9, as an order reaches 9 from 8, said carry being effected, in anticipation, of the entry control device E*t* remaining on long enough to ensure that the order eventually reaches at least 0, prior to the termination of the entry cycle. Such anticipation is produced, as an effective phenomenon, by timing the carry causing pulses, which are produced under control of E*t* on resistance 123*b* (Fig. 5*j*), one-half an index point position, ahead, of advancing pulses produced by E*t* on resistances 72*a* and 72*b* (Fig. 5*d*). Since both advancing and carry causing pulses are produced, only while the entry control device E*t* is "on," it is seen that the number of advancing pulses equals the number of carry causing pulses, the advancing pulses being interspersed with and succeeding, in time sequence, the carry causing pulses. In other words, a carry producing pulse is always followed by an advancing pulse. Accordingly, carry through 9 operations are correctly effected, under the condition when an order is still receiving an entry and receives a carry which advances said order from 8 to 9, because such carry operations are performed, only when a sufficient number of pulses is provided to ensure that the order is to reach at least 0, prior to the termination of the entry cycle.

Under the third condition of carry to be described, the entry control device of the tens order is for the time being, "off" and the order achieves a condition indicative of the numeral 0 solely by reception of a carry from the adjacent lower order. Assume for this third condition that an entry is being made into the next numerically lower, i. e. the units order and that this lower order passes from 9 to 0, in this same machine cycle in which 2 is to be added to 9, but at "6," which, it is noted, is prior to "2" when the entry of 2 into the tens order will be initiated. A carry increment will, therefore, be added in the tens order, and since (prior to entry of 2) the tens order stands at 9, a carry through 9 condition exists, which also requires a carry into the hundreds order. Due to carry in the units order, a pulse is produced at "6" on resistor 137 of the units order (Fig. 5*i*), in the same manner as described above in connection with the tens order. Also, the decreased voltage drop across the units order resistor 135 (Fig. 5*i*) is effective via line 153*b* (see also Figs. 5*j* and 5*d*) and condenser 125*b* (Fig. 5*d*), related to the tens order, to produce a positive pulse on its associated resistors 72*a* and 72*b*, at "6" (see dash line pulse, Fig. 11*d*). Since the tens order is assumed to be standing at 9, this pulse produces the turning on of element portion A*t*5—0*r* (Fig. 5*d*, also see dash lines in Fig. 11*e*), and the result 0 now stands in the tens order. Referring now to Fig. 5*j*, it is seen that the tens order tube 130*b*, is in parallel with tube 130*a* and that the screen grid of tube 130*b* is connected to resistor 308 while the control grid of 130*b* is connected via line 153*a*, to the units order resistor 137 (Fig. 5i). The above mentioned positive pulse on 137 reduces the negative grid bias of tube 130b (tens order, Fig. 5j) but will not cause increased current flow therethrough unless its screen is at an increased potential. Normally, said screen is maintained at the potential of line 61, since resistor 308 is connected at one end thereof to this line. The other end of 308 is coupled by condenser 309, whose recovery time is relatively short, via line 309a to point 66b (At5—0r, Fig. 5d) and, as is now understood, a rise in potential of point 66b (At5—0r) will produce a positive pulse, of short duration, on resistor 308 (Fig. 5j) thus raising the screen voltage of tube 130b. It is to be particularly noted, that it is the change, or rise, in the voltage of point 66b, that increases the voltage on the screen of 130b, a mere sustained condition having no effect. As just described above, at "6," when the tens order receives the carry from the units order, At5—0r (Fig. 5d) is switched on and its point 66b rises in potential, this change, or rise causing a momentary rise in the screen voltage of tube 130b (Fig. 5j), concurrently with its negative grid bias reduction via line 153a caused by the pulse on the units order resistance 137 (Fig. 5i). The circuit values of tube 130b are so adjusted, that point 66b does not have to reach its full high potential, to thus raise the screen voltage of tube 130b sufficiently to increase current flow through this tube, thereby increasing the voltage drop across resistance 131 and by means of tube 134 producing, via line 153b, a positive pulse on resistors 72a and 72b (Fig. 5e), in a manner described previously (see dash line pulse at "6," Fig. 11k). This pulse is effective, as explained in detail above, to cause the turning on of one additional element portion in the hundreds order.

Under the fourth condition of carry to be described, the entry control device for the tens order is "on" and the order achieves a condition indicative of the numeral 0 by reception of a carry from the adjacent lower order. Assume now that an amount of 088 stands in the accumulator and that the amount of 033 is added thereto. Inspection of this example indicates that there is a requirement of a carry from the units to the tens order and also from the tens to the hundreds order. It is furthermore apparent, that both the units and tens orders pass, concurrently, from a condition indicative of the numeral 9 to a condition indicative of the numeral 0, when identical digits stand in two (or more) adjacent orders and have added thereto, digits which are the same in value and cause the orders to change from a condition indicative of 9 to a condition indicative of 0. As is now understood, at "½ after 3" in the entry cycle, both orders are advanced from 8 to 9 and at "½ after 2," in due course, the units order will be advanced from a condition indicative of 9 to a condition indicative of 0. Since the units order is in a condition indicative of 9 at "2" and conditions are such to ensure that the units order will reach at least 0, the carry producing pulse on units order resistor 123b (Fig. 5i) is effective, in a manner now understood, to cause a decreased voltage drop across units order resistance 135 (Fig. 5i) and to cause a pulse to appear on units order resistor 137. This decreased voltage drop is also effective via line 153b (see also Figs. 5j and 5d) and the tens order condenser 125b (Fig. 5d) and associated resistances 72a and 72b to turn on At5—0r (since the tens order, at "2," is in a condition indicative of 9) or in other words, adding the carry increment and advancing the tens order from a condition indicative of 9 to a condition indicative of 0, at "2." The above described pulse on units order resistor 137 (Fig. 5i) is effective via line 153a to reduce the negative grid bias of tens order tube 130b (Fig. 5j), at "2." As just explained, at this same time At5—0r (Fig. 5d) is turned on, and the accompanying change or voltage rise of its point 66b causes a positive pulse to appear, for a short time, on tens order resistance 308 (Fig. 5j) increasing the screen voltage of tube 130b, concurrently with a reduction in its negative grid bias. Accordingly, current flow through the tens order tube 130b increases, so that, at "2," a carry increment is also applied to the hundreds order, in a manner now understood, to advance this order to 1 if it stood at 0.

When the units order advances to 0, at "½ after 2," the tens order simultaneously advances to 1 and, at "½ after 1," when the units order advances to 1, the tens order advances to 2. At "D" or "O," entry operations terminate, and 121 stands in the accumulator.

The foregoing several paragraphs have described the operation of an electronic carry effecting device which permits carry operations to take place, during periods in which entries are in the course of being made. It has been shown that the device is controlled conjointly by digit manifesting element portions and by an associated entry control device. It has further been shown that the device functions either when an order is advanced, by advancing pulses, from a condition indicative of 9 to a condition indicative of 0 or when the order is at a condition indicative of 9 and receives a carry from the next lower order, and also, when under either of these conditions and with an entry whose period is coexistent therewith. The principles of operation of the carry determining circuit which have been discussed in this section apply as well to a plurality of accumulator orders.

9. *Entry control device and digit manifesting elements—subtracting*

The operation of a single order of the electronic accumulator for a series of additive entries has been described in detail. The methods of effecting carry have also been described when an accumulator order either passes, under control of advancing pulses, from a condition indicative of 9 to a condition indicative of 0, or is in a condition indicative of 9 and receives a carry.

Summing up, in general with regard to adding, the underlying principle of operation comprises the control of a plurality of electronic element portions whereby step-by-step operations of the series of element portions is obtained. Such step-by-step operations result in the sequential conditioning of each element portion in an "on" status, beginning with the one succeeding the last one to be previously operated upon, with the result that the combinational "on" and "off" status or pattern of element portions, corresponds, in its numerical designation, to the sum of the digit in the order and of the entry. This is brought about by effecting step-by-step operations for a predetermined portion of a machine cycle, the extent of the portion of a cycle being proportional to the digit entered. Thus, it is seen that when a 3 is added, three sequential stepping operations occur for three index point positions or three-tenths of a cycle. When a 6 is entered, six sequential stepping operations occur for six index point positions or for six-tenths of a cycle.

Briefly, in adding, the sequential operation of electronic element portions, begins at differential cyclic times, dependent upon the digit to be added, and is terminated at a fixed cyclic time. Having summarized the principles of adding, a general description will now be given of the principles underlying the manner in which digits are subtracted, in this electronic accumulator.

When the accumulator is to subtract, step-by-step operation of the accumulator, under control of the entry control device, begins at a fixed time in the cycle. This operation continues until that index point position is reached, which position corresponds numerically to the subtrahend, at which differential time, suspension of this step-by-step operation is produced. Specifically, step-by-step operations begin, as if an additive entry of 9 were to be made. If, for example, a 6 is to be subtracted, digit manifesting elements are sequentially started in operation, under control of a "9" pulse, and are stopped, under control of a "6" pulse, representative of the subtractive entry 6.

It is obvious that when 6 is subtracted, step-by-step operations occur for three index point positions or three-tenths of one cycle. During a subtraction operation, in contradistinction to an adding operation, the digit manifesting element portions are sequentially operated, for a number of index point positions, numerically equal to the nine's complement of the subtrahend, namely, in this example, three. Therefore, when subtracting, step-by-step operations occur during a portion of the cycle, which is proportional to the nine's complement of the subtrahend.

Considered from another point of view, the method of subtraction is, in effect, to add the nine's complement of the subtrahend. Provision is also made for adding an elusive one, so that the true, or tens complement of the subtrahend, is added, thereby forming a true difference amount.

The result of this step-by-step operation of the digit manifesting element portions and of the elusive one entry, is (beginning with the one succeeding the last one to be previously operated upon) to effect a sequential conditioning of each digit manifesting element portion to an "on" status, the final combinational "on" and "off" status or pattern of the element portions, corresponding, in its numerical designation, to the difference between the digit previously standing in an order and the digit subtractively entered.

It will be understood that the various electronic tubes and related circuits which comprise the previously described entry control, carry effecting devices, and the digit manifesting element portions, etc., are also employed for subtracting. The single entry cycle limiting or control device, which is also employed in subtraction, will be described in detail in section 13.

Referring now to Fig. 5c, the entry control device, E$u$, of the units order of the accumulator, is similar to E$t$ of the hundreds order (Fig. 5d, section 6) and it is therefore not believed necessary to describe E$u$ in detail. Normally E$u$ is "off," and when a "½ after D" pulse is effective early in a subtraction cycle, the device is turned on. As will be explained later (section 13) switch 191a (Fig. 5b) is closed to its other position, during subtraction, and the screens of pentodes 139a and 69b (T3) (Fig. 5b) are at a high potential during the complete subtractive cycle. Switch 191b (Fig. 5b) is closed simultaneously with closure of 191a to its other position, for a purpose as described presently. The manner in and time at which E$u$ is turned on, will now be described.

Referring to Fig. 5a, b-phased pulses produced on resistor 98 (section 5) are effective via line 120 (see also Fig. 5b) to reduce the negative grid bias of tube 140a (Fig. 5b). Since, as described later in Sect. 13, the screen potential of tube 140a is high at "½ after D" but not after "9," the grid bias reduction, produced by the positive pulse which occurs at "½ after D," momentarily increases current flow through tube 140a and the voltage drop across load resistor 141. Condenser 142 discharges and a single negative pulse is produced on resistor 143. The grid of tube 140b is connected to resistor 143 and the negative pulse on 143 increases the negative bias of tube 140b, reducing current flow through 140b and the voltage drop across resistor 144, which reduction is effective via line 147 (see also Fig. 5c) and condenser 310 (Fig. 5c) to produce a single pulse at "½ after D" on resistor 297b reducing the grid bias of tube 69b (E$u$) thereby turning on E$u$. With E$u$ "on," point 66b rises in potential at "½ after D," as illustrated in Fig. 12b, as does also the screen of tube 119a (Fig. 5c). The manner in which a rise in the screen potential of tube 119a causes appearance of advancing pulses on resistors 72a and 72b (Fig. 5c) and carry producing pulses on resistor 123b (Fig. 5i) is as described previously (section 6).

The reason for turning on E$u$ at "½ after D" rather than at "9," as might be expected, will be clear after considering the following: At the beginning of a subtraction cycle, E$u$ is "off," and it was shown in connection with the trigger circuit (section 2, Figs. 1 and 2) that a pulse applied concurrently to both portions of this circuit, shifts it to a reverse status. Consequently, if it be supposed that a 9 were to be subtracted, and a subtraction control "9" pulse (instead of a "½ after D" pulse) were to be applied to the grid of tube 69b (E$u$) and also a digit manifesting "9" manifestation were to be concurrently applied to tube 116 (E$u$) (to which subtractive entries are applied, see later), E$u$ would shift to an "on" status, and remain so, until "0." It is required, however, when 9 is to be subtracted, that no advancing or carry effecting pulses be produced. Hence, were the control for E$u$, as just supposed, advancing pulses would actuate the digit manifesting element portions, under conditions when none is required, since the nine's complement of 9, is 0. Therefore, in subtracting a nine, it is obvious that E$u$ must be allowed to turn on, without allowing any advancing (also any carry producing) pulses to be produced and must be turned off at "9." This condition is fulfilled by causing E$u$ to turn on at "½ after D," as described above, so that it will be turned off by the "9" pulse.

Reference to Fig. 12b indicates that point 66b (E$u$) begins to rise in potential at "½ after D." Even though there is an accompanying rise in the screen voltage of tube 119a, no pulse appears on resistances 72a and 72b for the following reason. The aforementioned rise in potential of point 66b (E$u$) is not instantaneous but occurs exponentially (see Fig. 12b). Therefore, there is a lapse of time before point 66b (E$u$) reaches its maximum high potential, and the same applies also to the screen voltage rise of tube 119a. This time interval exceeds the duration of a pulse, as illustrated in Fig. 12a, which pulse is applied to the grid of tube 119a (Fig. 5c). Hence, the pulse, as in Fig. 12a, applied at "½ after D," ceases to be effective by the time that the screen of tube 119a reaches its maximum voltage, as is seen by comparison of parts a and b of Fig. 12. Under these circumstances, tube 119a experiences concurrently, an increase of negative grid bias (because the amplitude of the pulse applied is decreased from its positive peak value) and an increase of screen voltage, which two conditions, oppose each other so that there is no current flow through the pentode. Accordingly, no pulses are produced, respectively, on resistances 123a, 72a and 72b (see Fig. 12c and d) at "½ after D." Also, since switch 191b (Fig. 5b) is closed, during subtraction, the supplemental circuit, previously described, including tube 303 (Fig. 5i) for providing the first carry pulse, is rendered inoperative, as described presently (Sect. 10).

Assume that it is desired to subtract a 6, Eu is turned on at "½ after D," as described above. A decreased voltage drop at "6" across resistance 294e (Fig. 5g) (section 5) is effective via line 105e (Figs. 5g and 5h), contacts 117u6 (Fig. 5h) now closed, (in a manner described later in sections 12 and 13), line 118u (see also Figs. 5b and 5c) and condenser 296a (Fig. 5c) to produce a positive pulse on resistor 297a which reduces the negative grid bias of tube 116 thereby turning off Eu at "6," with an accompanying potential drop of point 66b (Eu), as illustrated in Fig. 12b. Accordingly, the screen voltage of tube 119a (Fig. 5c) falls and advancing pulses are no longer produced on resistances 72a and 72b (Figs. 5c and 12d) and carry producing pulses are no longer produced on resistance 123b (Figs. 5i and 12j), as now understood. Consideration of the foregoing indicates that when a digit of 6 is to be subtracted, Eu (Fig. 5c) is "on" for three index point positions. During this interval the number of advancing pulses produced on resistances 72a and 72b is not only equal to the number of index point positions, namely, three, during which Eu is "on" but this number is equal to the nine's complemental value of the subtrahend, which in this case is 6. The same is true with regard to the number of pulses produced on resistor 123b (Fig. 5i) which it is noted are timed a half index point ahead of the advancing pulses, as is now understood. During subtraction, in contrast to operation during adding as explained presently in Sec. 10, the first pulse on resistor 123b is produced in the same manner as the others thereon.

Assuming that 5 stood in the units order of the accumulator prior to the subtractive entry of 6, these three advancing pulses are effective to turn on Au6—1L (Fig. 5c), Au7—2L (Fig. 5i) and Au8—3L. The manner in which advancing pulses actuate these digit manifesting element portions is now understood and the operation of these element portions, during this subtractive entry cycle, is illustrated in Fig. 12 parts e to i, inclusive. Attention is directed to the fact that at the beginning of the cycle Au5—0L and also Au6—1r, Au7—2r, Au8—3r and Au9—4r are "on" while just prior to "1," in the cycle, Au5—0L, Au6—1L, Au7—2L and Au8—3L and also Au9—4r are "on." In this manner, the nine's complement of 6, namely 3, is added to 5, with the result that 8 stands in the accumulator.

In order that a true difference amount may be formed, the true complement of 6, namely 4, should be added. As is understood when employing complemental addition as a method of subtracting, it is necessary to add an elusive one into the units order of an accumulator. In the electronic accumulator of this invention, provision is made for adding the elusive one and this operation takes place at "1," which is chosen as the carry time. It will be appreciated, however, that the elusive one could be added at any other index point position. The manner in which an elusive one entry is effected will now be described.

Referring to Fig. 5h, a "1" pulse, produced on resistor 104k (section 5), is effective via line 108 (see also Fig. 5b) to reduce the negative grid bias of tube 139a. Since the screen voltage of tube 139a is high, as above assumed, the reduction of its negative grid bias causes an increase of current flow therethrough and an increased voltage drop across load resistance 147. Condenser 148 discharges and a negative pulse is produced on resistance 149. The grid of tube 139b is connected to resistance 149 and a negative pulse thereon is effective to decrease current flow through tube 139b and the voltage drop across load resistance 150. Condenser 151 is charged and a positive pulse is produced on resistance 152, at "1." This "1" pulse is effective via line 153a (see also Figs. 5h and 5i) to reduce the negative grid bias of tube 130b (Fig. 5i) to effect carry through 9 operations, if such be required. The decrease in voltage drop across resistance 150 (Fig. 5b) is also effective via line 153b (see also Figs. 5h, 5i and 5c) and condenser 125b (Fig. 5c) to cause the appearance of a positive pulse on resistances 72a and 72b, at "1" (Fig. 12d). Such pulse results in the turning on of Au9—4L (Figs. 5i and 12i). At the termination of this subtraction operation, all left element portions are in "on" status, as illustrated diagrammatically in Fig. 12L, indicating that 9 now stands in the units order. Thus, the true complement of 6, namely 4, is added to 5, to form 9 which is the true difference between 5 and 6. The fact that 9 stands in the accumulator would be indicated by the glow tubes 78 of Au5—0L to Au9—4L, inclusive, (Figs. 5c and 5i) which would now be ignited, while the glow tubes 78 of all the right element portions would be dark.

It should be noted that when subtracting, the elusive one is applied to the units order by a circuit arrangement which is similar to the one which interconnects the carry effecting device of one order with the element portions and carry effecting device of the next. It will be understood, therefore, that entry of the elusive one is performed independently of the status of the entry control device Eu (Fig. 5c) and is applied at some index point position (specifically "1") which permits cooperation with the units order carry effecting device for carry through 9 requirements.

Figs. 13a to 13d, inclusive, and Fig. 13j illustrate special conditions occurring in similar portions of Eu and circuits controlled thereby, during the problem of the subtraction of 9, from 9 standing the accumulator. In this particular problem, at "½ after D," Eu (Fig. 5c) is shifted to an "on" status, as described above. Referring to Fig. 5g, a decrease in the voltage drop across resistor 294b at "9" (section 5) is effective via line 105b (see also Fig. 5h) contacts 117u9 (Fig. 5h), now closed (see sections 12 and 13), line 118u (see also Figs. 5b and 5c) and condenser 296a (Fig. 5c) to produce a positive pulse on resistance 297a reducing the grid bias of tube 116 (Eu) thereby turning off Eu at "9." The rise and fall in potential of point 66b (Eu), as a result of this operation of Eu, is illustrated in Fig. 13b. Reference to Fig. 13d indicates that due to this operation, no advancing pulses are produced on resistances 72a and 72b (Fig. 5c) and reference to Fig. 13j indicates that no carry causing pulses are produced on resistor 123b (Fig. 5i) during the "9" through "0" interval when the digit 9 is subtracted. This is in accordance with the general description of the operation of Eu, as given above. Accordingly, there is no actuation of associated digit manifesting element portions.

In discussing the principles of operation of the electronic accumulator for subtraction, it was stated that the number of advancing pulses, provided by an entry control device, equals the nine's complement of the digit to be subtracted. In the instant problem, this digit is 9 and its nine's complement is 0. Therefore, no advancing pulses are required and during the "9" through "0" interval, all left element portions (Figs. 5c and 5i) remain "on," as at the beginning of the cycle.

At "1" (Fig. 13d), an entry of the elusive one is made, in the manner described above and an increment of 1 is added to the units order to thereby turn on $Au5$—$0r$ (Figs. 13e and 5c). Thus, the true complement of 9, namely 1, is added to 9, to form 0, which is the true difference between 9 and 9. The fact that 0 stands in the units order of the accumulator would be indicated by the glow tubes 78 of $Au5$—$0r$, and of $Au6$—$1L$, $Au7$—$2L$, $Au8$—$3L$, and $Au9$—$4L$ which would now be ignited, while those associated with the remaining element portions would be dark. It will be understood that the principles of subtraction, as explained above, apply also to the tens and hundreds orders of the accumulator.

This section describes the operation of the entry control device and associated digit manifesting element portions of an accumulator order when two digits are successively entered therein, subtractively. First 6 is subtracted from 5, and next a 9 is subtracted from 9 with the result that 0 stands in the order. An explanation is given of the entry control device and it is seen that this is turned on, at a fixed time early in a cycle, and is turned off, at a differential time corresponding to the digit subtracted. This entry control device, when "on," allows advancing pulses, which in number equal the nine's complement of the subtrahend, to be effective for sequentially operating digit manifesting element portions. The manner of introducing the elusive one is also described. It is shown that as a result of these operations, the combinational "on" and "off" status or pattern of said element portions, finally assumed, is indicative of the difference between the digit originally standing in the order and the subtrahend.

10. Carry effecting device—Subtracting

When the method of complemental addition is employed as the basis of subtraction, as in this embodiment of the invention, the process of determining when there are carry requirements may be best understood by remembering that nine's complements, of digits to be subtracted, are added, and that when the sum of the nine's complement of a subtrahend and a digit already standing in the accumulator, equals or exceeds ten, a given order passes from 9 to 0 and a carry requirement exists.

Applying this rule to each of the subtraction problems described in section 9, it is seen that when a 6 is subtracted from 5 (3 added to 5) no carry is required; and that when a 9 is subtracted from a 9 (0 added to 9) no carry is required. When, however, in the units order, 9 is subtracted from 9, a "carry though 9" between the units and tens order is required, by virtue of the elusive one entry in the units order, as will be explained presently.

Attention is directed to the fact that with regard to these two problems, and prior to the entry of the elusive one, either the same digit or one which is numerically higher, finally stands in the accumulator. On the other hand, it will be understood, that when there is a passage of an order from 9 to 0, the resulting combinational "on" and "off" status or pattern of element portions has a corresponding numerical designation, which is less, in value, than that of the digit standing in the accumulator at the beginning of a subtraction cycle. Conversely, whenever a digit is subtracted in the accumulator and the combinational "on" and "off" status or pattern of element portions has a numerically lower designation, than that which exists prior to entry, the accumulator has passed from 9 to 0 and a carry increment must be added into the next higher order. It is appreciated that the principles of carry which apply in adding also apply in subtracting. Accordingly, the carry effecting device (section 8), which is employed in adding, may also be utilized in subtracting operations so that the mode of construction and operation of such units order device (Fig. 5i) need not be described in detail.

In section 6, in connection with addition in the tens order, there was described a supplemental circuit including tube 303 (Fig. 5j, for example) for producing the first carry pulse on resistance 123b (tens order, Fig. 5j). Such supplemental circuit was required, since the tens order tube 119a (Fig. 5d), when rendered operative by the "on" status of Et, allowed (via line 122c) one less than the required number of carry pulses to appear on resistance 123b (Fig. 5j). During subtraction, the utilization of this supplemental circuit is not required, for reasons set forth presently, and this circuit is rendered non-operative as follows. Referring to Fig. 5b, switch 191b, which is normally open, is closed during subtraction, thereby shunting a portion of resistance 301, so that the junction of resistors 301 and 300, and also the line 302, are substantially at the potential of line 51. Since the screens of tubes 303 (Figs. 5i, 5j and 5k) are connected to line 302, flow through 303 is at a minimum, and an increase in the negative grid bias of these tubes will now be ineffective to decrease current flow therethrough, and the supplemental circuit is rendered inoperative during subtraction, so that the turning on of Eu (Fig. 5c), Et (Fig. 5d) and Eh (Fig. 5e) does not cause, via the respective lines 303a, production of a positive pulse, respectively, on their associated resistances 123b, in the manner as previously described in Sec. 6.

As explained in Sec. 6, in adding, entry control device Et was switched on, at an index point position corresponding to the digit to be added, i. e., "9," "8," etc. The exponential rise in the screen voltage of the tube 119a associated with Et was merely beginning at an exact index point and a negative grid bias reduction of this tube, exactly at an index point, was prevented from causing increased current flow therethrough, so that no carry pulse was produced on its related resistance 123b, at the same instant that Et was switched on. On the other hand, when subtracting, an entry control device is switched on at a mid-index point time, namely "½ after D" so that the screen voltage of its associated tube 119a is at full high potential by the time that "9" is reached (unless there is subtractive entry of 9 and the entry device is turned off) at which time a grid bias reduction of 119a occurs. This grid bias reduction causes increased current flow through 119a and the first one, of the required number of carry causing pulses, is (contrary to operation during addition) produced, via line 122c, on associated resistance 123b.

Since, as stated in Sec. 9, the elusive one is applied to the units order by circuit arrangements which are similar to the ones which interconnect the carry effecting device of one order with the element portions and also with the carry effecting device of the next, it is now deemed obvious, that electronic carry effecting circuits are provided, whereby, upon subtracting, carry operations may be controlled, if an order of the electronic accumulator passes from 9 to 0, or if an order stands at 9 and is carried into 0 either by carry from a lower order or by reception of an elusive one.

It is also seen that in the present embodiment such carry circuits apply to an electronic accumulator adapted for both adding and subtracting, that the underlying principles by which these circuits operate are universal and that they apply to any number of orders of such an accumulator.

Having described its underlying principles, there will now be described the specific operation of a key-controlled embodiment of the electronic accumulator into which multidenominational quantities may be entered.

11. General—Key controlled machine

The key controlled machine, in which there is incorporated an electronic accumulator comprising a plurality of orders, is constructed and operated, briefly, as follows: The operator sets up multidenominational amounts in succession upon a keyboard. Having set up any one amount, a motor bar is depressed and an entry of each order item of the multidenominational amount is effected concurrently into the respective orders of the electronic accumulator. The circuits and associated devices are capable of performing both adding and subtracting operations. An indication, in true numeral outline, of the numbers comprising the total amount standing in the accumulator, is provided by cathode ray oscilloscopes, one of which is provided for and controlled by the respective order, digit manfesting element portions of the accumulator. After a series of amounts have been entered into the machine and the total thereof taken, the operator manipulates switches and control circuits which thereby reset all orders of the accumulator to zero. Subsequently, further amounts may be entered into the machine.

12. Structure—Key controlled machine

Referring to Figs. 17 and 18, the machine is shown as including a base comprising a cabinet 154 in which are located the electronic devices and associated circuits of the novel key controlled electronic accumulator, and also various control mechanisms for the indicating cathode ray oscilloscopes. The top 155, of cabinet 154 comprises a base for mounting two sections of the complete device.

Mounted on cabinet top 155, at the left side, as viewed in Fig. 17, is a keyboard section enclosed by a casing 156. Projecting through the top of the casing are key stems 157, to each of which is fastened a numbered key top 158. Three banks of ten keys each, one bank for each of three orders, are provided.

At the right side of the cabinet top 155 is located the indicating oscilloscope unit. This unit comprises three cathode ray tubes 159u, 159t, and 159h, mounted in a suitable sheet metal housing including two side plates 160 and 161, fastened to the cabinet top 155. The cathode ray tubes are supported by suitable sockets 162 (Fig. 18) fastened to a frame member 163, extending between the side plates 160 and 161. The ends of the cathode ray tubes extend through openings in the front end 164 of the sheet metal housing. A funnel-shaped hood 165, provided at the front of this unit increases the clarity of the images on the cathode ray tubes.

In Fig. 19 is illustrated the interior construction of the units order keyboard control comprising the key stems 157 guided by slots in a cover 166, and cross members 167 and 168, respectively. Springs 169, stretched between lugs 170 on the key stems and suitable spring anchors in the cross member 167, hold the keys in their undepressed positions in which they are located by ledges 171, formed on the key stems, abutting cover 166. The lower ends of the key stems carry insulation pieces 172. These pieces coact with the movable member of the contact assemblies, generally designated 117, in such a manner that when a key stem is depressed, a normally open, contact assembly, is closed. Contact assemblies 117 are supported by a frame member 173, there being one contact assembly for each key stem.

A means for holding the keys depressed is provided as follows: An elongated key bar 174 is provided for each bank of keys. This elongated bar 174 is pivoted at each end to the top of links 175, respectively, whose lower ends are loosely mounted and spaced on shafts 176 extending the width of the keyboard and supported by the keyboard frame. Springs 177, respectively fastened to each bar 174, urge each bar to the right, as viewed in Fig. 19, until bent over ears 178, forming a part of the bar, respectively abut the cam surfaces 179, of the key stems 157. If any key, in the units order, for example, is depressed; during the first part of its downward movement, a camming surface 179 on a key stem 157 will move an ear 178 to the left, as viewed in Fig. 19, and cause its bar 174 to move likewise. Further downward movement of the key stem permits the ear 178 to return a short distance to the right and lodge on top of a ledge 180, thus holding the key depressed and consequently its contacts closed. It will be understood that the foregoing applies as well to the tens and hundreds order key banks and associated contacts.

A motor bar 181 is provided, which is mounted on the top of a stem 182. The stem 182 is guided by slots in the cover 166 and in the cross members 167 and 168, respectively. A spring 183 holds this stem in its undepressed position. A center blade 181 M. B. of a three part contact assembly 184 located to the left of the stem 182 is actuated by an insulation block 185, fastened to the stem 182 of motor bar 181. As shown in Fig. 19, the right-hand contacts of assembly 184 are closed when the motor bar is not depressed. Upon depression of the motor bar, however, the camming surface on the block 185 causes the center blade 181 M. B. to move to the left, thus opening the right-hand pair of contacts and closing the left-hand pair of contacts. Releasing the motor bar restores these pairs of contacts to their normal positions, as illustrated in Fig. 19.

Having described the mechanical details (with the exception of those relating to the indicating oscilloscopes), of the key controlled machine, the electrical circuits will now be discussed in detail. The complete wiring diagram of this machine is incorporated in Figs. 5a to 5m, inclusive, these figures being grouped together and arranged, as indicated in Fig. 5.

13. Operation—Key controlled machine

The operation of this machine will be described in detail in connection with entries of three multi-denominational quantities; two of which will be added, and the third of which will be subtracted.

Closure of switch 79 (Figs. 17, 18 and 5a) connects lines 50 and 80 to a potential source of polarity indicated, and closure of switch 186 (Figs. 17, 18 and 5m) connects lines 187 and 51 to another potential source, of the polarity indicated. Lines 187 and 51 supply power for indicating oscilloscopes which are described later (section 14). Closure of switch 188, (Figs. 17, 18 and 5L) supplies power to a motor 189 and lamps 190 for purposes also explained in section 14.

Before making entries into the accumulator, the operator opens switch 101 (Figs. 17, 18 and 5a) which permits advancing pulses to be effective to continually, sequentially operate the electronic commutator (section 5) to produce, cycle after cycle, the required digit representing and control pulses, timed within a cycle. Attention is particularly directed to the fact that, as described later in sect. 16, no manual operation is required (other than that related to starting) to condition the commutator, to supply pulses having the proper timed relationship.

The accumulator is then reset to zero in a manner to be described later (section 15) thereby placing $Au5$—$0r$ (Fig. 5c), $At5$—$0r$ (Fig. 5d) and $Ah5$—$0r$ (Fig. 5e) in "on" status, all remaining, right digit manifesting element portions, being turned off. It is assumed that the first amount which is to be entered into the accumulator is to be additively entered. Accordingly, switches 191a and 191b (Fig. 5b) both controlled by toggle 191 (Figs. 17 and 18) are in the position, as shown.

It is assumed that the first multidenominational amount to be additively entered is 159. The operator therefore depresses the 1, 5 and 9 key tops 158 (Figs. 17 and 18) in the hundreds, tens and units orders, respectively, of the keyboard, causing closure of contacts 117h1, 117t5 and 117u9 (Fig. 5h). The closure of these contacts permits digit manifesting pulses "1," "5" and "9" to initiate operations of the entry control devices in the respective orders of the accumulator upon depression of motor bar 181 (Fig. 19) to move 181 M. B., as described presently. It is appreciated that the operator desires to enter the amount of 159 into the accumulator, only once, and mention has been made heretofore (sections 6 and 9) that a single entry control device is provided for this purpose. The manner in which this device functions is as follows:

In general, when operation of the single entry control device is initiated by the operator's depression of the motor bar 181 (Figs. 17, 18 and 19), such depression may occur at any time, within a machine cycle as defined by operation of the electronic commutator (Figs. 5a and 5g). In its operation, the single entry control device coordinates a manual operation, which may occur at any time, with the basic timing of the electronic commutator and other parts of the accumulator, so that this manual operation need not be specially timed with respect to any cyclical operation. In addition, the single entry control device is so arranged that its control over digit manifesting pulses is exercised, for one machine cycle, only. Thus, for each depression of the motor bar, all digits, of the amount set up on the keyboard, are entered, concurrently, into the respective orders of the accumulator, and once, only.

Referring to Fig. 5b, the single entry control device comprises two elements, of the type described previously (section 2, Figs. 1 and 2). These two elements are designated T1 and T2 and portions of their circuits which correspond in character and function to those of the circuits illustrated in Figs. 1 and 2 are given the same reference characters. The details of the operation of this device is as follows, assuming that both T1 and T2 are initially "off."

In Fig. 5b, a voltage divider comprising resistors 192 and 193 is provided between lines 50 and 51. The central blade 181 M. B., of contact assembly 184 (Fig. 19) controlled by the motor bar 181, is normally positioned as shown (Fig. 5b) and connects the junction point of these resistors to one side of condenser 194, whose other side is connected to line 51. With the central blade 181 M. B. of contact assembly 184, in the position shown, condenser 194 is charged to the potential across resistance 193. Upon depression of the motor bar 181 (Fig. 19) the central blade 181 M. B. (see also Fig. 5b) shifts to the reverse position, from that shown, and the charge on condenser 194 is completely dissipated in the form of a sharp pulse on resistor 195. Another pulse cannot be produced on 195 until condenser 194 is again charged and this does not occur until central blade 181 M. B. is returned to the position, as shown, (Fig. 5b) upon release of motor bar 181 (Fig. 19). Hence, for each depression of the motor bar, only one pulse is produced on resistance 195 (Fig. 5b). Maintained depression of the motor bar merely serves to maintain condenser 194 in discharged condition and therefore no additional pulse appears on 195.

The grid of tube 196 (T1) is connected to resistor 195, so that when the pulse appears on 195, T1 is turned on, as is now well understood, and its point 66b rises in potential. The shift of T1 to an "on" status and the accompanying rise in potential of its point 66b is illustrated in Fig. 14a (1) occurring between "7" and "6" in a machine cycle.

The screen of tube 69b (T2) is connected via screen current limiting resistor 74b to the midpoint of resistance 63b (T1), and, with T1 "on," the screen potential of tube 69b (T2) is raised, so that a reduction in its negative grid bias will be effective to turn on T2.

The manner in which a pulse is produced at "D" (which is the same as "0," in this embodiment) on resistor 104L (Fig. 5h) was explained in section 5, and such pulse is effective via line 106 (see also Fig. 5b) to reduce concurrently the negative grid bias of tubes 69a and 69b (T2). Since T2 is "off," and since, as stated above, the screen potential of its tube 69b is now high, negative grid bias reduction of 69b at "D" causes T2 to be turned on. With T2 "on," its point 66b rises in voltage, at "D," as is shown in Fig. 14b (1).

Summing up, it is now seen from the foregoing that whenever the operator depresses the motor bar, shifting center blade 181 M. B. (Fig. 5b) to the reverse position from that shown, T1 is turned on and this turning on may occur at any time in a machine cycle. It is also seen that when T1 is "on," it permits T2 to be shifted to an "on" status, at a definite time only, in a machine cycle, namely, "D" (or "0") which, as is now understood, marks the beginning of a machine cycle. As is explained later in this section, T2 remains "on" for one machine cycle, only.

The screens of pentodes 69b of E$u$ (Fig. 5c), E$t$ (Fig. 5d) and E$h$ (Fig. 5e) are each connected to line 197, which extends via screen current limiting resistor 74b (T2) to the midpoint of resistance 63b (T2). With T2 "on," which occurs at "D" or the beginning of a cycle, which is, in this case, the entry cycle, the screen potential of all these pentodes 69b is high and negative grid bias reductions thereof are effective to turn on E$u$ (Fig. 5c), E$t$ (Fig. 5d) and E$h$ (Fig. 5e). Such reductions occur at differential times during the entry cycle, in accordance with the digit representing pulses applied to the respective grids via lines 118$u$, 118$t$ and 118$h$, as previously described for 118$t$ (section 6). Since an amount of 159 is to be entered, E$h$, E$t$ and E$u$ are turned on at "1," "5" and "9" respectively. The accompanying potential rise of points 66b of E$h$, E$t$ and E$u$ and the resultant production of one, five and nine advancing pulses on the related pairs of resistances 72a and 72b are illustrated, respectively, in Figs. 16e (1), 16c (1) and 16a (1). Likewise, the resultant production of carry causing pulses on associated resistances 123b is illustrated, respectively in Figs. 16f (1), 16d (1) and 16b (1).

The nine advancing pulses which appear on resistances 72a and 72b (Fig. 5c) (units order) cause sequential operation of A$u$6—1$r$, A$u$7—2$r$ (Fig. 5i) etc., as is now understood, with the result that, at the termination of the cycle, all left element portions are in "on" status, Fig. 16a (1).

The five advancing pulses which appear on resistances 72a and 72b (Fig. 5d) (tens order) cause sequential operation of A$t$6—1$r$, A$t$7—2$r$ (Fig. 5j) etc., so that at the termination of the cycle, A$t$5—0L, is "on" and all remaining left element portions are "off," Fig. 16c (1).

The single advancing pulse produced on resistances 72a and 72b (Fig. 5e) (hundreds order) causes A$h$6—1$r$ only, to turn on so that at the termination of the cycle A$h$5—0$r$ and A$h$6—1$r$ are "on" and all remaining right element portions are "off," Fig. 16e (1).

Since, obviously, none of the accumulator orders passes from 9 to 0 during the entry of 159, the carry effecting devices are not operated, as is seen in Figs. 16b (1), 16d (1) and 16f (1), respectively.

The b-phased pulses (sections 4 and 6), which are continually produced on resistance 98 (Fig. 5a) and which are applied via line 120 (see also Figs. 5b, 5c, 5d and 5e) to the grids of pentodes 119a, relating, respectively, to the three orders of the accumulator, are illustrated in Fig. 15. E$u$, E$t$ and E$h$ are turned off at "0," via lines 114 and tubes 116, respectively, as described in Sect. 6.

The turning on of T1 and T2 is described previously in this section. With T2 "on," T1 may now be turned off, since it has performed one of its functions, namely, causing T2 to be turned on. T2, when in "on" status, is utilized to control the shift of T1 to an "off" condition, as will now be described. The screen of tube 69A (T1) is connected to line 197, so that its potential is high when T2 is "on." During the cycle in which 159 is entered, therefore, the screen voltage of tube 69a (T1) remains high, so that a reduction of its negative grid bias turns off T1. The production of a pulse at "1" on resistance 104k (Fig. 5h) has been described (section 5), and said pulse is effective via line 108 (see also Fig. 5b) to reduce the negative grid bias of tube 69a (T1) so that T1 is turned off. The accompanying fall in potential, at "1," of point 66b (T1) is illustrated in Fig. 14a (1).

As explained above, the function of T2 (Fig. 5b) is to permit only a single entry of the amount 159. It follows, therefore, that T2 must not remain "on" longer than one machine cycle. The shift of T2 back to an "off" condition is the second function of T1. This may be performed by T1, only when it is "off," to which status it is returned at "1," as just described. With T1 now "off," its point 66a is at a high potential with respect to line 51 and the screen of tube 69a (T2), which is connected via screen current limiting resistor 74a (T1) to the midpoint of resistance 63a (T1), is, therefore, also high. A reduction in the negative control grid bias of tube 69a (T2) is therefore effective to turn off T2. The control grid of tube 69a (T2) is connected to line 106, to which is applied a pulse, at "0," as previously described, so that this pulse occurring at the termination of that machine cycle in which 159 is entered, turns off T2. The accompanying drop in potential, at "0," of point 66b (T2) is illustrated in Fig. 14b (1). Since the screen potential of tubes 69b of E$u$ (Fig. 5c), E$t$ (Fig. 5d) and E$h$ (Fig. 5e) also simultaneously drop, further applications to their respective grids (in following machine cycles) of digit manifesting pulses "9," "5," and "1" do not cause E$u$, E$t$ and E$h$ to be turned on. Hence, no further entries of 159 occur, so that the element portions of the three orders remain in the combinational "on" and "off" status or patterns, above described, until another entry is made.

The foregoing has described, in the additive entry of an amount 159 into the electronic accumulator, the detailed operation of circuits comprising a single entry control device, and the manner in which said device permits only one entry of the amount 159.

Assuming now that a different amount, for example, 647 is to be additively entered into the accumulator. The operator depresses the 6, 4 and 7 key tops 158 (Figs. 17 and 18) in the hundreds, tens, and units orders, respectively, of the keyboard, producing closure of contacts 117h6, 117t4 and 117u7 (Fig. 5h). The closure of these contacts permits the digit manifesting pulses "6," "4" and "7" to initiate operations of the entry control devices in the various respective orders of the accumulator. Upon the operator's depression of the motor bar 181 (Figs. 17 and 18), center blade 181 M. B. (Figs. 19 and 5b) shifts to the reverse position from that shown and the charge on condenser 194 is completely dissipated across resistor 195, as described above. The resultant pulse turns on T1 between "3" and "2" (by happenstance) in a machine cycle and the accompanying rise of point 66b (T1) is illustrated in Fig. 14a (2). By the control afforded by the "on" status of T1 (Fig. 5b), T2 is turned on at "0" (or "D"), as explained above. The rise of point 66b (T2) at "0" is illustrated in Fig. 14b (2). With T2 "on," digit representing pulses may now initiate operation of the various entry control devices.

Since T2 is "on," the screens of tubes 69b (E$u$, Fig. 5c; E$t$, Fig. 5d, and E$h$, Fig. 5e) are at high potential and negative grid bias reductions thereof turn on E$u$, E$t$ and E$h$, such reductions occurring at differential times in the cycle in accordance with the digit representing pulses applied to the respective grids. Since an amount of 647 is to be additively entered, E$h$, E$t$, and E$u$ are turned on at "6," "4" and "7," respectively. The accompanying potential rise of points 66$b$ of E$h$, E$t$ and E$u$ and the resultant production of six, four and seven (exclusive of carry produce) advancing pulses on related resistances 72$a$ and 72$b$, are illustrated, respectively, in Figs. 16$e$ (2), 16$c$ (2) and 16$a$ (2). Likewise the resultant production of carry causing pulses on associated resistances 123$b$ is illustrated, respectively, in Figs. 16$f$ (2), 16$d$ (2) and 16$b$ (2).

The seven advancing pulses which appear on resistances 72$a$ and 72$b$, Fig. 5$c$ (units order) cause sequential operation of A$u$5—0$r$, A$u$6—1$r$, etc., with the result that, at the termination of the cycle, A$u$5—0L and A$u$6—1L, (Fig. 5$c$) are "on" and all remaining left element portions are "off"; see Fig. 16$a$ (2).

The four advancing pulses (exclusive of carry produced) which appear on resistances 72$a$ and 72$b$, Fig. 5$d$ (tens order), after entry of a carry; see Fig. 16$c$ (2) cause sequential operation of A$t$7—1L, A$t$8—3L, etc., so that at the termination of the cycle, A$t$5—0$r$ is "on" and all remaining right element portions are "off."

Referring to Fig. 16$e$ (2), the six advancing pulses plus the carry produced pulse produced on resistances 72$a$ and 72$b$, Fig. 5$e$, (hundreds order) cause sequential operation of A$h$7—2$r$, A$h$8—3$r$, etc., so that at the termination of the cycle (during which a carry is received) A$h$5—0L to A$h$8—3L, inclusive, are "on" and A$h$9—4L is "off" E$u$, E$t$ and E$h$ are turned off, at "0," as before.

The addition of 7 to 9 in the units order causes said order to pass from 9 to 0, and accordingly the units order carry effecting device (section 8) causes a carry increment to be added to the tens order and such addition of a carry, in the tens order, occurring at "7" (at which time the first carry causing pulse of the 7 entry is produced) is illustrated in Figs. 16$b$ (2) and 16$c$ (2).

The addition of 4, to 6 now in the tens order, due to carry from the units order, causes the tens order to pass from 9 to 0, at "1," (at which time a carry pulse coincides with a condition of the tens order, indicative of 9) whereupon the tens order carry effecting device effects an entry of a carry into the hundreds order, as illustrated in Figs. 16$d$ (2) and 16$e$ (2).

During the cycle in which 647 is entered, T1 (Fig. 5$b$) is turned off, at "1," under the control of T2, followed by a shift of T2 to an "off" status, at "0," under the control of T1, as described in this section. The accompanying voltage drop of points 66$b$ in T1, at "1," and T2, at "0," is illustrated, respectively, in Figs. 14$a$ (2) and 14$b$ (2). Since the screen potential of tubes 69$b$ of the entry control devices E$u$, E$t$ and E$h$ also drops, further applications to their respective grids of digit manifesting pulses "7," "4" and "6" in subsequent cycles, do not cause the entry control devices to be turned on. Hence, further entries of 647 cannot occur.

The foregoing has described the entry of an amount 647 additively into the electronic accumulator, which already contains the quantity 159 to form the sum 806. Accordingly, the element portions of the respective orders remain in the combinational "on" and "off" status pattern, as described above, until a following entry is made. It was pointed out that upon addition of the second amount to the first, there were requirements for carry and such carry operations have also been explained.

In order to subtract, the operator throws toggle 191 (Figs. 17 and 18), thus shifting both switches 191$a$ and 191$b$ (Fig. 5$b$) to a reverse position from that shown. With switch 191$a$ shifted, the screens of tubes 139$a$ (Fig. 5$b$) and 69$b$ (T3) are connected to line 197, which is connected, through screen current limiting resistor 74$b$ to the midpoint of resistance 63$b$ (T2). With switch 191$b$ closed, part of resistance 301 is shunted and, via line 302, the screens of tubes 303 (Figs. 5$i$, 5$j$ and 5$k$) are placed near the potential of line 51 (section 10). With this circuit arrangement, during subtraction, the screen voltage of tubes 139$a$ (Fig. 5$b$) and 69$b$ (T3) is determined by the status of T2 and it is to be noted that T2 is "on" during a single complete machine cycle, when an entry is made. Accordingly, the screen potential of tubes 139$a$ and 69$b$ (T3) is high during a single full subtraction cycle and reductions in negative grid bias of these tubes are effective to increase current flow through tube 139$a$ and, as described in detail, presently, to turn on T3.

Let it now be assumed that a third amount of 203 is to be entered, subtractively, into the accumulator. The operator depresses the 2, 0 and 3 key tops 158 (Figs. 17 and 18) in the hundreds, tens and units orders, respectively, of the keyboard producing closure of contacts 117$h$2, 117$t$0, and 117$u$3 (Fig. 5$h$). The closure of contacts 117$h$2 and contacts 117$u$3 permits, upon depression of the motor bar, the digit representing pulses "2" and "3" to control operations of the entry control devices in the respective orders of the accumulators. The closure of contacts 117$t$0 has no circuit effect.

Upon the operator's depression of the motor bar 181 (Figs. 17, 18 and 19), center blade 181 M. B. (Figs. 19 and 5$b$) shifts to a reverse position from that shown, and the charge on condenser 194 is completely dissipated across resistor 195, as now understood. The resultant pulse turns on T1 and the accompanying rise in potential of point 66$b$ (T1) is shown in Fig. 14$a$ (3), as occurring, by happenstance, between "1" and "0." By the control afforded by the "on" status of T1 (Fig. 5$b$), T2 is turned on, at "0," as previously described, and the rise of point 66$b$ (T2), at "0," is shown in Fig. 14$b$ (3).

It may be explained that the purpose of the element T3 is to control the production of a "½ after D" pulse for subtracting operations. The element T3 is similar to that described previously (section 2, Fig. 2) and portions of its circuit, which correspond in character and function to those of the circuits shown in Fig. 2, are given the same reference characters. The rise in potential of point 66$b$ (T2) (Fig. 5$b$) causes an accompanying rise in the screen potential of tube 69$b$ (T3) so that, a large enough, negative grid bias reduction of tube 69$b$ (T3), at "0," via line 106 (to which line a sufficiently strong "0" pulse is applied) causes T3 to be switched on, concurrently, with T2, despite the exponential rise in voltage of 66$b$ of T2. The rise of point 66$b$ (T3), at this time, is shown in Fig. 14$c$ (3). The screen of tube 140$a$ (Fig. 5$b$) is connected via line 109 through screen current limiting resistor 74$b$ to the midpoint of resistance 63$b$ (T3) and, accordingly, the screen voltage of tube 140$a$ is determined by the status of T3. With T3 "on," the screen potential of tube 140$a$ is high and a positive $b$-phased pulse appearing on line 120 (section 4) and applied to its grid, produces an increased voltage drop across resistance 141 and a negative pulse on resistor 143 to which the grid of tube 140b is connected, so that there is produced a decreased voltage drop across resistance 144 at one-half an index point position after "0" (or "D") at which time T3 was turned on, so that this decreased voltage drop occurs at "½ after D." No further positive b-phased pulse is effective on tube 140a, since T3 is switched off at "9," as described presently, so that the screen potential of tube 140a falls to a low value.

The screen potential of tube 69a (T3) is normally maintained at high value by virtue of its connection to the junction of resistors 311 and 312 which form a voltage divider between lines 50 and 51. Accordingly, a grid bias reduction of tube 69a (T3) is effective to switch off said element, if it be "on," as is now the case. The grid of tube 69a (T3) is connected, via line 295, to resistor 104m (Fig. 5h) which has produced thereon a "9" pulse, once each machine cycle (section 5). Therefore, one-half an index point after the decreased voltage drop on resistor 144 (Fig. 5h), as described above, the grid bias reduction of tube 69a (T3) causes T3 to be turned off and tube 140a is not affected by further b-phased pulses applied to its grid. The return of T3 to "off" status, at "9," is shown in Fig. 14c (3).

The decreased voltage drop across resistor 144 is effective via line 147 (see also Figs. 5c, 5d and 5e) and condensers 310, respectively, to produce positive entry control pulses at "½ after D" on related resistances 297b to turn on Eu, Et and Eh concurrently, at "½ after D." The accompanying potential rise of points 66b of these entry control devices and the resultant production of advancing pulses on related resistances 72a and 72b are shown in Figs. 16a (3), 16c (3) and 16e (3). Accordingly, sequential operation of the digit manifesting element portions in three orders of the accumulator is initiated. This action continues in each order until the differential times corresponding to the digits, which are to be subtracted (section 9).

In the units order, 3 is to be subtracted and at "3," accordingly, Eu (Fig. 5c) is shifted to an "off" status (section 9). During the six index point positions that Eu is "on," six carry causing pulses are produced and six advancing pulses are effective to sequentially operate related digit manifesting element portions. At the termination of the cycle, during which there is an elusive one entry, as described later, Au5—0r, Au6—1r, Au7—2r and Au8—3r are in "on" status and Au9—4r is "off"; Fig. 16a (3).

In the tens order, 0 is to be subtracted and at "0," therefore, Et (Fig. 5d) is turned off, in the normal manner (section 6). No "0" digit representing pulse is applied to line 118t (see also Figs. 5b, 5c and 5d) since contacts 117t0 are merely closed without closing any circuit. During the nine index point positions that Et is "on," nine advancing pulses are effective to sequentially operate related digit manifesting element portions. At "6" in the cycle (at which time the units order produces a carry) the tens order receives a carry, so that at the termination of the cycle, At5—0r (Fig. 5d) is in "on" status and the remaining right element portions of the tens order are "off" Fig. 16c (3).

In the hundreds order 2 is to be subtracted, and at "2," accordingly, Eh (Fig. 5e) is shifted to an "off" status (section 9). During the seven index point positions that Eh is "on," seven advancing pulses are effective to sequentially operate related digit manifesting element portions. At "1" in the cycle, the hundreds order receives a carry, so that at the termination of the cycle, Ah5—0L and Ah6—1L (Fig. 5e) are in "on" status and the remaining left element portions are in "off" status; Fig. 16e (3).

The manner in which the elusive one is applied to the units order is as follows: With T2 (Fig. 5b) "on," the screen potential of tube 139a is high, and a "1" pulse applied to its grid, via line 108, produces (in cooperation with tube 139b) a decreased voltage drop across resistance 150 and a positive pulse on resistance 152 (section 9). Such decreased voltage drop across 150 is effective, via line 153b, to add one, in the units order, at "1" (section 9). The pulse on resistor 152 is effective via line 153a (Figs. 5h and 5i) to reduce the grid bias of tube 130b (Fig. 5i) of the units order carry effecting device, so that a carry through 9 could take place, if such were required by the units order standing at 9 just prior to elusive one entry, (sections 8 and 10). During the cycle in which 203 is subtractively entered, T1 (Fig. 5b) is turned off, at "1," under the control of T2, followed by a shift of T2 to an "off" status at "0" under the control of T1, in a manner now understood. The accompanying voltage drop of points 66b in T1 at "1" and T2 at "0," is shown respectively, in Figs. 14a (3) and 14b (3). Since the screen potential of tubes 69b (T3) and 139a (Fig. 5b) drops when T2 is turned off, further production of "½ after D" entry controlling pulses and of elusive one and carry pulses is suspended, so that further subtractive entries of 203 cannot occur.

In connection with the above explanation of subtracting operations, it is shown that T3, controlling the pair of tubes 140a and 140b, permits a "½ after D" pulse to effect turning on of all entry control devices, while tubes 139a and 139b permits a "1" pulse to effect entry of the elusive one and to effect carry operations, if the units order stands at 9. It has also been shown that, during subtraction, tube 139a and T3 are conjointly controlled by T2, of the single entry control device. It is therefore seen that during subtraction, the single entry control device not only performs its regular function of permitting a single entry only, to be made into the accumulator, but it also performs the additional function of a subtraction control device.

The foregoing has described the entry of an amount 203, subtractively, into the electronic accumulator, which already contains the quantity 806, to form the difference amount 603. Accordingly, the combinational "on" and "off" status or pattern of the element portions, as described, persists until a following entry is made. It was pointed out that upon the subtraction of this third amount from the sum of the first two quantities entered, there were requirements for carry, and such carry operations have also been explained as was also the entry of the elusive one in the units order.

It will be appreciated that the neon lamps 78 (Figs. 17, 5c, 5d, 5e, 5i, 5j and 5k) associated with and controlled by each of the digit manifesting element portions in the three orders of the accumulator may be utilized to indicate the amount standing in the accumulator at the termination of any of the foregoing entry cycles described above. However, the digit manifesting element portions of the electronic accumulator are adapted to control indicating cathode ray oscilloscopes whereby the digit standing in any order may be displayed in true numeral outline. The manner in which the various orders of the accumulator control the oscilloscopes and their mode of operation will now be described.

14. Indicating

Before describing in detail the method of indicating digits standing in the electronic accumulator, a more general explanation will be given. Two elements are utilized, one of which is the indicating element for displaying numerals, in true numeral outline upon the fluorescent screens of cathode ray tubes, and the other of which comprises a control element, including a pattern component emitter, which generates and transmits potential changes to the cathode ray tubes, so that the latter tend to display a composite outline composed of all the different digits. The control element also includes selectors which operate synchronously with, and in timed relation to, the pattern component emitter. The potentials applied to certain of the deflecting plates of the cathode ray tubes for controlling the formation of character outlines are derived from amplifying tubes whose input is controlled by the pattern component emitter. Similar deflection plates of each cathode ray tube have the same potentials applied thereto.

With regard to a given order, when a particular digit is to be indicated, the negative grid bias of a related cathode ray tube is decreased, under control of the combinational "on" and "off" status or pattern of the element portions and by a selector corresponding thereto; either for a continuous period of time or for successive periods of time with intervals therebetween, so that the cathode ray tube, forms and displays the digit in true numeral outline, and the grid bias is left unmodified during other periods of time when other digits of the tens notation, would otherwise be displayed. A particular selector is adapted to cooperate with all similarly denoted digit manifesting element portions located in each of the plurality of accumulator orders.

The cathode ray tube indicator herein employed is similar in principle of operation and in many details of construction to the one fully described and claimed in applicant's copending application Serial No. 313,061, filed January 9, 1940. Before proceeding to the manner in which digits are displayed, a brief explanation will be given of the general characteristics of the cathode ray tubes whose construction is illustrated in Figs. 17 and 18 and which tubes are diagrammatically illustrated, in Fig. 5m, by 159h, 159t, and 159u. Each cathode ray tube comprises an evacuated envelope within which, extending from left to right, are disposed, an indirectly heated cathode 198, which is the source of electrons, a control grid 199, a No. 1 anode 200, a No. 2 anode 201, and two pairs of deflection plates. The upper and lower vertical deflection plates are respectively designated YU and YL, and the right and left hand horizontal deflection plates are respectively designated XR and XL. When the potential of YU is positive with respect to YL, the electron beam from source 198 is deflected upwardly, but when YU is negative with respect to YL, the beam is deflected downwardly. When XR is positive with respect to XL, the electron beam from source 198 is deflected to the right, but when XR is negative with respect to XL, the beam is deflected to the left. Each cathode ray tube includes the usual fluorescent screen 202 (Figs. 17 and 18) upon which the electron beam is focused.

When the cathode ray tube is operating, with each plate of each pair, at the same potential, the electron beam is centrally or axially located in the tube and impinges on the center of fluorescent screen 202. The relative potentials of the vertical deflection plates determines whether the beam moves vertically up or down. The relative potentials of the horizontal deflection plates determines whether the beam moves to the right or left. In the cathode ray tubes illustrated, the potentials of the upper vertical plate YU and of the right hand horizontal plate XR, respectively, are controlled by the pattern emitter, to produce relative potential changes so that the electron beam is so sequentially positioned as to trace a desired path representative of a chosen pattern and thus of a certain digit, when the grid bias permits the beam to pass. By causing the electron beam to repeatedly traverse the same path, the required digit outline is visibly produced on the screen. Having pointed out the general operating characteristics of a cathode ray tube, as here employed, the manner of producing the potentials to be applied to the YU and XR deflection plates, to position the electron beam, will now be described.

Mounted within cabinet 154 (Fig. 17) is a motor 189 (Fig. 5L) which, through any suitable drive, such as a belt 204 (Fig. 20), is adapted to drive a shaft 205 suitably mounted for rotation. Shaft 205 has a number of selectors mounted at one end thereof, one of which is designated 206. Ten of these selectors 206 (0) to 206 (9), inclusive, (Fig. 5L) are provided and each has insulating and conducting portions thereon, some of the selectors having only one insulating and one conducting portion while others have a plurality of such portions, as illustrated schematically in Fig. 24. A pair of brushes 207a, 207b (Figs. 5L and 20) cooperate with the periphery of each selector. The conducting and insulating portions of the various selectors are so arranged as to effect circuit operations at definite angular positions of rotation of shaft 205, as is readily understood by reference to Fig. 24. The purpose of these selectors and their timing will be explained presently.

Also mounted on shaft 205 (Fig. 20), for rotation therewith, is a disk 208. Disk 208 is transparent for the most part, but is provided with two concentric tracks 208X and 208Y (Fig. 22) comprising opaque sections of varying width. To direct light upon the tracks, two sources of light are provided, each comprising a lamp 190 (Fig. 21), which are respectively suitably enclosed by housings 210 (Fig. 20). A separate reflector 211 (Fig. 21) directs light from each lamp 190, through a lens system 212, which includes a narrow rectangular aperture 213, so that the light is concentrated in a thin rectangular pencil upon a particular opaque track. One lamp is on one side of disk 208 and directs light to and through track 208X and the other is on the same side of disk 208 and directs light to and through track 208Y. On the opposite side of the disk 208 and aligned with the tracks are located two photocells which are respectively designated 214X and 214Y (Fig. 22) one of which is positioned to receive varying portions of the rectangular pencil of light from one lamp as determined by one track and the other of which is positioned to receive varying portions of the rectangular pencil of light from the other lamp as determined by the other track (Fig. 20). It is obvious that the amount of light falling upon photocells 214X and 214Y, respectively, is varied in accordance with the degree of radial width of the respective opaque tracks and such light variations are produced under control of different circumferential portions of the respective tracks, as disk 208 is rotated. By suitably connecting each of the photocells 214X and 214Y (Fig. 5L), by means of the lines 214b and 214a and the common line 214c, to a source of potential (Fig. 5m) and to a load resistor, variable current flow is produced, through the resistor, proportional to changes in the amount of light falling upon the cells.

Track 208X produces variation in the amount of light falling on photocell 214X, and the resulting voltage changes across its associated load resistor 224X (Fig. 5m) are amplified and applied to the horizontal deflection plates XR (Fig. 5m) of the cathode ray tubes. Track 208Y produces variations in the amount of light falling on photocell 214Y, and the resulting voltage changes across its associated load resistor 224Y are amplified and applied to the vertical deflection plates YU (Fig. 5m) of the cathode ray tubes. The configurations of the tracks 208X and 208Y are such that in one revolution of the disk 208, such light and voltage variations are produced to so control the electron beams of the cathode ray tubes, that if they were continuously permitted, by the respective order digit element portions, to impinge upon the respective fluorescent screens 202 (Figs. 17 and 18) they would produce a visible but composite pattern, similar to that shown in Fig. 23. This composite pattern comprises a representation of all digits which are to be displayed, namely, digits 0 to 9, inclusive.

The method of constructing tracks such as 208X and 208Y (Fig. 22) so that a given visible pattern is produced, is described in detail in said application Serial No. 313,061. It may be stated briefly, however, that only a certain portion or portions of the complete tracks 208X and 208Y are employed to form any one chosen character. The composite pattern is such, that some portions thereof form parts, of a number of different characters, while other portions are used to complete formation of these characters or to form other characters. It is obvious that as disk 208 rotates, portions of a given character may or may not be formed, in immediate succession.

If, instead of continuously permitting impingement of the electron beam, the beam of any certain cathode ray tube is prevented, from impinging on its related fluorescent screen, for a selected portion or portions of the interval during which the disk is controlling the production of potentials (which would, otherwise, result in a composite pattern of the digits 0 to 9, inclusive) then that portion or portions of the interval in which the beam is allowed to reach the fluorescent screen, is available to produce the outline of one, only, of the ten digits. The electron beam of a cathode ray tube is prevented from reaching its related fluorescent screen when its grid bias is maintained at or below cut-off.

The selectors 206 (0), 206 (1), etc. (Figs. 24 and 5L) are provided for the purpose of maintaining the screen grids of tubes 237 (0), 237 (1), etc. (Fig. 5f), at the lower of two potentials, during the time all portions of the tracks of disk 208 are presented to the light upon one complete revolution thereof, except the time during which the one portion or those portions, are presented, whose presentation produces deflection plate potentials of the cathode ray tubes, of such character, as to cause the beam to trace out the outline of the numeral pertaining to one, only, of each of said ten selectors. As previously mentioned, the selectors 206 (0), 206 (1), etc., rotate synchronously with disk 208 and by comparison of the drawing numerals appearing in Figs. 24, 23 and 22, it is seen that the insulating portion or portions of a particular selector occupy circumferentially distributed positions, corresponding to the circumferentially distributed positions occupied by the portion or portions of tracks 208X and 208Y, required to control the production of potentials, to so deflect the electron beam, that the digit, related to the particular selector is produced in its true numeral outline. It is to be noted that the combinational "on" and "off" status or pattern of the digit manifesting element portions in a particular order, determines the particular selector which will be effective to control the grid of a cathode ray tube, related to a particular accumulator order. Having generally described the pattern component emitter and related selectors, there will now be described the cathode ray tube indicator and the particular manner of applying changing potentials to the YU and XR deflection plates of the cathode ray tubes.

Referring to Figs. 17, 18 and 5m, with switch 186 closed, potential is supplied to lines 187 and 51, and to a first voltage divider comprising resistors 215, 216, 217, and 218 (Fig. 5m) and to a second voltage divider comprising resistors 219, 220, and 221. The No. 2 anode 201, and the deflection plates YL and XL of tubes 159h, 159t, and 159u are all connected to line 187. The potential applied to the No. 1 or focusing anodes 200 is determined by the voltage across resistor 220. The heater-cathodes 198 are connected to line 222, whose potential, with respect to line 51, is that across resistance 221. Each of the control grids 199 of the respective tubes, whose negative bias is to be reduced under control of the combinational "on" and "off" status or pattern of the digit manifesting element portions, is adjustably connected, respectively, to resistances 223U, 223T and 223H (Fig. 5L) one side of which connects to line 51. With this circuit arrangement, therefore, the negative bias normally applied to each of the grids 199 is the difference in potential between lines 222 and 51, and is of sufficient magnitude to prevent the electron beams from impinging upon their related respective fluorescent screens 202 (Figs. 17 and 18).

Closure of switch 188 (Figs. 17, 18 and 5L) supplies energy to the motor 189 and to the filaments of lamps 190. With motor 189 in operation, shaft 205, the selectors 206 (0), 206 (1), etc., and the disk 208 are continuously rotated. Resulting variations in the amount of light, which are produced by the varying cross section, opaque portions of tracks 208X and 208Y, are impressed on photocells 214X and 214Y, respectively, to effect resistance changes thereof. The anodes of each of these photocells are connected via line 214c to line 187, and the cathode of photocell 214Y is connected, via line 214a, to one end of resistor 224Y whose other end is connected to line 222, while the cathode of photocell 214X is connected, via line 214b, to one end of resistor 224X whose other end is also connected to line 222. Changes in the resistance of photocells 214X and 214Y, due to variations in light falling thereon, cause changes in the amount of current flow through their associated respective resistors 224X and 224Y. Accordingly, the voltage drops across resistors 224X and 224Y vary in accordance with the variations in the configurations of tracks 208X and 208Y. For example, as the light falling on 214X increases, its resistance decreases, and the total resistance of 214X plus 224X is likewise decreased, and increased current flow occurs therethrough. Accordingly, the voltage drop across 224X is increased. When, however, the light reaching 214X decreases, its resistance increases and the total resistance of 214X plus 224X is likewise increased, and decreased current flow occurs therethrough. Hence, the voltage drop across 224X is decreased. The same also applies to 214Y and 224Y for variations in light reaching 214Y, as determined by track 208Y.

Whenever the potential drop across 224X increases, condenser 225X is charged and there is current flow through resistor 226X connected to line 227. Whenever the potential drop across resistance 224X decreases, condenser 225X discharges and there is reverse current flow through resistor 226X. The grid of tube 228X is connected to resistor 226X and it will be appreciated that the normal bias applied to the grid of tube 228X is the difference in potential between lines 222 and 227 or the voltage drop across resistance 217. By means of this circuit arrangement, current flow in resistor 226X varies in accordance with the configuration of track 208X and since the grid of tube 228X is connected to resistor 226X, variations in its bias are also in accordance with the configuration of track 208X.

The screen of tube 228X is connected to screen current limiting resistor 229X and via line 229a to the junction of resistances 215 and 216. Condenser 230X is provided for filtering purposes and serves to maintain the screen of tube 228X at substantially constant potential. Changes in the grid bias of tube 228X result in variations of current flow therethrough and through its load resistance 231X, which are amplified variations of the flow through 226X. One side of a condenser 232X is connected to the anode side of resistance 231X, and the other side of said condenser is connected through resistance 233X to line 187. As will be now apparent, potential changes produced on resistance 233X are similar to those appearing on resistance 231X. The foregoing has described the manner in which light variations, controlled by track 208X, are converted into amplified electrical potential changes which are proportional to said light variations.

The production of amplified electrical potential changes on resistance 233Y, corresponding to light variations caused by track 208Y, is accomplished by a similar circuit arrangement in which similarly numbered components bear the suffix "Y."

Line 234X is connected at one end to the junction of resistance 233X and condenser 232X, and, since the other end of line 234X is connected to the XR deflection plates in cathode ray tubes 159h, 159t, and 159u, potential variations at this junction are applied to the XR horizontal deflection plates.

Line 234Y is similarly connected to the junction of resistance 233Y and condenser 232Y, and to the YU deflection plates in cathode ray tubes 159h, 159t, and 159u, so that potential changes at this junction are applied to the YU vertical deflection plates.

Having described the manner of applying changing potentials to the deflection plates of the cathode ray tubes, a detailed explanation will now be given of the manner in which digit manifesting element portions, representing a number by their "on" and "off" pattern, and a selector, having the same numerical designation, conjointly effect a reduction of the negative bias of a control grid of a cathode ray tube, to thereby remove the normal cut-off bias and permit the tube to display, in true numeral outline, the numeral corresponding to the combinational "on" and "off" status or pattern of the above element portions.

As previously described in section 13, the result of entering three multidenominational quantities into the electronic accumulator is to produce a total amount of 603 standing therein. More specifically, 3 stands in the units order of the accumulator and $Au5$—$0r$, $Au6$—$1r$, $Au7$—$2r$, $Au8$—$3r$ and $Au9$—$4L$ are the digit manifesting element portions which are "on," as is now understood. With $Au8$—$3r$ "on," (Fig 5i) point 67b thereof is at the higher of two potentials with respect to line 51, and accordingly, a point along resistance 64b ($Au8$—3) is likewise at a high potential. Since $Au5$—$0r$, $Au6$—$1r$, (Fig. 5c) and $Au7$—$2r$ (Fig. 5i) are "on," their points 67b are also at the higher of two potentials with respect to line 51 and hence a point along their resistances 64b is at high potential. Since $Au9$—$4L$ is "on," its point 67a (Fig. 5i) is at the higher of two potentials, with respect to line 51 and a point along its resistance 64a is at high potential. From the foregoing, it will be seen that a point along the resistances 64a associated with $Au5$—$0L$ to $Au8$—$3L$, inclusive, and also the resistance 64b associated with $Au9$—$4r$ is at low potential with respect to line 51.

Individual lines 235 (5), 235 (0), 235 (6), 235 (1), 235 (7), 235 (2), 235 (8), 235 (3), 235 (9), and 235 (4) extend from each of the aforementioned points on resistors 64a and 64b, respectively, and in each accumulator order, to respective order cables 235u, 235t and 235h. Upon emerging from its corresponding cable, each individual line connects to the No. 1 grid of a corresponding one of the pentagrid mixer tubes 237 (0) to 237 (9), inclusive, and also to the No. 3 grid of another corresponding one of these pentagrid mixer tubes. Line 235 (3), which is connected to resistance 64b ($Au8$—3) (Fig. 5i), upon emerging from its cable 235u (Fig. 5f), connects to the No. 1 grid of tube 237 (3) and to the No. 3 grid of tube 237 (7) of the units order group U. Line 235 (9), which is connected to resistance 64a ($Au9$—4) (Fig. 5i), upon emerging from cable 235u (Fig. 5f) connects to the No. 3 grid of tube 237 (3) and to the No. 1 grid of tube 237 (9) of the same group.

The bias of the No. 1 grid of tube 237 (3) is thus controlled by the status of $Au8$—$3r$ and the bias of the No. 3 grid of tube 237 (3) is controlled by the status of $Au9$—$4L$. By tracing the circuit connections between each of the respective grids (Nos. 1 and 3) of tubes 237 (0), 237 (1), etc., and resistors 64a and 64b, respectively, of $Au5$—0, $Au6$—1, etc., it will be seen that when the No. 1 grid, of a particular tube, of the 237 (0) etc. units group (Fig. 5f) is connected to a certain element portion, the No. 3 grid, of the same tube, is connected to the companion or opposite portion of the corresponding element portion of the element, which appears next in the series. For example, the No. 1 grid of tube 237 (3) of the units order group U (Fig. 5f) is connected to resistance 64b (Fig. 5i) of $Au8$—$3r$ and the No. 3 grid of tube 237 (3) of the same group (Fig. 5f) is connected to resistance 64a (Fig. 5i) of $Au9$—$4L$ which is the companion or opposite portion, of the corresponding element portion, namely, $Au9—4r$ of element $Au9—4$, which element appears next in the series after $Au8—3r$, as is now understood. Each of the anodes of units order tubes 237 (0) to 237 (9), inclusive, are connected together and to one end of a common resistance 238U whose other end is connected to line 50. The cathodes of units order tubes 237 (0) to 237 (9), inclusive, are connected to line 61. It is seen that the difference in potential, between the points on the respective resistors 64a and line 61 is the No. 1 and also the No. 3 grid bias potentials, respectively, for certain pairs of tubes of the group 237 (0) to 237 (9), inclusive, as is likewise the difference in potential between the points on resist 64b and line 61. When a point on resistances 64a or on resistances 64b is at a low potential, the negative bias of the No. 1 and No. 3 grids of its related pair of tubes of group 237 (0) etc. (Fig. 5f), is sufficient to ensure no current flow therethrough, irrespective of possible No. 2 and No. 4 grid voltages. When, however, a point on resistances 64a or on resistances 64b is at a high potential, the negative bias of the No. 1 and No. 3 grids of its related pair of tubes of group 237 (0) etc. (Fig. 5f) is reduced, thereby permitting current flow through a tube provided that the No. 2 and No. 4 grid potentials are concurrently, high. From the foregoing it will be appreciated that, since $Au8—3r$ and $Au9—4L$ (Fig. 5i) are "on," the negative bias of the No. 1 and No. 3 grids of tube 237 (3) of group U (Fig. 5f) is reduced. Irrespective of the "on" and "off" status of the remaining element portions, it is seen, by tracing the circuit connections between their resistances 64a and 64b and the No. 1 and No. 3 grids of respective tubes 237 (0) to (239) (9), inclusive, (Fig. 5f), that the negative bias of either the No. 1 or No. 3 grid, or of both, of all other tubes of the units group 237 (0) etc. is not reduced. It follows, therefore, that an increase in voltage of the No. 2 and No. 4 grids of all these other tubes does not cause current flow therethrough. In summation, it may be pointed out that for each different digit manifested by an order of the accumulator, there are two terminals 67a or 67b which are at high voltage and at least one of which is not at high voltage when any other digit is manifested. Thus, for digit 0, terminals 67b (A5—0) and 67a (A6—1) are at high voltage. For every other digit, at least one of these terminals is at low voltage. For digit 1, terminals 67b (A6—1) and 67a (A7—2) are at high voltage. At the same time, terminal 67b (A5—0) is at high voltage, just as when digit 0 is manifested, but the terminal 67a (A6—1) is not at high voltage when 1 is manifested. Hence, the combinational voltage pair indication of digit 0 is not present when digit 1 is being manifested. Similarly, when any other digit is manifested, there is a combination of two high voltage terminals which is different from the combinational two terminal condition of every other digit. It should be noted that for digit 4, the combinational code indication is the high voltage state of terminal 67b of A5—0 and terminal 67b of A9—4, while for digit 9, the combinational code indication is the high voltage state of terminals 67a of both A5—0 and A9—4. By connecting one of the two combinationally significant terminals related to a digit to the No. 1 grid of the digit-corresponding tube 237 and the other of these terminals of the No. 3 grid of the same tube, this tube will be conditioned for operation only when the related digit is being manifested by high voltage state of both the associated terminals. Thus, tube 237 (4) will be conditioned for operation only when terminals 67b (A5—0 and A9—4) are both at high voltage.

It is deemed clear, that the manner in which digit manifesting element portions $At5—0L$, $At5—0r$ . . . $At9—4L$, $At9—4r$, control related tubes 237 (0) etc. of the tens group T and the manner in which digit manifesting element portions $Ah5—0L$, $Ah5—0r$ . . . $Ah9—4L$, $Ah9—4r$, also control related tubes 237 (0) etc. of the hundreds group H is similar to that described in connection with the digit manifesting element portions of the units order.

In this particular problem, with 603 entered in the accumulator, the No. 1 and No. 3 negative grid biases of tube 237 (3) (Fig. 5f) of the units order group U are reduced, as stated above, and those of tube 237 (0) (Fig. 5f) of the tens order group T are reduced, since $At5—0r$ and $At6—1L$ are "on," and those of tube 237 (6) (Fig. 5f) of the hundreds order group H are also reduced, since $Ah6—1L$ and $Ah7—2r$ are "on."

Even though both the No. 1 and No. 3 negative grid biases of a certain one of the group of tubes 237 (0) etc. is reduced, such as is true of tube 237 (3) of the units order group U with 603 entered in the accumulator, there still is no increase in current flow therethrough until its No. 2 and No. 4 grid potentials are raised in a positive direction. Such voltage rise, in a particular tube, such as 237 (3), of group U for example, is brought about by the operation of the particular selector 206 (3) (Fig. 5L). Attention is directed to selector 206 (3) (Figs. 24 and 5L) and it is seen that this selector has two insulated portions and two conducting portions. The latter, when effective, short circuit the major portion of resistance 239 (Fig. 5L) associated therewith, which, together with resistance 240, form a voltage divider between lines 50 and 61. Point 241 on said divider is connected to line 242 (3) of a group combined into a cable 243 (see also Fig. 5f). Upon emerging from cable 243, line 242 (3) extends to the No. 2 and No. 4 grids of all tubes 237 (3) including that one relating to the units order. When the conducting portions of selector 206 (3) (Fig. 5L) are effective, point 241 is very near the potential of line 61, and by virtue of line 242 (3) (see also Fig. 5f), the No. 2 and No. 4 grid voltages of tubes 237 (3) are likewise very close to the potential of line 61. At such low positive potential, a concurrent No. 1 and No. 3 negative grid bias reduction of any of the tubes 237 (3) is ineffective to produce current flow therethrough.

Referring again to Figs. 24 and 5L, when each of the two insulated portions of selector 206 (3) is effective, the major portion of resistance 239 associated therewith is no longer shortcircuited and the potential of point 241 rises, in a positive direction, since resistance is thus added to the divider between point 241 and line 61. Through the circuit connection provided by line 242 (3) (see also Fig. 5f) the No. 2 and No. 4 grid potentials of tubes 237 (3) are high in a positive direction when resistance 239 (Fig. 5L) is nonshorted. As the No. 1 and also the No. 3 negative grid bias of tube 237 (3) of the units order (Fig. 5f) is reduced (under control of $Au8—3r$ and $Au9—4L$ as described above) and since its No. 2 and No. 4 grid potentials are raised in a positive direction for two intervals during each revolution of selector 206 (3) (Fig. 5L), current flow through said tube 237 (3) occurs during these intervals. No current flow occurs through the tubes 237 (3) related to the tens and hundreds orders when their No. 2 and No. 4 grid potentials are likewise raised, because there has been no simultaneous reduction of both their No. 1 and No. 3 negative grid biases, as described above, i. e. neither the tens nor hundreds orders of the accumulator stand at 3.

A single insulated portion of selector 206 (0) (Figs. 24 and 5L) removes the short circuit from the major portion of its related resistance 239 and the potential of its point 241 rises. Through the connection provided by line 242 (0) (see also Fig. 5f) the No. 2 and No. 4 grid potentials of all tubes 237 (0) are raised. Since the negative grid bias of the No. 1 and No. 3 grids of tube 237 (0) of the tens order, only, is reduced under control of both At5—0r and At6—IL, as described above, current flow through this tube occurs whenever its No. 2 and No. 4 grid voltages are raised. No current flow occurs through the tubes 237 (0) related to the units and hundreds orders, respectively, when their No. 2 and No. 4 grid potentials are likewise raised, because there has been no simultaneous reduction of both their No. 1 and No. 3 negative grid biases.

Two insulated portions of selector 206 (6) (Figs. 24 and 5L) remove the short circuit from the major portion of its related resistance 239 and the potential of its point 241 rises during two different intervals. Through the connection provided by line 242 (6) (see also Fig. 5f) the No. 2 and No. 4 grid potentials of all tubes 237 (6) are raised. Since the negative grid bias of both the No. 1 and No. 3 grids of tube 237 (6) of the hundreds order, only, is reduced under control of both Ah6—IL and Ah7—2r, as described above, current flow through this tube occurs whenever its No. 2 and No. 4 voltages are raised. No current flow occurs through the tubes 237 (6) related to the units and tens orders, respectively, when their No. 2 and No. 4 grid potentials are likewise raised, because there has been no simultaneous reduction of both their No. 1 and No. 3 negative grid biases.

It is seen from the foregoing that each selector 206 (0) etc. (Fig. 5L) controls the No. 2 and No. 4 grid voltage rise of tubes 237 (0) etc. (Fig. 5f) which are each located in a plurality of orders without necessarily effecting an increase of current flow therethrough. Current flow does occur, however, through that one, only, of the tubes 237 (0) etc. and in a given order, whose No. 2 and No. 4 grid potential is raised, which is the tube of the 237 (0) etc. group having a numerical designation corresponding to the digit standing in the order. Such action takes place because coincident with the increase, in a positive direction, of its No. 2 and No. 4 grid bias, its No. 1 and No. 3 negative grid biases are reduced by the digit manifesting element portions, whose combinational "on" and "off" status or pattern has a numerical designation, corresponding to the digit standing in the order.

This current flow through tube 237 (3) of group U, as described above causes a voltage drop across resistance 238U (Fig. 5f) and such drop is maintained until a conducting portion of selector 206 (3) (Fig. 5L) shorts the major portion of its associated resistance 239. Such action occurs twice during every revolution of selector 206 (3) (Fig. 5L). Upon each voltage drop across resistance 238U (Fig. 5f), its related condenser 244, whose recovery time is relatively large, discharges, via line 244U, in a circuit which includes resistance 245 (Fig. 5L). Current flow occurs at a substantially constant rate through resistance 245 during any interval that there is a maintained voltage drop across resistance 238U. This current flow is such, that a point on resistance 245 (Fig. 5L) is negative in potential with respect to line 51. The grid of tube 246 is connected to resistance 245, so that when a negative potential appears on 245, the normal negative grid bias of tube 246 is increased, decreasing current flow therethrough and through load resistance 247U and causing a decreased voltage drop across 247U. Such decreased voltage drop across 247U is equal in duration to that across resistance 238U (Fig. 5f). When such conditions occur, condenser 248 (Fig. 5L) whose recovery time is also relatively large, becomes charged and a positive potential appears on resistance 223U for the duration of the voltage drop across resistance 247U. Such a positive potential is square-topped in character and during each revolution of selector 206 (3) appears twice on resistance 223U. Resistance 223U is connected via line 249U to the grid 199 (Fig. 5m) of the units order cathode ray tube 159u. Accordingly, a positive potential on resistance 223U is effective to reduce the negative grid bias of cathode ray tube 159u to a value less than cut-off and under this condition, the electron beam of tube 159u is permitted to impinge upon its fluorescent screen.

Summing up, upon a maintained No. 1 and and No. 3 negative grid bias reduction of the units order tube 237 (3) (Fig. 5f) as described above, selector 306 (3) (Fig. 5L) produces a reduction of the negative grid bias of cathode ray tube 159u, for two intervals, during each of its revolutions. Since the selectors and disk 208 are both rotated by motor 189, these bias reductions of tube 159u occur, concurrently, with the generation of those potentials, under control of disk 208, required to trace the numeral 3. These potentials are amplified and applied to the deflection plates YU and XR of all tubes, as described above, thereby producing relative voltage changes between the upper and lower plates and between the right and left plates, and the reductions of the bias of tube 159u are so timed as to permit its electron beam to impinge upon its fluorescent screen, only during production of these potentials whereby the numeral 3 has its outline traced on this screen, in true numeral outline, where it is readily visible, as illustrated in Fig. 17.

In the same manner, current flow occurs through tube 237 (0) (Fig. 5f) of the tens order, once for each revolution of disk 208 by virtue of the operation of selector 206 (0) (Fig. 5L), since At5—0r (Fig. 5d) and At6—IL are "on." Such current flow results in a voltage drop across resistance 238T (Fig. 5f) and in the same manner as described in connection with resistance 238U, there is produced a drop across resistance 247T and a positive potential on its associated resistance 223T (Fig. 5L) related to the tens order. Resistance 223T, related to the tens order, is connected via line 249T to the grid 199 (Fig. 5m) of the tens order cathode ray tube 159t, so that a positive potential on said resistance 223T is effective to reduce the negative grid bias of cathode ray tube 159t to a value less than cut-off, once per revolution of disk 208. Therefore, under this condition, the electron beam of tube 159t is permitted to impinge upon its fluorescent screen. In this manner, upon a maintained reduction of the negative grid bias of the No. 1 and No. 3 grids of the tens order tube 237 (0) (Fig. 5f), selector 206 (0) (Fig. 5L) causes a negative grid bias reduction of cathode ray tube 159t for a single bias interval during each of its revolutions. This bias reduction of tube 159t occurs, concurrently, with the generation under control of disk 208, of those potentials which are required to trace the numeral 0. These potentials are amplified and applied to the deflection plates YU and XR of all cathode ray tubes, as described previously, but since the electron beam of tube 159t, only, is permitted to impinge upon its fluorescent screen during production of these potentials, the numeral 0 is traced on said screen in true numeral outline, where it is readily visible, as illustrated in Fig. 17.

In the same manner, current flow occurs through tube 237 (6) (Fig. 5f) related to the hundreds order, twice per revolution of disk 208 by virtue of the operation of selector 206 (6) (Fig. 5L), since $Ah6—1L$, (Fig. 5e) and $Ah7—2r$ (Fig. 5k) are "on." Such current flow results in a voltage drop across resistance 238H (Fig. 5f) and the appearance of a voltage drop across resistance 247H and a positive potential on its associated resistance 223H (Fig. 5L), in the same manner as described in connection with the units order. The grid 199 (Fig. 5m) of cathode ray tube 159h is connected via line 249H to the hundreds order resistance 223H. Hence, a positive potential on resistance 223H is effective to reduce the negative grid bias of cathode ray tube 159h to a value less than cut-off. Therefore, under this condition, the electron beam of tube 159h is permitted to impinge upon its fluorescent screen. In this manner upon a maintained reduction of the negative grid bias of the No. 1 and No. 3 grids of the hundreds order tube 237 (6), (Fig. 5f), selector 206 (6) (Fig. 5L) causes a reduction of the negative grid bias of cathode ray tube 159h for two intervals during each of its revolutions. This bias reduction of tube 159h occurs, concurrently, with the generation, under control of disk 208, of those potentials which are required to trace the numeral 6. These potentials are amplified and applied to the deflection plates YU and XR of all cathode ray tubes, as described previously, but since the electron beam of tube 159h, only, is permitted to impinge upon its fluorescent screen during production of these potentials, the numeral 6 is traced on said screen, in true numeral outline, where it is readily visible, as illustrated in Fig. 17. While component portions of the individual numbers 6, 0 and 3, are traced in succession on the screens of cathode ray tubes 159h, 159t and 159u during each revolution of disk 208 (Fig. 5L), the tracings are repeated with such a high rapidity that flicker is eliminated. Consequently, to an observer, the total amount standing in the accumulator, namely, 603 is continually and constantly visibly manifested by the cathode ray tubes of the indicator (Fig. 17). If desired, the operator may suppress the display of amounts standing in the accumulator by opening switch 250 (Figs. 17, 18 and 5L). With switch 250 open, no potential difference is applied to the voltage dividers 239—240 (Fig. 5L) and thus the No. 2 and No. 4 grid potentials of all pentagrid tubes 237 (0) etc. (Fig. 5f) are reduced to zero. Accordingly, no current flow can occur through any of the tubes 237 (0) etc., irrespective of negative grid bias reductions thereof which are effected by combinations of digit manifesting element portions. Thus, the grid bias of each cathode ray tube 159h, 159t and 159u (Fig. 5m) is maintained at cut-off, and no electron beams impinge upon related fluorescent screens.

Having described in detail, the manner in which an amount standing in the electronic accumulator is visibly manifested, in true numeral outline, by a cathode ray tube indicator, an explanation will now be given of the method of resetting the accumulator to zero, prior to making a new series of entries therein or prior to any operation of the device.

15. *Resetting—accumulator*

The manner of resetting the electronic accumulator of this invention is such that the time required for reset is independent of the value of the digits standing in the accumulator. The resetting operation in the present application is performed in two steps and in all orders: the first step produces a turning off of all of the right-hand element portions, except one, of the digit manifesting elements, which are "on," and the second ensures the turning on of this one digit manifesting element portion, so that the final combinational "on" and "off" status or pattern of all element portions, in each order, indicates that 0 stands therein.

Referring to Fig. 5h, line 93, to which b-phased pulses are applied (section 4), is connected to the grid of tube 251. The screen of tube 251 is connected to the junction of resistances 252 and 253, which together form a voltage divider between lines 50 and 51. The screen potential of tube 251 is normally maintained at the potential of line 51, since a blade of switch 255 is maintained closed, as shown, thus shunting out resistance 253. Since the screen of tube 251 is normally thus maintained at the potential of line 51, variations in its grid bias have no effect on current flow therethrough. The anode of tube 251 is connected to line 50 through load resistance 256 and from the junction of the anode of tube 251 and resistance 256 (Fig. 5h), a line 128 (Figs. 5b, 5c, 5d and 5e) extends to each of three condensers 125c (see Figs. 5c, 5d and 5e). The latter, in turn, are each connected to one side of the two way, four pole switch 255 (shown for simplicity of wiring in Figs. 5c, 5d, 5e and 5h, as four separate switch blades) which are normally closed to the opposite side, as shown in Figs. 5c, 5d and 5e.

To produce reset, the operator throws toggle switch 255 (Figs. 17, 18 and 5h, for example) to a reverse position from that shown, so that resistance 253 (Fig. 5h) is no longer shunted, while simultaneously condensers 125c (Figs. 5c, 5d and 5e) are connected to their associated resistances 72b. The removal of the shunt from resistance 253 (Fig. 5h) places the screen of tube 251 at high potential, so that grid bias variations, effected by b-phased pulses appearing on line 93 (section 4), cause current flow variations through tube 251 and load resistance 256. The changing voltage drops across 256, via line 128 (see also Figs. 5b, 5c, 5d and 5e) and condensers 125c, produce a-phased pulses on each of the resistors 72b associated, respectively, with each order of the accumulator. It is to be particularly noted that the amplitude of said pulses is greater than that of the advancing pulses normally appearing on resistors 72b. These a-phased pulses, of increased amplitude, are applied to lines 75b (see also, Figs. 5c and 5i, 5d and 5j, 5e and 5k) to restore any one of the $Au6—1r$ to $Au9—4r$, inclusive, $At6—1r$ to $At9—4r$, inclusive, and $Ah6—1r$ to $Ah9—4r$, inclusive, digit manifesting element portions, which are "on," to an "off" status, as follows:

It is assumed that the total amount of 603 stands in the electronic accumulator, prior to the resetting operation and, as is understood, out of all the right-hand elements; $Au5$—$0r$ to $Au8$—$3r$, inclusive, $At5$—$0r$ and $Ah7$—$2r$ to $Ah9$—$4r$, inclusive, are "on." Even though the screen potential of each of the tubes $69a$ of $Au6$—$1L$, $Au7$—$2L$ and $Au8$—$3L$, for example, is low because $Au5$—$0L$, $Au6$—$1L$ and $Au7$—$2L$ are "off," the $a$-phased pulses, of increased amplitude, now appearing on line $72b$, produce a greater than normal negative grid bias reduction of these tubes $69a$, increasing current flow therethrough sufficiently to turn $Au6$—$1r$, $Au7$—$2r$ and $Au8$—$3r$ from an "on" to an "off" status. It is to be noted that the first of the $a$-phased pulses, of increased amplitude, appearing on line $75b$ is effective to accomplish this result and that if $Au9$—$4r$ were "on," it also would be turned off. Succeeding similar pulses appearing on line $75b$ have no further effect but merely continue to exist until the blades of switch $255$ are returned to the position, as shown.

Also, even though the screen potential of each of the tubes $69a$ of $Ah8$—$3L$ and $Ah9$—$4L$ is low because $Ah7$—$2L$ and $Ah8$—$3L$ are "off," ($Ah6$—$1L$ is "on," hence screen of $69a$ of $Ah7$—$2L$ is high), the $a$-phased pulses of increased amplitude now appearing on line $75b$ produce a greater than normal, negative grid bias reduction of these tubes $69a$, increasing current flow therethrough sufficiently to turn $Ah8$—$3r$ and $Ah9$—$4r$ from an "on" to an "off" status. Since, as stated above, the screen of tube $69a$ of $Ah7$—$2L$ is high, $Ah7$—$2r$ is likewise turned off. It is to be noted that all of these right element portions are returned to an "off" status, concurrently, under control of the first of the $a$-phased pulses of increased amplitude appearing on line $75b$.

Attention is directed to the fact that the grid of tubes $69a$ of $Au5$—$0L$ (Fig. 5c), $At5$—$0L$ (Fig. 5d) and $Ah5$—$0L$ (Fig. 5e) are connected to lines $75a$ rather than to lines $75b$, so that these $a$-phased pulses, of increased amplitude, are not impressed on the grids of these tubes and therefore $Au5$—$0r$ and $At5$—$0r$ which are "on," when 603 stands in the accumulator, are not turned off nor would $Ah5$—$0r$ be turned off.

It is also deemed obvious, that when an order of the accumulator stands at 0, as is the case of the tens order, with 603 standing in the accumulator, the element portions of this order are unaffected by the resetting operations, since $At6$—$1r$, $At7$—$2r$, $At8$—$3r$ and $At9$—$4r$, are all "off."

Having thrown the blades of switch $255$ first to a reverse position from that shown and then having returned them to the position, as shown, the operator has turned off any of the $A6$—$1r$ to $A9$—$4r$, inclusive, digit manifesting element portions, in all orders, which are "on." To complete the resetting operation, the operator operates another switch which turns the $A5$—$0r$ digit manifesting elements, of all orders, to an "on" status, as will now be described.

Referring to Fig. 5h, line 90, to which $a$-phased pulses are applied (section 4), is connected to the grid of tube 258. The screen of this tube is connected to the junction of resistances 259 and 260, which together form a voltage divider between lines 50 and 51. The screen potential of tube 258 is normally maintained at that of line 51, since switch 261 is normally closed, as shown, thereby shunting out resistance 260, so that bias reductions of its grid, via line 90, have no effect on current flow therethrough. The anode of tube 258 is connected to line 50 through load resistance 262 and is coupled to resistance 263 by condenser 264. Any positive potential on resistance 263 is effective, via line 265 (see also Figs. 5i, 5j and 5k) to produce a reduction of the negative grid bias in all tubes 266 (Figs. 5i, 5j and 5k). The anode of each tube 266 is connected, via respective lines 266a, to a point 66a of a related digit manifesting element portion $Au5$—$0L$ (Fig. 5c), $At5$—$0L$ (Fig. 5d) and $Ah5$—$0L$ (Fig. 5e), respectively.

To complete the resetting operation, the operator throws switch 261 (Figs. 17, 18 and 5h) to the reverse position from that shown, thus removing the shunt from resistance 260 and effecting a rise in the screen potential of tube 258. Grid bias reductions of tube 258, controlled by $a$-phased pulses appearing on line 90, cause increased current flow through the tube and its load resistance 262, with the result that $b$-phased positive pulses appear on resistance 263. The first positive pulse, appearing on resistance 263, is effective via line 265 to reduce the negative grid bias of all tubes 266. Accordingly, current flow occurs through each tube 266 and its associated resistor 62a and is thus effective to shift any or all of $Au5$—$0r$, $At5$—$0r$ and $Ah5$—$0r$, which may be "off," to an "on" status, concurrently, thus completing the resetting operation. It is noted that the first of the $b$-phased pulses appearing on line 265 is effective to accomplish this result. Succeeding similar pulses appearing on line 265 have no further effect but they merely continue to exist until switch 261 (Fig. 5h) is returned to the position, as shown.

The foregoing has described the method employed for resetting the electronic accumulator of this invention, so that the quantity 000 stands therein, and it is seen that the operation is effected without regard to cyclical machine timing, and that the time, required for the resetting operation to be accomplished, is not dependent upon the value of the digits standing in the accumulator.

16. Self-conditioning—Electronic commutator

As has already been mentioned, the electronic commutator (section 5), which is employed, in this embodiment of the invention, for providing digit representing and control pulses, requires no conditioning operation on the part of the operator, prior to making entries into the accumulator. The electronic commutator is self-conditioning, that is to say, regardless of the status assumed by the various elements comprising the commutator upon closure of switch 79 (Figs. 17, 18, and 5a), to supply current to lines 50, 61, 51 and 80, the operation of these elements, subsequent to the opening of switch 101, by the operator, to thus supply advancing pulses, is such as to cause said elements to automatically arrange themselves so as to function sequentially, as described in detail in section 5. Such automatic self arrangement is brought about either by minute differences between similar circuits of the separate elements or by the particular status which the various elements may reach, when supplied with current, upon placing the machine in operation.

Suppose, for example, that, after current is supplied to lines 50, 61, 51 and 80 and to the heaters of tubes 68a (Figs. 5a and 5g), 68b, 69a, and 69b of the commutator elements; $C9$—$4r$ and $C8$—$3r$ are "on" and $C0$—$5r$, $C7$—$2r$ and $C6$—$1r$ are "off"; this assumed status being one of the thirty-two possible arrangements which a commutator, comprised of five elements, may reach. Comparison of this assumed arrangement, with the required arrangement of the elements, at any of the index point positions "0," "9," "8," etc., as illustrated by parts a to e of Fig. 7, inclusive, will indicate that this assumed arrangement, reached by chance, is not one attained by the commutator in its normal chosen sequential operation. An explanation will now be given of the manner in which the commutator elements automatically adjust themselves, from an arrangement reached by chance; as assumed above, for example; to one attained upon normal operation. It is to be noted, that having once attained a normal arrangement, the various commutator elements thereafter function sequentially as desired (section 4, Fig. 7).

With the elements C0—5r, C9—4r, etc., in the chance status as assumed above, C0—5L is conditioning C9—4L, C8—3r is conditioning C7—2r and C6—1L is conditioning C0—5r, in a manner now understood. Immediately following the operator's opening of switch 101, commutator advancing pulses are applied to line 75 (sections 4 and 5). The first of said pulses is effective to turn on C7—2r and C0—5r, but is ineffective to turn on C9—4L, as will now be described. Since C0—5r is turned on, under control of C6—1L, point 66a (C0—5) falls in potential, concurrently with a grid bias reduction of tube 69a (C9—4). Accordingly, as the grid bias of tube 69a (C9—4) is reduced, its screen potential drops to a low value, thus preventing tube 69a (C9—4) from passing an amount of current sufficient to turn on C9—4L. Thus, after switch 101 is opened and upon the application of the first advancing pulse to line 75, the status of the commutator elements is such that C0—5r, C9—4r, C8—3r and C7—2r are "on" and C6—1r is "off." It is seen from Fig. 7, that such is the status which the various commutator elements assume between "7" and "6" in their normal sequential operation. The second, third, etc., advancing pulses which appear on line 75 (Figs. 5a and 5g) thereafter, cause the commutator elements to function in the manner desired. The aforementioned thirty-two possible arrangements, which the commutator elements may reach, include ten, which are, individually, the desired arrangements of elements, at any of the index point positions "0" (or "D"), "9," "8," etc., as shown by Fig. 7. If the elements reach any one of these ten arrangements, when they are supplied with current, it is deemed obvious that normal commutator operation proceeds from the very first advancing pulse. With regard to the remaining twenty-two chance arrangements, it can be shown, as is the case with the arrangement assumed above, that the commutator elements automatically, adjust themselves from said chance arrangements, to one of those attained upon normal operation, and thereafter function in the sequential manner desired.

Also when starting up the machine by closing switch 79 (Figs. 17, 18 and 5a) and applying current to lines 50, 61, etc., the status, which many others of the circuit elements, such as T1 (Fig. 5b), T2 and T3, Eu (Fig. 5c) etc.; Au5—0r, Au6—1r, etc.; At5—0r (Fig. 5d), At6—1r, etc., Ah5—0r (Fig. 5e), Ah6—1r, etc., reach, may be either "on" or "off" and is governed by chance. The operator proceeds to start the electronic commutator, as explained in this section, by opening switch 101 (Figs. 17, 18 and 5a). Thereupon, the commutator produces pulses, as described (section 5), and the control pulses "1," "0," and "9" are effective to shift T1, T2, T3, Eu, Et and Eh to their normal "off" status, as is now understood.

The digit manifesting element portions comprising the accumulator are thereupon reset to zero, as described previously (section 15), and the operator may now make entries into the accumulator.

Except to indicate general relationships, no mention has been made hereinabove of the speed with which the electronic accumulator, based on the principles disclosed in this invention, may operate and accept multidenominational entries. Actually, the accumulator is adapted to operate and to accept multidenominational entries at a rate which covers a wide range. It is believed to be capable of handling and receiving entries of multidenominational amounts for a range of rates which extends from one every twelve seconds to approximately one in one hundred thousandths of a second. Stated otherwise, entries may be made into the accumulator at rates which vary from five per minute to approximately six million per minute. It should also be mentioned that the speed of operation of the cathode ray tube indicator (section 14) bears no relation whatever to that of the electronic accumulator. It is, of course, desirable to avoid flicker in the display of digits representing the total amounts standing in the accumulator, and for this reason the pattern component emitter should rotate at a rate, not less than sixteen revolutions per second, and preferably its speed should be nearer to twenty-four or thirty revolutions per second.

While there has been shown and described and pointed out the fundamental novel features of the invention as applied to a single embodiment, it will be understood that various omissions and substitutions and changes in the form and details of the device illustrated, and in its operation, may be made by those skilled in the art, without departing from the spirit of the invention. It is the intention, therefore, to be limited only as indicated by the scope of the following claims.

What is claimed is:

1. An electronic accumulator comprising a plurality of electronic elements, each including a pair of electron emitting devices with their associated circuits, said devices being operable, simultaneously, to different ones of either of two sustained electrical on and off conditions, means electrically connecting said elements into a closed network, whereby upon application of successive control pulses, said elements are dually, cyclically, sequentially operated, each corresponding device being first sequentially operated to on condition and its companion device to off condition and then each companion device is sequentially operated to on condition and its associated corresponding device to off condition, means controlled by a manifestation, representative of a digit to be entered, to thereby step the on condition of said corresponding portions, sequentially about said closed network and then the on condition of said companion portions, sequentially about said closed network, the patterns of on and off conditions of all portions, manifesting, respectively, different digits of a chosen notation, said means when controlled by a manifestation, representative of another digit to be entered, limiting the number of applications of said control manifestations in proportion to the value of said second digit, to produce a pattern representative of the cumulative values of said digits.

2. An electronic accumulator comprising a plurality of electronic elements each including a pair of electron emitting devices, said devices being operable, simultaneously, to different ones of two sustained electrical on and off conditions, means controlled by the on condition of one portion of said elements conditioning solely the corresponding portion of the next succeeding element, presently in an off condition, preparatory to operation to an on condition, advancing means producing an electrical pulse cooperating with said corresponding portion of succeeding elements, to turn said portion on when so conditioned, each succeeding element bearing the same relationship to its succeeding element whereby the on condition corresponding elements is increased sequentially, the corresponding portion of the last element, however, conditioning the companion portion of the first element, preparatory to operation to an on condition, to thereby repeat the increase of on conditions in said companion portions, the companion portion of said last element conditioning said corresponding portion of said first element, entry control means, controlled by a manifestation representative of a digit to be entered, controlling the number of applications of said advancing pulses, in proportion to the value of a digit to be entered, whereby the relative disposition of said on condition among said plurality of element portions, is regulated so that the pattern of on and off conditions represents the value of said digit, and said entry means when controlled by a manifestation, representative of another digit, to be entered, again controlling the number of applications of said advancing pulses, in proportion to the value of said other digit, whereby the on condition of said plurality of element portions is regulated so that the pattern of on and off conditions represents the cumulative value of said first and said second entered digits.

3. An electronic accumulator comprising in each denominational order, a plurality of elements, each comprising a pair of portions, cyclically, simultaneously operable to opposite sustained electrical conditions, corresponding portions of succeeeding elements being operable, sequentially, to one of said conditions and the companion portions being next sequentially operable to said one condition, said complete operation being cyclically repeated, means for sequentially, cyclically, conditioning said corresponding portions, successively, to said one condition and then, successively, conditioning the companion portions to said one condition, the patterns of said two conditions, respectively. representing the digits of a chosen notation, subtraction control means, initiating a sequential conditioning of said portions, at a relatively fixed cyclical time, said sequential conditioning means upon determination of a to-be-subtracted digit, terminating said sequential operation, to thereby produce a said pattern, means rendered operative by means under control of said subtraction means for additionally sequentially conditioning said elements of the lowest order according to a unit digit amount, whereby a supplemental one is entered into said lowest order.

4. An electronic accumulator comprising a series of electronic elements each comprising a plurality of portions, each portion operable to an on and to an off condition, under control of electrical manifestations, means interconnecting said plurality of elements whereby the on condition of one portion thereof conditions a corresponding portion only, of the next succeeding element, which portion is to be turned on upon application of an electrical manifestation thereto, and means interconnecting the last element of said series to the first element thereof, whereby the on condition of a corresponding portion of said last element conditions a non-corresponding portion only, of said first element, entry control means controlling the application of said electrical manifestations to all of said portions and initially rendered operative to permit said application by a first electrical manifestation, at a relatively fixed time, means terminating said operation under control of an electrical manifestation, differentially timed so as to represent a digit to be subtractively entered, and means producing an additional manifestation at a predetermined relatively fixed time to control operation of said element portions for a unit differential time, whereby an elusive one is entered into said accumulator.

5. An electronic accumulator including a plurality of orders, each order comprising a plurality of electronic elements and each element comprising a pair of portions, corresponding portions of succeeding elements being operable to an on condition, successively and cyclically, under control of successive electrical manifestations, and non-corresponding portions being operable to an off condition, upon assumption of an on condition by its associated portion, means interconnecting said plurality of elements whereby the on condition of one portion conditions the corresponding portion only, of the next succeeding element, preparatory to being turned on, upon application of an electrical manifestation to said element, entry control means controlling the application of said electrical manifestations to all of said portions, and initially rendered operative to permit said application by a first electrical manifestation, at a relatively fixed time, means terminating said operation under control of an electrical manifestation, differentially timed so as to represent a digit to be subtractively entered, a device effective at a second relatively fixed time to cause such electrical manifestation-application to said portions for a unit differential time to thereby enter an elusive one, and carry producing means controlled by the assumption of on condition by a chosen one of said portions in one order and by said device, to produce a carry in the next higher order.

6. An electronic accumulator comprising a plurality of electronic elements for producing separate electronic manifestations of either of two kinds, the different patterns of said separate manifestations being representative of the digits of notation, means sequentially operating different numbers of said elements, in proportion to the values of digits to be entered, subtraction controlling means cooperating with said sequentially operating means to control subtractive entry of a digit whereby said elements are sequentially operated to produce said pattern, and means exclusive of said sequentially operating means to sequentially operate another one of said plurality of elements, to enter a supplemental value.

7. An electronic accumulator comprising a plurality of electronic elements, each including a pair of portions, means interconnecting said portions whereby a chosen electronic condition therein partially conditions said other portion in preparation for assumption of said chosen condition, means electrically connecting said plurality of elements into a closed network, succeeding element portions being finally conditioned for operation to said chosen condition upon the assumption of said chosen condition by one of the portions of a preceding element, a source of electrical manifestations for successively operating the corresponding portions of said plurality of elements to the chosen condition and alternately, successively operating the other ones of said portions to the chosen condition, entry control means controlling the application of said electrical manifestations to said elements, and initially rendered operative by an electrical manifestation, at a relatively fixed time, and means terminating said operation, at a differential time, representative of a subtractive digit entry.

8. An electronic accumulator comprising a plurality of elements each comprising a pair of portions, means interconnecting said plurality of elements whereby the on condition of each of the portions of an element respectively conditions a related, different one of the portions, of the next succeeding element to be turned on, upon application of an electrical manifestation to said element, entry control means controlling the application of said electrical manifestations to said elements, in proportion to the value of digits to be entered, and carry means, including means controlled by the on condition of a plurality of corresponding portions, to produce a carry effect.

9. An electronic accumulator comprising a plurality of electronic elements for producing distinctive patterns of electronic manifestations, each representative of a different digit, means producing a series of pulses, proportional to the value of a digit to be entered, sequentially operating different numbers of said elements, in proportion to the value of the digits to be entered, and electronic carry producing means, including means controlled by the similar electronic manifestations, in a plurality of said elements, for producing a carry effect.

10. An electronic accumulator comprising a plurality of electronic elements each including a pair of element portions, each operable to either one of two electronic manifestations, the different patterns of said two types of manifestations of all portions, being representative, respectively, of different digits, means producing a series of pulses, proportional to the value of a digit to be entered, sequentially operating all corresponding portions of said pairs, and then sequentially operating all the other portions, in proportion to the values of digits to be entered, and electronic carry producing means, including means controlled by the same one of said manifestations in a chosen plurality of said other portions, for producing a carry effect.

11. An electronic accumulator comprising a plurality of electronic elements each including a pair of element portions, each operable to either one of two electronic manifestations, the different patterns of said two types of manifestations of all portions being representative, respectively, of different digits, means producing a series of pulses, proportional to the value of a digit to be entered, sequentially operating all corresponding portions of said pairs and then sequentially operating all the other portions, in proportion to the values of digits to be entered, means, including said producing means, for producing carry control pulses, and electronic carry producing means, including means controlled by the same one of said manifestations in a chosen plurality of said other portions and by said carry control pulses, for producing a carry effect.

12. An electronic accumulator comprising a plurality of electronic elements for producing separate electronic manifestations, of either of two kinds, the different patterns of said separate manifestations being, respectively, representative of different digits, means sequentially operating different numbers of said elements, in proportion to the values of digits to be entered, to assume either one of said two kinds of separate manifestations, and means, including means controlled by manifestations in a chosen plurality of elements, to produce a carry effect.

13. An accumulator including electronic manifesting means, producing a manifestation representative of a digit entered, said manifestation comprising a pattern of a plurality of electrical conditions of the same kind in each of a certain plurality of electronic means and of a different kind in each of a plurality of others of said electronic means, means for altering said pattern of conditions, means controlled by an electrical manifestation representative of a digit to be entered controlling said altering means, in steps, equal in number to the value of a digit to be entered, to thereby produce a pattern of said conditions indicative of the cumulative value of said digits, and electronic carry means including means controlled by a chosen pattern of said conditions for producing a carry effect.

14. An accumulator comprising in each denominational order a number of elements less than the base of the chosen digit notation employed, said elements being operable to produce any chosen permutation of a plurality of the same and of a different kind of electrical conditions, means controlled by a manifestation representative of a digit to be entered for adjusting the operation of said elements to produce the one of said permutations, representative of said digit, said control means when controlled by a manifestation representative of a second digit adjusting the operation of said elements to produce the one of said permutations representative of the cumulative value of said first and said second digits, means controlled by passage of the elements in one order from a permutation representative of the highest to a permutation representative of the lowest digit of said notation to thereby produce a carry effect, and means controlled by a higher order of elements producing a chosen permutation, and by said carry effect, to produce a carry in a still higher order.

15. An electronic accumulator comprising in each of a plurality of orders, a plurality of electronic elements, each comprising a pair of portions, corresponding portions of succeeding elements being operable to an on condition, successively and cyclically, under control of successive electrical manifestations and non-corresponding portions being simultaneously operable to an off condition, means interconnecting said plurality of elements whereby the on condition of one portion conditions a succeeding portion only of the next succeeding element, preparatory to being turned on, upon application of an electrical manifestation to said element, entry control means controlling the application of said electrical manifestations, in proportion to the value of digits to be entered, carry means controlled by passage of a lower order from a condition indicative of the highest to a condition indicative of the lowest digit of a chosen notation, to produce a carry effect, and means controlled by the continuing application of said manifestations in the next highest order and by a phenomenon produced by said carry effect to produce a carry in the still next higher order.

16. An electronic accumulator comprising in each denominational order, a plurality of electronic elements, each comprising a pair of portions, corresponding portions being operable to an on condition, cyclically and sequentially under control of successive electrical manifestations, unidirectionally effective coupling means interconnecting said elements whereby the on condition of one portion conditions only one other portion, the latter being, in the next succeeding element to be turned on upon application of an electrical manifestation to its element, means including entry control means controlling the application of said electrical manifestations to said elements, in proportion to the value of digits to be entered, and carry means including means controlled by the on condition of one of said portions in one order and by the assumption of said on condition by another portion, and simultaneously controlled by the operation of the second mentioned means in said one order, to introduce a carry into the next higher order.

17. An electronic accumulator comprising in each denominational order, a plurality of electronic elements each comprising a pair of portions, corresponding portions being operable to an on condition, cyclically and sequentially under control of successive electrical manifestations, means interconnecting said elements whereby the on condition of one portion conditions a successive portion only, of the next succeeding element to be turned on upon application of a said electrical manifestation to its element, means including entry control means controlling the application of said electrical manifestations to said elements, in proportion to the values of digits to be entered, to produce a pattern of on conditions indicative of said digits, respectively, carry means, controlled by the passage of one order from a pattern of on conditions representative of the highest digit of a notation employed to a pattern of on conditions representative of the lowest digit of said notation, to produce a carry effect, and means controlled by the assumption of said on condition by one of said portions in said next higher order, under control of said carry effect and simultaneonsly controlled by said carry effect to produce a carry into the still next higher order.

18. An electronic accumulator comprising in each denominational order, a plurality of electronic elements, each comprising a pair of portions, one set of corresponding portions and then the other set of corresponding portions being operable to an on condition, cyclically and sequentially under control of successive electrical manifestations, means interconnecting said elements whereby the on condition of one portion of one element conditions one other portion only, the latter being in the next succeeding element to be turned on upon application of a said electrical manifestation to its element, means including entry control means controlling the application of said electrical manifestations to said elements, in proportion to the values of digits to be entered, to produce a pattern of on conditions indicative of said digits respectively, carry means controlled by passage of a lower order from the highest digit of a notation employed to the lowest digit of said notation to produce a carry effect, and means controlled by the on condition of one of said portions of the next higher order and by the assumption of said on condition by another one of the portions of said next higher order under control of said carry effect and simultaneously controlled by the operation of said application controlling means of said next higher order, to produce a carry in a still next higher order.

19. An electronic accumulator comprising an order of cyclically operating electronic means for producing manifestations indicative, respectively, of each of the digits of a chosen notation, means producing a series of pulses, at successive times, for controlling operation of said electronic means, said pulses being proportional in number to the value of the digit to be entered, to adjust the manifestations of said producing means to different manifestations, electronic carry entry producing means, entry receiving means to receive the carry entry, and means including said pulse producing means for producing a second series of control pulses interspersed with those of said first series, for operating the carry entry producing means, under control of said order of electronic discharge means, to bring about carry entry into said entry receiving means.

20. An electronic accumulator comprising a plurality of cyclically operable electronic elements, each including a pair of portions, one of said portions being operable to an on condition and its companion portion, simultaneouly, to an off condition, means electrically connecting said elements so that the on condition of each different portion of one element respectively conditions a different one of the portions of the next succeeding element to be turned on, upon application of one of a succession of electrical manifestations thereto, entry control means controlling the application of said electrical manifestations to all of said elements, and initially rendered operative in response to one electrical control manifestation and inoperative a differential time later in response to a second electrical control manifestation, the interval between said control manifestation being proportional to the value to be entered, and means producing said control manifestations.

21. An electronic accumulator comprising two interconnected groups of electronic discharge means, means for cyclically, sequentially, operating said discharge means of one group, to one of two sustained electrical conditions and later, cyclically, to the other of said two conditions, and similarly sequentially operating said manifesting means in the other group but to reverse electrical condition with respect to the condition in the first group, and means for producing a digit entry into said accumulator by controlling said sequentially operating means, in accordance with the values of digits entered, to produce a pattern of said two conditions in said manifesting means, representative of the cumulative value of said digits entered.

22. An electronic accumulator comprising a series of electronic elements, each including a pair of portions interconnected so that when one is in a particular electrical condition the other is in an alternative electrical condition, means electrically coupling the elements so that each portion in each element when in the particular condition primes a different, related one of the portions of the next succeeding element to be turned to said particular condition upon application of one of a succession of electrical manifestations to the latter element, entry control means controlling application of the said manifestations to the elements to cause the successively related portions to be successively primed and turned to the particular condition, and means for determining differential periods of operation of the entry control means according to different values ascertained for entry.

23. An electronic accumulator comprising a series of electronic elements, each including a pair of portions interconnected so that with either one in an on condition the paired portion is in off condition, means electrically coupling the elements so that each portion in one element when on primes a different, related portion of the next succeeding element to be turned on, a source of successive, advancing, electrical pulsations applied to the elements to turn on the primed portions in succession, and entry control means controlled by a digit-corresponding manifestation for controlling application of said advancing pulsations by the source to the elements in accordance with the magnitude of the digit.

24. An electronic accumulator comprising a series of electronic elements, each including a pair of portions interconnected so that with either one on the paired portion is off, means electrically coupling the elements so that each portion in one element when on primes a different, related portion of the next succeeding element to be turned on, a source of electrical pulsations applied to the elements to turn on the primed portions in succession, and an entry control device for controlling said source to cause it to generate a variable number of said pulsations differing according to different values to be entered.

25. Apparatus performing cycles of operation, each of the same duration, said apparatus comprising denominational orders of entry receiving means to register the values of a notation, electrical means to adjust each order for a differential portion of a cycle according to the differential magnitude of the value to be entered in the order and at different times of which cycle, depending on the previous value registered by the said order of receiving means, the said order of receiving means may undergo passage beyond its registering capacity, and means electrically controlled by the said adjusting means substantially, collaterally with adjustment of said order for undergoing said passage, for entering a carry value into a higher order of the receiving means at a time embraced by a portion of the cycle in which such higher order is capable of being adjusted by its related electrical means to receive a differential value entry.

26. In combination, an order of electronic means producing manifestations of different values, means to adjust said manifestations progressively for a differential period varying according to a value entered, means for intermittently testing throughout the said differential period of adjustment for passage of the electronic means beyond the limit value manifestation thereof, value receiving means, and means controlled by the order of electronic means and by said testing means and effective collaterally with said passage for entering a carry value in said receiving means.

27. In combination, means to generate component electrical manifestations of numbers to be traced, cathode ray means for tracing patterns of the numbers under the influence of said manifestations, differentially operable entry receiving means to produce, selectively, combinations of manifestations of numbers registered thereby, each combination of manifestations being composed of a plurality of individual manifestations, combinational circuits, each to read out one of the numbers registered by the receiving means and including a plurality of component circuits, each of the latter effective under control of one of the individual manifestations of the combination of such manifestations manifesting the number to be read out, and means under joint control of the component circuits, of the combinational circuit effective to read out the number in the receiving means, for causing the cathode ray means to visibly trace the patterns of the latter number.

28. In combination, value entry receiving means including a series of electronic members, each having either an on condition or an alternative off condition, circuits correlating the members for progressive alteration of their respective conditions and affording high and low voltage points respectively determined by the different conditions of the members, means controlled by value manifestations for entering values into the receiving means by acting through said circuits to alter the conditions of the members, one member after another, and means rendered effective selectively under control of different combinations of only high voltage points of said circuits for manifesting the algebraic result of the entered values, each different combination of only high voltage points corresponding to a different one of the different values of a chosen notation.

29. The combination with value designating means and circuits effective in different permutations under control of the value designating means according to the designated values, of a plurality of electronic relays, each including a plurality of control electrodes to determine the condition of the relays, with the electrodes of each relay connected to a different permutation of circuits, whereby the relays are selectively conditioned according to the permutation of effective circuits, means to manifest the designated values, and means cooperatively relating the relays and the manifesting means to cause the latter under selective control of the relays according to their condition to manifest the designated values.

30. In combination, accumulating means comprising in each order a number of discrete electronic trigger circuits less than the number of different digits to be selectively manifested by the circuits, said circuits, according to their conditions, selectively combinationally manifesting the different digits, means operatively connecting the circuits for sequential switching in condition, means selecting digits of a multi-order number to be entered, means thereby controlled for entering in each order the digit selected therefor by switching a number of the circuits depending upon the value of the digit to be entered so as to sequentially switch the condition of these circuits until they combinationally manifest the cumulative value of the entered digit and of previously entered digits, and solely electronic carry means between adjacent orders for bringing about a carry entry into one order under control of a preceding order.

31. In combination, a denominational order of digit entry receiving and totaling means comprising a network of electronic discharge means operable to produce manifestations respectively indicative of different digits of a chosen notation, means for producing digit entry effecting pulses to operate the electronic discharge means for producing a manifestation indicative of the cumulative value of entered digits, means, including said pulse producing means, for generating a carry control pulse for each entry effecting pulse, carry entry receiving means, and carry means receiving the carry control pulses and effective under control of said network and in response to such carry control pulse for bringing about a carry entry into said carry entry receiving means.

32. A machine in which higher and lower orders of entry receiving means are denominationally related by carry control means, said machine comprising electronic discharge means, in the higher order, alterable in discharge status to selectively produce manifestations respectively indicative of different digits, entry control means responsive to a digit signal for bringing about alteration in discharge status of said discharge means so as to adjust the manifestations according to the signaled digit, and means, exclusive of said entry control means and responsive to operation of the carry control means for acting, apart from the entry control means to bring about supplemental alteration in discharge status of the electronic discharge means so as to adjust the manifestations according to a carry entry, whereby carry is effected from lower to higher order.

33. In combination, means selectively producing electrical signals representative of digits of a multi-order number to be entered during a cycle, each signal being produced at a differential time of said cycle dependent upon the value of the digit represented by the signal, multi-order accumulating means to accumulatively receive said number, and comprising in each order an electrical network of electronic discharge tubes alterable in electronic status to selectively produce in the network composite, combinational codal patterns respectively indicative of different digits, each pattern being composed of a plurality of similar, static electrical manifestations, entry control means for each order responsive to the digit representing signal pertaining to said order for bringing about progressive digit manifesting operation of the electronic discharge tubes of the said order for a differential period of said cycle dependent upon the differential time at which the digit representing signal is produced, whereby said order of tubes produces a composite combinational codal pattern indicative of the cumulative value of the now-entered digit and of previously entered digits in the order, and electronic carry means controlled by one order for bringing about carry entry into a higher order, whereby the multi-order accumulating means after digit and carry entries produces denominationally ordered composite, codal patterns of static electrical manifestations indicative of a plural order accumulated total.

34. In combination, accumulating means comprising a plurality of electronic elements, each comprising a plurality of individual portions concomitantly operable to opposite sustained electrical conditions, means electrically connecting said elements into a closed network, means, including said connecting means, for concomitantly operating the portions of one element to reverse their electrical conditions and then concomitantly operating the portions of the next element to reverse their electrical conditions, and so on until all the elements have had their portions reversed in sustained electrical condition and, thereafter, concomitantly operating the portions of the first element to restore their former electrical conditions and then similarly operating the portions of each of the other circuits in sequence to restore their former conditions, whereby the elements have their portions in sustained conditions differing in accordance with whether one or more series of such operations of all the elements have been completed or whether part of such series has been completed, and means for selecting digits to be entered and controlling said operating means to perform part of such series or one such series or a plurality of such series of operations in accordance with the cumulative value of digits selected for successive entry.

35. In combination, an electronic commutator comprising a number of discrete electronic trigger circuits less than the number of different digits of a notation, means continuously operating the electronic circuits, one after another and one at a time, to produce a train of pulses, one pulse for each operation, at differential times, of a chosen time base, corresponding to said different digits, an electronic accumulator comprising electronic discharge means operable to produce, sequentially, electronic manifestations respectively indicative of said different digits, means responsive to a selected pulse for operating the electronic discharge means for a differential time of said chosen time base dependent upon the differential timing of the selected pulse representative of a digit desired to be entered.

36. In combination, accumulating means comprising an electrical network of electronic discharge means responsive to pulsing of the network for producing in the network combinational codal patterns, each composed of a plurality of component voltage conditions and each such pattern indicative of a different digit of a notation, means to enter a digit in the network by impressing a train of pulses upon the network, proportional to the differential magnitude of the digit, to thereby operate the electronic discharge means for producing a codal pattern indicative of the cumulative value of the digit just entered and of the digit previously standing in the network, and means to produce and select a representation of a to-be-entered digit for limiting the number of pulses impressed upon the network accordingly.

37. In combination, accumulating means comprising a network of electronic circuits, each including a pair of mutually related branches, of which either is an on condition while the other is in an off condition, means electrically connecting the circuits for sequential operation of corresponding branches to an increasing series of on conditions while the companion branches are concomitantly operable to a decreasing series of such conditions and thereafter for sequential operation of said corresponding branches to a decreasing series of on conditions and of said companion branches to an increasing series of on conditions, said operations being repetitive, whereby the increasing series of on conditions alternates between the corresponding branches and the companion branches concomitantly with alternation of the decreasing series between the companion branches and the corresponding branches, the patterns of off and on conditions of the branches of the circuits being respectively indicative of different digits, means selecting digits to be entered, and means controlled thereby for effecting said operations of the branches for different periods of time varying in accordance with the values of successive digits entered, whereby a pattern of on and off conditions is produced, indicative of the cumulative value of entered digits.

38. In combination, means capable of selectively transmitting any of different digit manifestations during a cycle of invariable duration, any such manifestation being transmitted at a differential time of the cycle depending upon the value of the digit, means producing a control manifestation at a predetermined time of the cycle, whereby two manifestations are produced during each cycle, one being a digit manifestation and the other being the control manifestation, accumulating means comprising a plurality of electronic discharge devices arranged in two groups so interconnected that an increasing series of either one of two sustained electrical conditions is produced in either group by sequential operation of the devices therein while a decreasing series of the same condition is produced in the other group by concomitant sequential operation of the devices therein, whereby the increasing and decreasing series alternates between the two groups, and means successively and selectively responsive to the said two manifestations transmitted thereto during a cycle for sequentially operating said devices for a differential portion of said cycle determined by the interval between transmission of said two manifestations, whereby a value is entered in the accumulator, with such value being determined by said differential portion of the cycle.

39. In combination, accumulating means comprising two interconnected groups of electronic digit manifesting means, means so electrically connecting said manifesting means within the groups and between the groups as to enable the electronic means of either group to be operable sequentially, in steps, to either of two electronic conditions while the electronic means of the other group are concomitantly operable, in steps, to the other of the electronic conditions, whereby either said electronic condition increases along one group and concomitantly decreases along the other group, then increases along the latter group and decreases along the first group and so on in alternation, and means controlled by successive manifestations of digits to be entered successively for producing successive trains of stepping pulses, each train having a number of pulses proportional to the digit to be entered, for producing steps of operation of the electronic means proportional in number to the cumulative value of said digits, whereby said electronic means of the two groups are operated to produce a pattern, of a plurality of each of said electronic conditions, indicative of said cumulative value.

40. In combination, electronic accumulating means comprising, in each order, electronic digit manifesting means selectively producing combinational codal patterns of a plurality of discrete, static, electrical conditions, each pattern being indicative, according to a chosen combinational code, of a different digit, means selectively producing electrical manifestations of digits to be entered, means controlled thereby for operating the electronic digit manifesting means of an order through a number of steps dependent upon the digit to be entered in said order so as to produce a pattern therein indicative of the cumulative value of such entered digit and of previously entered digits, and electronic discharge carry means controlled by one such order for effecting a step of operation of the electronic means of a higher order to enter a carry value therein.

41. In combination, electronic accumulating means comprising in each order an electrical network of electronic discharge means operable in response to pulses impressed upon the network to selectively produce combinational codal patterns of a plurality of static, electrical conditions, each pattern indicative of a different digit, means to selectively produce electrical manifestations of the digits of a plural order number to be entered, means controlled thereby for applying a number of pulses to the network of each order in proportion to the value of the digit to be entered in the order so as to operate the electronic discharge means thereof to produce a combinational pattern indicative of the cumulative value of such entered digits, and electronic discharge carry means controlled by one order for producing a carry entry into an adjacent order, whereby, through such digit and carry entries, successively entered plural order numbers may be accumulated and their total indicated by the combinational codal patterns in the different orders of the accumulating means.

42. In a machine to perform successive cycles of the same, predetermined duration and during each of which any of different digits may be determined to be entered, the combination of accumulating means to receive entry of such determined digits and comprising a plurality of successively related electronic devices, each operable sequentially to different voltage conditions and operable at a different time in said sequence to the opposite of said different voltage conditions, means for sequentially operating said devices to assume said different voltage conditions and later to sequentially assume said opposite voltage conditions, entry control means controlling said operating means, and means effective during each said cycle to determine the digit to be entered and acting through said entry control means for controlling said operating means to effect sequential operation of said devices for a differential portion of the cycle dependent upon the magnitude of the digit to be entered.

43. In combination, electronic accumulating means comprising, in a denominational order, a series of electronic trigger circuits, each capable of being tripped to either one of two sustained, reverse electronic conditions, means electrically connecting the circuits for sequential tripping first to one said condition in all the circuits and then to the reverse condition in all the circuits, and thereafter again to the previous condition in all the circuits, and so on in alternation, said circuits, in accordance with their sustained conditions selectively manifesting different digits, means for determining successive digits to be entered, and entry means controlled thereby for producing successive digit entries by effecting said sequential tripping operations until the circuits are brought to such conditions as to manifest the cumulative value of the digits entered.

44. In combination, electronic entry receiving means comprising an order of electronic trigger circuits less in number than the number of digits which may be manifested by said circuits, each circuit including a pair of branches interrelated to concurrently assume reverse electrical conditions, with each branch of a circuit when in a chosen condition producing a component manifestation combining with one or more such component manifestations produced by one or more branches, in the chosen condition, of another or others of the circuits to provide a combinational manifestation of a digit, whereby different digits are selectively combinationally manifested by different combinations of such component manifestations produced by branches of the different circuits, means to enter digits in the order of electronic circuits by sequentially operating said circuits to effect reversal in condition of their branches until a combinational manifestation is produced indicative of the cumulative value of the digits entered, and means automatically producing carry consequent upon passage of the order of circuits beyond a limit digit combinational manifestation.

45. In combination, electronic registering means for transmitting, selectively, electrical manifestations combining, according to a combinational code, in combinational codal patterns respectively indicative of different digits to be registered by said electronic means, cathode ray means for producing all of the character outlines of the different digits, and means, controlled conjointly by the transmitted manifestations comprising a combinational pattern of the digit registered by said electronic registering means, for selecting the character to be displayed by the cathode ray means.

46. Apparatus to perform cycles of operation, each of the same duration, means capable of transmitting electrical manifestations corresponding to different digits of a plural order number during such cycle, plural order electronic entry receiving means, each order producing electronic manifestations indicative of the digits of a chosen notation, means controlled by the electrical manifestation corresponding to the digit in an order of said number for adjusting the manifestations of the corresponding order of entry receiving means for a differential portion of the cycle corresponding to the magnitude of said digit, and means controlled by one order of entry receiving means consequent upon its adjustment beyond a limit digit manifestation for effecting a carry into a higher order within the portion of the cycle in which such higher order is capable of being adjusted under control of a said electrical manifestation corresponding to the digit in the related higher order of such mentioned number.

47. In combination, a cathode ray tube with associated display screen, means controlling the tube for the potential tracing, at successive times, of composite outlines of different numbers upon the screen, said tube including a control grid normally at such bias as to prevent tracing on the screen of the number outlines, an accumulator comprising means to selectively produce combinational electrical effects indicative of different numbers, any one of which may be standing in the accumulator, each combinational electrical effect being composed of a plurality of component electrical manifestations, and means, controlled by the component electrical manifestations of the combinational electrical effect indicative of the number standing in the accumulator, for reducing the bias upon said control grid concurrently with the control of the tube for the tracing of the outline of the latter number, so that this number is displayed upon the screen to the exclusion of the remaining numbers.

48. An electronic totalizer comprising a succession of electronic discharge members, each member capable of assuming either an on or an off condition for selectively combinationally manifesting different digits, means so connecting said members, one to another, that a certain group thereof are in on condition, entry control means controlled by a digit manifestation for stepping said on group through said entire succession, and means controlled by the change of said group from one particular position to another particular position to produce a carry manifestation.

49. An electronic accumulator comprising in each order, of a plurality of denominational orders, an entry receiving network of a plurality of trigger circuits for producing individual electronic manifestations in the network, the number of said trigger circuits of each order network being less than the number of different digits of a chosen notation to be selectively represented by combinational codal patterns of said individual manifestations and said patterns representing, respectively, each of the digits of the notation, means associated with each order network for sequentially operating different numbers of said trigger circuits thereof, means to selectively limit the sequential operation of the trigger circuits of each order network according to the magnitude of the digit to be entered therein, and means automatically effecting carry entry into one order network under control of a preceding order network in consequence of the trigger circuits of the latter network passing from a pattern indicative of one limit digit to a pattern indicative of the opposite limit digit of the notation.

50. An electronic totalizer comprising a succession of electronic discharge members, each member capable of assuming either an on condition or an off condition, for selectively combinationally manifesting different digits, means so connecting said members, one to another, that a certain group thereof are in on condition, and entry control means controlled by a digit manifestation for stepping said on group through said entire succession.

51. An electronic accumulator comprising a series of discrete electronic trigger circuits, means electrically connecting the said trigger circuits, one to the next, and the last to the first, for operation sequentially first to one electrical status and then sequentially to an alternate electrical status, each trigger circuit when in one said electrical status conditioning the succeeding trigger circuit for change to this particular status and when, itself, in the alternate status conditioning said succeeding circuit for change to this alternate status, value entry selecting means, and value entry means controlled thereby for producing said changes in the conditioned trigger circuits.

ARTHUR H. DICKINSON.

Certificate of Correction

Patent No. 2,402,989. July 2, 1946.

ARTHUR H. DICKINSON

It is hereby certified that errors appear in the printed specification of the above numbered patent requiring correction as follows: Column 72, line 58, claim 6, before the word "notation" insert *a*; line 64, same claim, after "produce" insert *a*; column 77, line 47, claim 25, strike out "substantially"; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*

Certificate of Correction

Patent No. 2,402,989.

July 2, 1946.

ARTHUR H. DICKINSON

It is hereby certified that errors appear in the printed specification of the above numbered patent requiring correction as follows: Column 72, line 58, claim 6, before the word "notation" insert *a*; line 64, same claim, after "produce" insert *a*; column 77, line 47, claim 25, strike out "substantially"; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*

Disclaimer 2,402,989.—*Arthur H. Dickinson*, Scarsdale, N. Y. ACCUMULATING APPARATUS. Patent dated July 2, 1946. Disclaimer filed Mar. 20, 1951, by the assignee, *International Business Machines Corporation*.
Hereby enters this disclaimer to claims 26 and 32 of said patent.
[*Official Gazette April 24, 1951.*]